(12) United States Patent
Lazar et al.

(10) Patent No.: US 12,555,649 B2
(45) Date of Patent: Feb. 17, 2026

(54) PREDICTION METHOD AND GENE SIGNATURES FOR THE TREATMENT OF CANCER

(71) Applicant: WORLDWIDE INNOVATIVE NETWORK, Chevilly-Larue (FR)

(72) Inventors: Vladimir Lazar, Villejuif (FR); Shai Magidi, Gan-Yavne (IL)

(73) Assignee: WORLDWIDE INNOVATIVE NETWORK, Chevilly-Larue (FR)

( * ) Notice: Subject to any disclaimer, the term of this patent is extended or adjusted under 35 U.S.C. 154(b) by 117 days.

(21) Appl. No.: 18/030,782

(22) PCT Filed: Oct. 7, 2021

(86) PCT No.: PCT/EP2021/077670
§ 371 (c)(1),
(2) Date: Apr. 7, 2023

(87) PCT Pub. No.: WO2022/074107
PCT Pub. Date: Apr. 14, 2022

(65) Prior Publication Data
US 2023/0377684 A1    Nov. 23, 2023

(30) Foreign Application Priority Data
Oct. 9, 2020 (EP) .................................. 20306181

(51) Int. Cl.
G16B 25/10 (2019.01)
G16B 15/10 (2019.01)
(Continued)

(52) U.S. Cl.
CPC ............. G16B 25/10 (2019.02); G16B 15/10 (2019.02); G16B 40/20 (2019.02); G16H 50/70 (2018.01)

(58) Field of Classification Search
CPC ........ G16B 25/10; G16B 15/10; G16B 40/20; G16B 40/30; G16H 50/70; Y02A 90/10
(Continued)

(56) References Cited

U.S. PATENT DOCUMENTS 8,768,629 B2 * 7/2014 Von Hoff ............... G16H 20/10
702/19
2012/0270228 A1 * 10/2012 Baker .................. C12Q 1/6886
435/6.12
(Continued)

FOREIGN PATENT DOCUMENTS

EP       3115470 A1 * 1/2017 ......... C12N 15/1003
WO  WO 2010/093465       8/2010
(Continued)

OTHER PUBLICATIONS

Jamieson et al., "Gene-expression Profiling to Predict Responsiveness to Immunotherapy", Cancer Gene Therapy, published online Nov. 11, 2016, pp. 134-140, No. 24, No. 3. (Year: 2016).*
(Continued)

*Primary Examiner* — Joy Chng
(74) *Attorney, Agent, or Firm* — SALIWANCHIK, LLOYD & EISENSCHENK

(57) ABSTRACT

The present invention relates to methods for predicting the clinical outcome or the response of a patient suffering from cancer to an anti-cancer therapy based on novel gene signatures.

13 Claims, 9 Drawing Sheets

(51) Int. Cl.
*G16B 40/20* (2019.01)
*G16H 50/70* (2018.01)

(58) Field of Classification Search
USPC .......................................................... 705/2–3
See application file for complete search history.

(56) References Cited

U.S. PATENT DOCUMENTS

2017/0159128 A1* 6/2017 Lazar ........................ G16B 5/20
2020/0248269 A1* 8/2020 Galon ................... C12Q 1/6886
2020/0319191 A1* 10/2020 Spetzler ........... G01N 33/57407

FOREIGN PATENT DOCUMENTS

WO  WO-2010093465 A1 * 8/2010  ................ B01L 7/52
WO  WO 2014/055543     4/2014
WO  WO 2014/062978     4/2014

OTHER PUBLICATIONS

Kessler et al., "Integrative Analysis of Cancer-Related Signaling Pathways" Frontiers in Physiology, Jun. 4, 2013, pp. 1-19, vol. 4, Article 124 (Year: 2013).*
Written Opinion in International Application No. PCT/EP2021/077670, Mar. 14, 2022, pp. 1-9.
Jamieson, N. B. et al. "Gene-expression profiling to predict responsiveness to immunotherapy" *Cancer Gene Therapy*, published online Nov. 11, 2016, pp. 134-140, No. 24, No. 3.

* cited by examiner

Figure 4 (following)
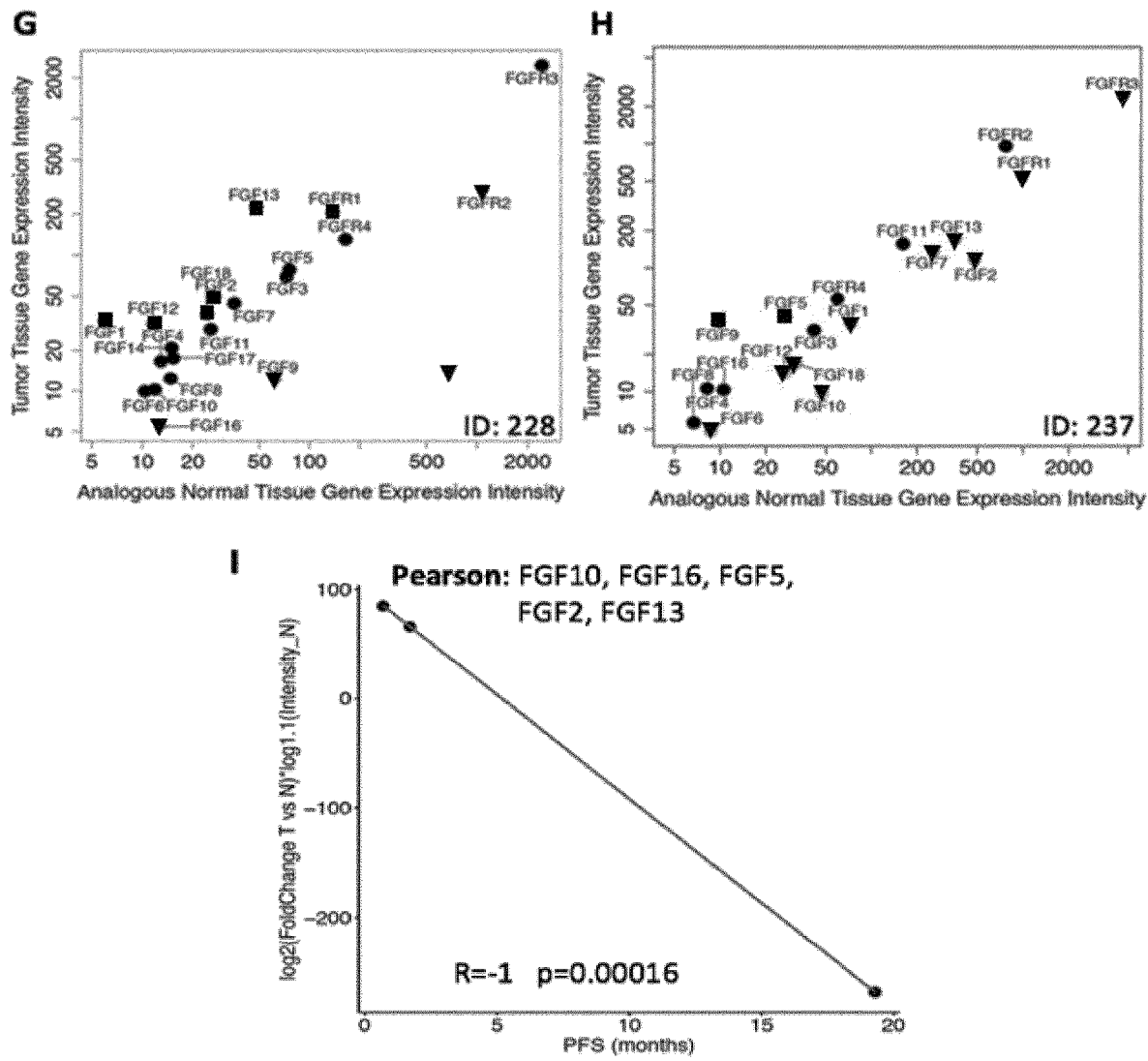

Figure 6 (Following)
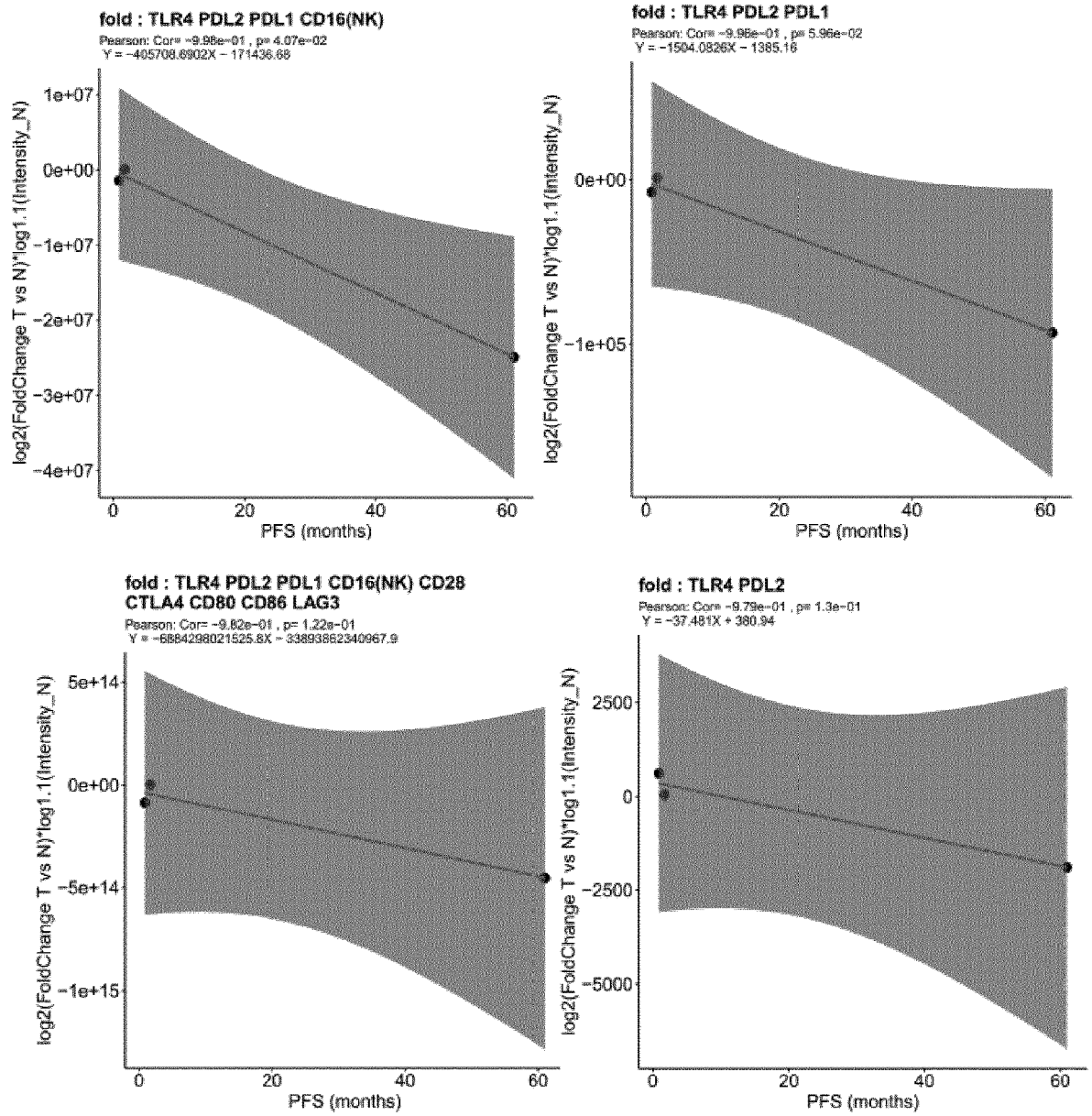

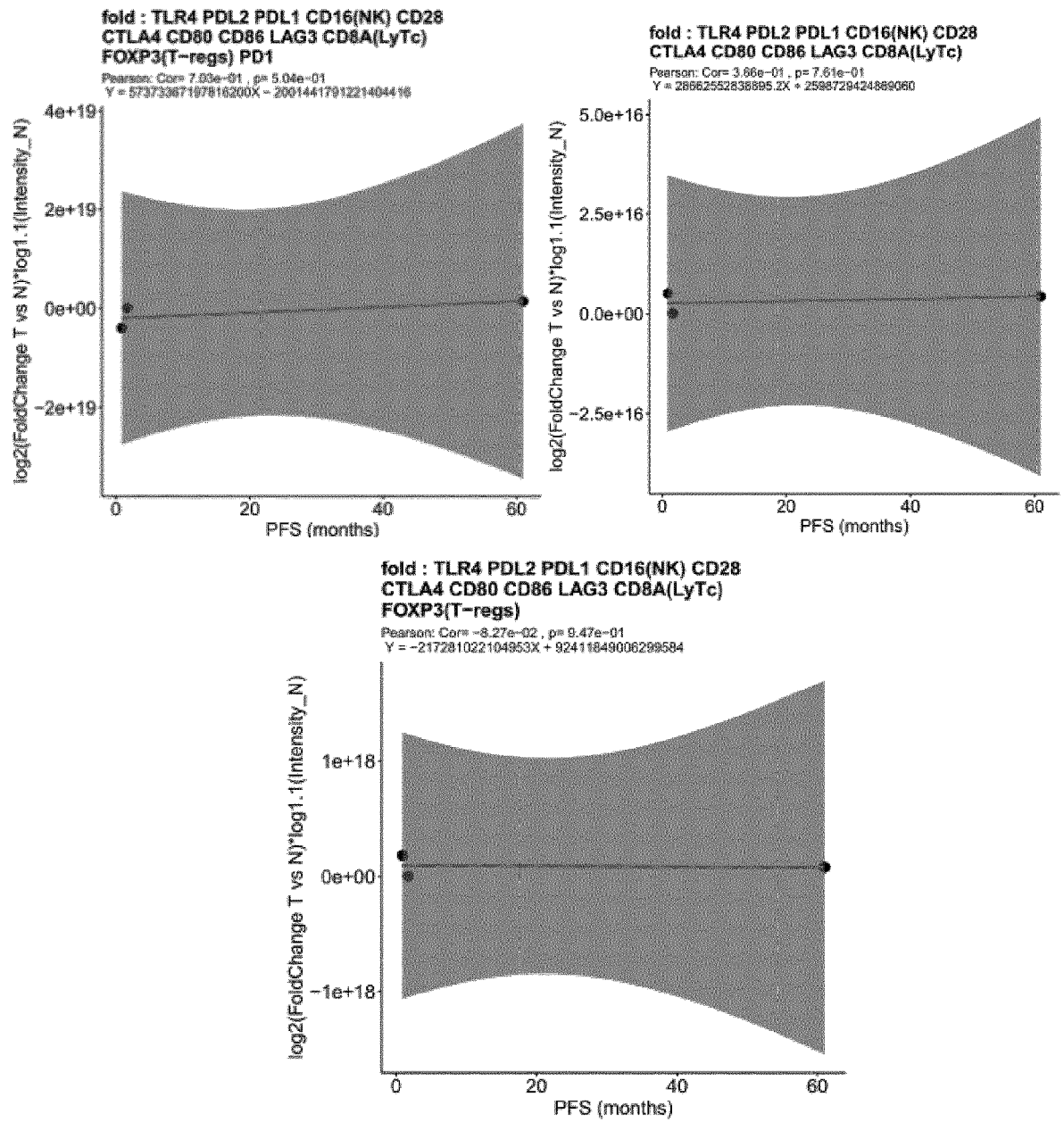
Figure 6 (Following)

PREDICTION METHOD AND GENE SIGNATURES FOR THE TREATMENT OF CANCER

CROSS-REFERENCE TO RELATED APPLICATION

This application is the U.S. national stage application of International Patent Application No. PCT/EP2021/077670, filed Oct. 7, 2021.

FIELD OF THE INVENTION

The present invention relates to the field on oncology, especially to personalized medicine in cancer therapy.

BACKGROUND OF THE INVENTION

The personalized medicine evolution in oncology has resulted in prominent successes that have led to approved, molecularly specific, biomarker-defined indications for targeted therapies. Today, standard of care in several therapeutic lines includes immune-targeted therapies guided by microsatellite instability/high mutational burden or PDL1 status or gene-targeted therapies based on druggable oncogenic driver molecular abnormalities. Indeed, as examples, the use of EGFR mutation/erlotinib, KIT mutation/imatinib, B-RAF mutation/vemurafenib, ALK translocation/crizotinib, have recently dramatically changed the treatment landscape of cancers.

Unfortunately, not all tumors have pharmacologically tractable DNA alterations or benefit from immune oncology (IO) agents, and treatment becomes more challenging after failure of first and second line regimens. Despite the advent of personalized precision oncology, cancer remains one of the leading causes of deaths all over the world. Globally, 9.6 million deaths are caused by cancer, which represents 13% of all global deaths.

Extending the application of precision medicine therefore requires a deeper understanding of cancer biology. Improvement in the ability to select patients is needed, both in respect to identify responding versus resistant tumors and in pinpointing patients at risk for severe toxicities. The recently published WINTHER trial explored, for the first time in a clinical setting, the use of transcriptomics based on a novel dual tumor-organ matched analogous normal tissues biopsies. The trial demonstrated that transcriptomic analysis, based on tumor/normal comparisons, was feasible and enhanced, by about one third, the number of patients that could be matched to therapy as compared to genomics alone (J. Rodon et al. Genomic and transcriptomic profiling expands precision cancer medicine: the WINTHER trial. Nature Medicine, 2019, 25, 1-8).

Cancer patients with advanced diseases who fails to first and second therapy lines exhaust rapidly either therapeutic options and biomarkers strategies (usually companion diagnostic tests) based on classic DNA and IHC investigation, and have a poor outcome. Many biomarkers have been used in the past years aiming to predict the clinical outcome of patients or their response to anti-cancer therapy. However, to some extent, biomarkers strategies were biased. Drug developers oriented the research to biomarkers predictive to the response of patients only to deal with their own therapies. For example, anti-PD-L1 or anti-PD-1 therapies only took into account the level of PD-L1, the tumor mutations burden (an increased number of mutations being supposed to generate an increased amount of neoantigens derived from mutated proteins and recognized as "non-self", or microsatellite instability reflecting a particular profile of mutations with high number of mutations). Nevertheless, most of them did not meet expectations and failed to correctly predict the efficacy of the immunotherapy.

There is also a persistent need to develop new strategies and to identify reliable biomarkers and gene signatures to personalize treatment for patient suffering from cancer, thereby making anti-cancer treatments more effective for patients and increasing patient survival. The present invention seeks to meet these and other needs.

SUMMARY OF THE INVENTION

The Digital Display Precision Predictor (DDPP) was developed by the inventors based on transcriptomics and dual tumor and organ matched normal tissue biopsies, that can apply to any type of anti-cancer therapies, agnostic of tumor type, and could be potentially used in any therapeutic line. The predictor prototype was built correlating differential expression of key genes involved in drug's mechanisms of action with the overall survival (OS) for patients from WINTHER trial (J. Rodon et al. Genomic and transcriptomic profiling expands precision cancer medicine: the WINTHER trial. Nature Medicine, 2019, 25, 1-8) with available transcriptomics and clinical outcome data. The DDPP prototype was built on patients treated with diverse anti-cancer treatments, comprising the Tyrosine Kinase inhibitors including Everolimus, Axitinib, Trametinib, Afatinib and FGFR inhibitors, or a checkpoint inhibitor such as the anti-PD-1/anti-PD-L1 antibodies Pembrolizumab, Nivolumab and Atezolizumab, enabling to generate a linear regression predictive model for each drug. With this predictor, an in-silico modeling of the therapeutic landscape with these drugs was performed on all patients from WINTHER trial, to envision potential benefit of the predicted efficacy of anti-cancer therapies. The in-silico modeling suggests a dramatic improvement of the survival of cancer patients of any tumor type, and any therapy line, in particular when they exhausted other therapeutic and biomarker options.

Using this novel biomarker strategy and tool, the inventors identified novel and robust gene signatures, for predicting both the clinical outcome of patient and the response of a patient to an anticancer treatment.

In a first aspect, the invention concerns a method for selecting a gene signature being indicative of a therapeutic benefit of an anti-cancer therapy in a patient or of the clinical outcome of a patient, wherein the method comprises:
  providing, for several patients having a cancer and being treated with the same anti-cancer therapy and for which the clinical outcome is known, mRNA expression level in a tumor sample and a histologically matched normal sample of each gene of a set of n key genes known to be involved in the anti-cancer therapy; and wherein the tumor and normal histologically matched samples are from the same subject;
  determining a mRNA fold change of Tumor versus Normal ($Fc_n$ TvN) for each gene of the set of n key genes;
  multiplying the $Fc_n$ TvN by expression intensity of the gene (In), either in the tumor sample ($I_n$ T) or in the histologically matched normal sample ($I_n$ N) or both, thereby determining a function ($Fg_n$) for each gene of the set of n key genes;
  determining, for each gene of the set of n key genes, a correlation between the $Fg_n$ and the clinical outcome, and ranking the genes based on the correlation from the most correlated to the less correlated to the clinical outcome;

combining 2 to n genes of the set of n key genes with an increment of 1, the genes being selected in the ranking order from the most correlated to the less correlated, and determining the correlation between each of the combination and the clinical outcome; and selecting the combination of genes best correlated with the clinical outcome, thereby providing a gene signature indicative of a therapeutic benefit with the anti-cancer therapy or of the clinical outcome of the patient.

Particularly, such a method may comprise:

identifying a set of n key genes known to be involved in a mechanism of the anti-cancer therapy, selecting a group of patients with available transcriptomics data and clinical outcome under treatment with said anti-cancer therapy;

providing mRNA expression level in a tumor sample and a histologically matched normal sample from the same patient for each gene of the set of n key genes identified in (1), and determining a mRNA $Fc_n$ TvN for each gene of the set of n key genes;

for each gene of the n key genes, multiplying the $Fc_n$ TvN by expression intensity of the gene ($I_n$) in the tumor sample ($I_n$ T) and multiplying the $Fc_n$ TvN by expression intensity of the gene ($I_n$) in the histologically matched normal sample ($I_n$ N), thereby determining a $Fg_n$ with $I_n$ T and a $Fg_n$ with $I_n$ N;

determining a correlation between $Fg_n$ with $I_n$ T and the clinical outcome of the selected patients and between $Fg_n$ with $I_n$ N and the clinical outcome of the selected patients;

selecting the best correlation between $Fg_n$ with $I_n$ T and $Fg_n$ with $I_n$ N and keeping it as $Fg_n$ for the following steps;

ranking the genes of the n key genes according to the correlation of $Fg_n$ with the clinical outcome, the highest correlation (Fg) being ranked first;

adding to the Fg ranked first, one by one, the Fg of other genes of the set of n key genes until all key genes are present thereby obtaining genes combinations, and determining the correlation between the combinations of 2 to n genes of the set of n key genes and the clinical outcome;

selecting the combination having the best correlation, thereby providing a gene signature indicative of a therapeutic benefit with the anti-cancer therapy or of the clinical outcome of the patient treated with the anti-cancer therapy.

$I_n$ a second aspect, the invention concerns the use of a gene signature selected from the group consisting of:

i) a gene signature essentially consisting of or consisting of AKT2, TSC1, FKB-12, TSC2, RPTOR, RHEB, PIK3CA and PIK3CB;

ii) a gene signature essentially consisting of or consisting of KITLG and KIT;

iii) a gene signature essentially consisting of or consisting of ERK2, ARAF, CRAF, MEK1, MEK2, HRAS, ERK1, MAPK10 and KSR1;

iv) a gene signature essentially consisting of or consisting of NRG4 and NRG2;

v) a gene signature essentially consisting of or consisting of FGF10, FGF16, FGF5, FGF2 and FGF13; and vi) a gene signature essentially consisting of or consisting of TLR4, PDL2, PDL1, CD16, CTLA4 and CD28;

as a biomarker for predicting the clinical outcome of a subject suffering from cancer and been treated with an anti-cancer therapy or as a biomarker for predicting the response of a subject suffering from cancer to an anti-cancer therapy.

In a third aspect, the invention concerns an in vitro method for predicting the clinical outcome of a subject suffering from cancer and being treated with an anti-cancer therapy or for predicting the response of a subject suffering from cancer to an anti-cancer therapy, wherein the method comprises:

providing mRNA expression level of each gene of a gene signature selected from the group consisting of:

i) a gene signature comprising, essentially consisting of or consisting of AKT2, TSC1, FKB-12, TSC2, RPTOR, RHEB, PIK3CA and PIK3CB;

ii) a gene signature comprising, essentially consisting of or consisting of KITLG and KIT;

iii) a gene signature comprising, essentially consisting of or consisting of ERK2, ARAF, CRAF, MEK1, MEK2, HRAS, ERK1, MAPK10 and KSR1;

iv) a gene signature comprising, essentially consisting of or consisting of NRG4 and NRG2;

v) a gene signature comprising, essentially consisting of or consisting of FGF10, FGF16, FGF5, FGF2 and FGF13; and vi) a gene signature comprising, essentially consisting of or consisting of TLR4, PDL2, PDL1, CD16 (NK), CTLA4 and CD28;

in a tumor sample and a histologically matched normal sample, wherein the tumor and histologically matched normal samples are both from the same subject suffering from cancer, determining a mRNA fold change of Tumor versus Normal ($Fc_n$ TvN) for each gene of the signature, multiplying the $Fc_n$ TvN by expression intensity of the gene ($I_n$) in the tumor sample ($I_n$ T) and/or in the normal histologically matched sample ($I_n$ N) for each gene of the signature, 15 determining a score based on the $Fc_n$ TvN multiplied by $I_n$T and/or $I_n$ N, for the genes of the gene signature, this score being indicative of the clinical outcome of the patient suffering from cancer and having an anti-cancer therapy or the responsiveness of the patient to the anti-cancer therapy.

In particular, the anti-cancer therapy is a Tyrosine kinase inhibitor, preferably a mTOR inhibitor, a VEGFR inhibitor, a MEK inhibitor, or a pan-HER inhibitor, more preferably selected from the group consisting of everolimus, axitinib, trametinib and afatinib; or a FGFR inhibitor, such as BGJ398 and TAS-120; or a PD-1/PD-L1 inhibitor, preferably an anti-PD-1 or anti-PD-L1 antibody such as Pembrolizumab, Nivolumab and Atezolizumab.

Preferably:

(i) when the anti-cancer therapy is a mTOR inhibitor, preferably everolimus, the gene signature comprises, essentially consists in or consists in AKT2, TSC1, FKB-12, TSC2, RPTOR, RHEB, PIK3CA and PIK3CB;

(ii) when the anti-cancer therapy is a VEGFR inhibitor, preferably axitinib, the gene signature comprises, essentially consists in or consists in KIT and KITLG;

(iii) when the anti-cancer therapy is a pan-HER inhibitor, preferably afatinib, the gene signature comprises, essentially consists in or consists in NRG4 and NRG2; 30

(iv) when the anti-cancer therapy is a MEK inhibitor, preferably trametinib, the gene signature comprises, essentially consists in or consists in ERK2, ARAF, CRAF, MEK1, MEK2, HRAS, ERK1, MAPK10 and KSR1;

(v) when the anti-cancer therapy is a PD-1/PD-L1 inhibitor, preferably an anti-PD-1 or anti-PD-L1 antibody, the gene signature comprises, essentially consists in or consists in TLR4, PDL2, PDL1, CD16, CTLA4 and CD28; and (vi) when the anti-cancer therapy is a FGFR inhibitor, the gene signature comprises, essentially consists in or consists in FGF10, FGF16, FGF5, FGF2 and FGF13.

Preferably, when the anti-cancer therapy is everolimus, the method according to the invention comprises:
(a) providing mRNA expression level of each gene of the following gene signature: AKT2, TSC1, FKB-12, TSC2, RPTOR, RHEB, PIK3CA and PIK3CB, in a tumor sample and a histologically matched normal sample, wherein the tumor and histologically matched normal samples are both from the same subject suffering from cancer, and determining a mRNA fold change of Tumor versus Normal ($Fc_n$ TvN) for each of the 8 genes of the gene signature;
(b) determining the intensity of gene expression in the tumor sample ($I_n$ T) for each of the 8 genes of the gene signature;
(c) determining the absolute value of the fold of log2(Fc, TvN) multiplied by log1.1($I_n$ T) for each of the 8 genes of the gene signature and, based on a linear regression, determining a predicted progression-free survival (PFS), the predicted PFS being indicative of the clinical outcome or of the response of the subject to everolimus.

Preferably, when the anti-cancer therapy is a PD-1/PD-L1 inhibitor, preferably an anti-PD-1 or anti-PD-L1 antibody, the method comprises:
(a) providing mRNA expression level of each gene of the following gene signature: TLR4, PDL2, PDL1, CD16 (NK), CTLA4 and CD28 in a tumor sample and a histologically matched normal sample, wherein the tumor and histologically matched normal samples are both from the same subject suffering from cancer, and determining the mRNA fold change of Tumor versus Normal ($Fc_n$ TvN) for each of the 6 genes of the gene signature;
(b) determining the intensity of gene expression in the histologically matched normal sample ($I_n$ N) for each of the 6 genes of the gene signature;
(c) determining the fold of log 2 (Fc, TvN) multiplied by log 1.1 ($I_n$ N) for each of the 6 genes of the gene signature and, based on a linear regression, determining a predicted progression-free survival (PFS), the predicted PFS being indicative of the clinical outcome or of the response of the subject to the PD-1/PD-L1 inhibitor.

Preferably, when the anti-cancer therapy is axitinib, the method comprises:
(a) providing mRNA expression level of each gene of the following gene signature: KIT and KITLG in a tumor sample and a histologically matched normal sample, wherein the tumor and histologically matched normal samples are both from the same subject suffering from cancer, and determining the mRNA fold change of Tumor versus Normal (Fc, TvN) for each of the 2 genes of the gene signature;
(b) determining the intensity of gene expression in the histologically matched normal sample ($I_n$ N) for each of the 2 genes of the gene signature;
(c) determining the sum of log 2 ($Fc_n$ TvN) multiplied by log 1.1 ($I_n$ N) for each of the 2 genes of the gene signature and, based on a linear regression, determining a predicted PFS, the predicted PFS being indicative of the clinical outcome or the response of the subject to axitinib.

Particularly, when the anti-cancer therapy is afatinib, the method comprises:
(a) providing mRNA expression level for each gene of the following gene signature: NRG4 and NRG2 in a tumor sample and a histologically matched normal sample, wherein the tumor and histologically matched normal samples are both from the same subject suffering from cancer, and determining the mRNA fold change of Tumor versus Normal ($Fc_n$ TvN) for each of the 2 genes of the gene signature;
(b) determining the intensity of gene expression in the tumor sample ($I_n$ T) for each of the 2 genes of the gene signature;
(c) determining the sum of log 2 ($Fc_n$ TvN) multiplied by log 1.1 ($I_n$ T) for each of the 2 genes of the gene signature and, based on a linear regression, determining a predicted PFS, the predicted PFS being indicative of the clinical outcome or the response of the subject to afatinib.

Preferably, when the anti-cancer therapy is trametinib, the method comprises:
(a) providing mRNA expression level of each gene of the following gene signature: ERK2, ARAF, CRAF, MEK1, MEK2, HRAS, ERK1, MAPK10 and KSR1 in a tumor sample and a histologically matched normal sample, wherein the tumor and histologically matched normal samples are both from the same subject suffering from cancer, and determining mRNA fold change of Tumor versus Normal ($Fc_n$ TvN) for each of the 9 genes of the gene signature;
(b) determining the intensity of gene expression in the tumor sample ($I_n$ T) for each of the 9 genes of the gene signature;
(c) determining the fold of log 2 (Fc, TvN) multiplied by log 1.1 ($I_n$ T) for each of the 9 genes of the gene signature and, based on a linear regression, determining a predicted PFS, the predicted PFS being indicative of the clinical outcome or the response of the subject to trametinib.

Preferably, when the anti-cancer therapy is a FGFR inhibitor, the method comprises:
(a) providing mRNA expression level of each gene of the following gene signature: FGF10, FGF16, FGF5, FGF2 and FGF13 in a tumor sample and a histologically matched normal sample, wherein the tumor and histologically matched normal samples are both from the same subject suffering from cancer, and determining the mRNA fold change of Tumor versus Normal (Fc, TvN) for each gene of the 5 genes of the gene signature;
(b) determining the intensity of gene expression in the histologically matched normal sample ($I_n$ N) for each of the 5 genes of the gene signature;
(c) determining the sum of log 2 ($Fc_n$ TvN) multiplied by log 1.1 and sum of log 2 ($Fc_n$ TvN) multiplied by log 1.1 ($I_n$ N) for each of the 5 genes of the gene signature, and based on a linear regression, determining a predicted PFS, the predicted PFS being indicative of the clinical outcome or the response of the subject to the FGFR inhibitor.

In particular, the cancer is selected from the group consisting of prostate cancer, bladder cancer, breast cancer, colon cancer, colorectal cancer, Esophagus cancer, hypopharynx cancer, gastric cancer, rectum cancer, head and neck cancer, liver cancer, brain cancer, hepatocarcinoma, kidney cancer, ovarian cancer, cervical cancer, pancreatic cancer, Leiomyosarcoma, Liposarcoma, lung cancer, lymphoma, osteosarcoma, melanoma, neuroendocrine cancer, pleural cancer, Rhabdomyosarcoma, Small Intestine neuroendocrine cancer, endometrial cancer, soft tissue cancer, non-small cell lung carcinomas (NSCLC), metastatic non-small cell lung cancer, muscle cancer, adrenal cancer, thyroid cancer, uterine cancer, advanced renal cell carcinoma (RCC), and sub ependymal giant cell astrocytoma (SEGA) associated with tuberous sclerosis (TS).

The invention finally concerns the use of a kit comprising means for measuring the mRNA expression level of a gene signature selected from the group consisting of:
i) a gene signature comprising AKT2, TSC1, FKB-12, TSC2, RPTOR, RHEB, PIK3CA and PIK3CB;
ii) a gene signature comprising KITLG and KIT;
iii) a gene signature comprising ERK2, ARAF, CRAF, MEK1, MEK2, HRAS, ERK1, MAPK10 and KSR1;
iv) a gene signature comprising NRG4 and NRG2;
v) a gene signature comprising FGF10, FGF16, FGF5, FGF2 and FGF13; and
vi) a gene signature comprising TLR4, PDL2, PDL1, CD16, CTLA4 and CD28.
for (a) predicting the clinical outcome of a subject suffering from cancer and undergoing anti-cancer therapy, (b) predicting the response of a subject to an anti-cancer therapy and/or (c) determining whether a subject suffering from cancer is susceptible to benefit from an alternative anti-cancer therapy.

Preferably, (i) when the anti-cancer therapy is everolimus, the gene signature comprises, essentially consists in or consists in AKT2, TSC1, FKB-12, TSC2, RPTOR, RHEB, PIK3CA and PIK3CB;
(ii) when the anti-cancer therapy is axitinib, the gene signature comprises, essentially consists in or consists in KIT and KITLG;
(iii) when the anti-cancer therapy is afatinib, the gene signature comprises, essentially consists in or consists in NRG4 and NRG2;
(iv) when the anti-cancer therapy is trametinib, the gene signature comprises, essentially consists in or consists in ERK2, ARAF, CRAF, MEK1, MEK2, HRAS, ERK1, MAPK10 and KSR1;
(v) when the anti-cancer therapy is a PD-1/PD-L1 inhibitor, the gene signature comprises, essentially consists in or consists in TLR4, PDL2, PDL1, CD16 (NK), CTLA4 and CD28;
(vi) when the anti-cancer therapy is a FGFR inhibitor, the gene signature comprises, essentially consists in or consists in FGF10, FGF16, FGF5, FGF2 and FGF13.

DETAILED DESCRIPTION OF THE INVENTION

Definitions

The term "cancer" or "tumor", as used herein, refers to the presence of cells possessing characteristics typical of cancer-causing cells, such as uncontrolled proliferation, and/or immortality, and/or metastatic potential, and/or rapid growth and/or proliferation rate, and/or certain characteristic morphological features. This term refers to any type of malignancy (primary or metastases) in any type of subject. It may refer to solid tumor as well as hematopoietic tumor.

The term "cancer sample" or "tumor sample" refers to any sample containing tumor cells derived or retrieved from a patient or a subject. $I_n$ particular, tumor cells may be obtained from fluid sample such as blood, plasma, urine and seminal fluid samples as well as from biopsies, organs, tissues or cell samples. $I_n$ a preferred embodiment, tumor cells are obtained from tumor biopsy or resection sample from the patient. Cancer tissues are particularly composed of cancer cells and the surrounding cancer stromal cells, vascular endothelial cells, and immune cells, in addition to the extracellular matrix. Preferably, the sample contains only tumor cells. Preferably the cancer sample contains nucleic acids and/or proteins. Optionally, samples containing tumor cells may be treated prior to their use. As example, a tumor cell enrichment sorting may be performed. It may be fresh, frozen or fixed (e.g. formaldehyde or paraffin fixed) sample.

As used herein, the terms "subject", "individual" or "patient" are interchangeable and refer to an animal, preferably to a mammal, even more preferably to a human. However, the term "subject" can also refer to non-human animals, in particular mammals such as dogs, cats, horses, cows, pigs, sheep and non-human primates, among others.

Within the context of this invention, "responder", "responsive" or "have a therapeutic benefit" refers to a subject who responds to a treatment of cancer, for example such as the volume of the tumor is decreased, at least one of his symptoms is alleviated, or the development of the cancer is stopped, or slowed down. Typically, a subject who responds to a cancer treatment is a subject who will be completely treated (cured), i.e., a subject who will survive cancer or a patient that will survive longer. A subject who responds to a cancer treatment is also, in the sense of the present invention, a subject who have an overall survival higher than the mean overall survival known for the particular cancer, in particular in the absence of a treatment or in the presence of unsuitable treatment. It is also intended to refer to a patient who shows a good therapeutic benefit from a treatment, that is to say a longer disease-free survival, a longer overall survival, a decreased metastasis occurrence, a decreased tumor growth and/or a tumor regression in comparison to a population of patients suffering from the same cancer, in particular in the absence of a treatment.

Within the context of this invention, "non-responder" refers to a subject who does not respond to an anti-cancer treatment, for example such as the volume of the tumor does not substantially decrease, or the symptoms of the cancer in the subject are not alleviated, or the cancer progresses, for example the volume of the tumor increases and/or the tumor generates local or distant metastasis. The terms "non-responder" also refers to a subject who will die from cancer, or will have an overall survival lower than the mean overall survival known for the particular cancer. By "poor responder" or "non-responder" is intended a patient who shows a weak therapeutic benefit of the treatment, that is to say a shorter disease-free survival, a shorter overall survival, an increased metastasis occurrence and/or an increased tumor growth in comparison to a population of patients suffering from the same cancer and having the same treatment.

As used herein, the term "diagnosis" refers to the determination as to whether a subject is likely to be affected by a cancer or to the determination of whether a subject is susceptible to benefit from a treatment. The skilled artisan often makes a diagnosis on the basis of one or more diagnosis markers, the presence, absence, or amount of which is indicative of the presence or absence of the cancer. By "diagnosis", it is also intended to refer to the provision of information useful for the diagnosis of cancer, for the prognosis of patient survival or for the determination of the response of a patient to an anti-cancer treatment.

As used herein, the term "marker" or "biomarker" refers to a measurable biological parameter that helps to predict the occurrence of a cancer or the efficiency of an anti-cancer treatment. It is in particular a measurable indicator for predicting the clinical outcome of a patient undergoing anticancer therapy or the response of a subject having cancer to an anti-cancer therapy.

A "gene signature" or "gene expression signature", as used herein, is a group of genes in a sample with a uniquely characteristic pattern of gene expression. I$_n$ particular, the gene signature corresponds to the deregulation of specific genes, in particular, overexpression or under-expression of genes. The gene expression signature is correlated to the response of a subject to an anti-cancer treatment or to the clinical outcome of a patient under anti-cancer treatment. Preferably, the gene signature profile of a patient suffering from cancer is assessed and compared between a cancer sample and a histologically matched normal sample from the same patient. When defining a gene signature, "comprising" means that the gene signature may comprise additional genes, in particular less than 30, 25, 20, 15, 10 or 5 additional genes. When defining a gene signature, "essentially consist in" means that the gene signature may comprise 1, 2, 3 or 4 additional genes. When defining a gene signature, "consist in" means that the gene signature does not include any additional gene.

By "histologically matched normal sample" or "matched normal sample" or "matched normal control" is meant herein a sample that corresponds to the same or similar organ, tissue or fluid as the cancer sample to which it is compared. For example, in the case of a breast cancer, a histologically matched normal sample can be a matching normal adjacent mammary tissue sample. Alternatively, when the tumor sample is a lung cancer, the histologically matched normal sample is for example a sample from normal bronchial mucosa. Further examples are provided here below, in particular under the "Patients and tumor" paragraph.

The term "treatment" refers to any act intended to ameliorate the health status of patients such as therapy, prevention, prophylaxis and retardation of the disease or of the symptoms of the disease. It designates both a curative treatment and/or a prophylactic treatment of a disease. A curative treatment is defined as a treatment resulting in cure or a treatment alleviating, improving and/or eliminating, reducing and/or stabilizing a disease or the symptoms of a disease or the suffering that it causes directly or indirectly. A prophylactic treatment comprises both a treatment resulting in the prevention of a disease and a treatment reducing and/or delaying the progression and/or the incidence of a disease or the risk of its occurrence. In certain embodiments, such a term refers to the improvement or eradication of a disease, a disorder, an infection or symptoms associated with it. In other embodiments, this term refers to minimizing the spread or the worsening of cancers. Treatments according to the present invention do not necessarily imply 100% or complete treatment. Rather, there are varying degrees of treatment of which one of ordinary skill in the art recognizes as having a potential benefit or therapeutic effect.

As used herein, the terms "clinical outcome" and "prognosis" are interchangeable and refer to the determination as to whether a subject is likely to be affected by a cancer relapse, recurrence or metastasis, or death. These terms also relate to the survival, in particular the overall survival. "Overall survival" (OS) as used herein refers to the time span from starting the treatment until cancer specific death of the patient. "Progression-free survival" (PFS) is "the length of time during and after the treatment of a disease, such as cancer, that a patient lives with the disease but it does not get worse".

The terms "kit", "product" or "combined preparation", as used herein, defines especially a "kit of parts" in the sense that the combination partners (a) and (b), as defined in the present application can be dosed independently or by use of different fixed combinations with distinguished amounts of the combination partners (a) and (b), i.e. simultaneously or at different time points. The parts of the kit of parts can then be administered simultaneously or chronologically staggered, that is at different time points for any part of the kit of parts. The ratio of the total amounts of the combination partner (a) to the combination partner (b) to be administered in the combined preparation can be varied. The combination partners (a) and (b) can be administered by the same route or by different routes.

The term "and/or" as used herein is to be taken as specific disclosure of each of the two specified features or components with or without the other. For example, "A and/or B" is to be taken as specific disclosure of each of (i) A, (ii) B and (iii) A and B, just as if each is set out individually.

The term "a" or "an" can refer to one of or a plurality of the elements it modifies (e.g., "a reagent" can mean one or more reagents) unless it is contextually clear either one of the elements or more than one of the elements is described.

The term "about" as used herein in connection with any and all values (including lower and upper ends of numerical ranges) means any value having an acceptable range of deviation of up to +/−10% (e.g., +/−0.5%, +/−1%, +/−1.5%, +/−2%, +/−2.5%, +/−3%, +/−3.5%, +/−4%, +/−4.5%, +/−5%, +/−5.5%, +/−6%, +/−6.5%, +/−7%, +/−7.5%, +/−8%, +/−8.5%, +/−9%, +/−9.5%). The use of the term "about" at the beginning of a string of values modifies each of the values (i.e. "about 1, 2 and 3" refers to about 1, about 2 and about 3) Further, when a listing of values is described herein (e.g. about 50%, 60%, 70%, 80%, 85% or 86%) the listing includes all intermediate and fractional values thereof (e.g., 54%, 85.4%).

Digital Display Precision Predictor (DDPP)

In a first aspect, the invention concerns a Digital Display Precision Predictor (DDPP).

The Digital Display Precision Predictor (DDPP), a novel biomarker strategy and tool, is based on exploitation of the dual tumor and organ matched normal tissue biopsy transcriptomics. The concept for DDPP is grounded in modeling of the interaction between the dynamics of the networks regulating normal biological systems and their disturbances in cancer, and the specific mechanisms of actions of drugs investigated. The methodology used to build DDPP is derived from the Euclidian hyperspace mathematical model in which the distance between different outcomes can be defined using multiple coordinates. The cornerstone of the Euclidian model's application to precision oncology and to DDPP is the identification of the optimal coordinates, which are defined as the mechanism-based key genes that govern sensitivity to each of the targeted medications investigated. The specific coordinates (genes) create a multi-dimensional vector space, in which each vector is defined by the fold change in expression of each specific key gene in the tumor and in the analogous organ-matched normal tissue, multiplied by scalars (intensities of the expression in tumor or in analogous normal tissues, reflecting the steady state level of mRNAs of the key genes). Increasing the number of coordinates increases the accuracy of measuring the distances between different clinical outcomes, resulting in an increase in the power of the prediction model applied for each individual patient. The cornerstone of this model's application to precision oncology is the mechanism-based, knowledge-driven definition of the key genes that govern sensitivity to each of the targeted medications investigated, as well as study of their differential expression between the tumor and analogous organ matched normal tissues for each patient and each type of tumor. This investigation led to definition of a high number of transcriptomic variables that became coordinates of the patients' tumors in the Euclidian "biologic" hyperspace and enabled precise associations with overall survival under treatment with each specific drug. The utilization of a high number of coordinates further empowered the establishment of a predictor model—DDPP—for the efficacy of each the targeted agents. This methodology differentiates DDPP from any existing methodology, since existing approaches use uni-dimensional biologic coordinates (e.g., specific DNA aberrations, tumor mutation burden or PDL1 expression or microsatellite stability status etc.) to predict outcome, requiring a very high number of patients to reach significance, but nevertheless lacking predictive precision in individual patients because of the complex portfolio of confounders found in individual tumors.

The differential tumor versus analogous normal tissue expression of these genes was used for elaborating the prototype of the DDPP decision support tool. The inventors explored the fold changes, measuring the differential tumor versus normal gene expression of the key genes selected for each drug, which created different vectors/coordinates and correlated these data with progression-free survival (PFS) in patients treated in WINTHER trial. However, as the same fold change can be obtained with different intensity levels, the inventors explored, the fold changes in tumor versus normal multiplied by the intensity of the expression in tumor or in normal tissues (scalars).

The DDPP algorithm can generate two types of results: 1) a digital visualization through tumor versus normal tissue expression intensity plots enabling an understanding of the interactions between the key genes and an estimate of their contributive weight; and 2) an outcome predictor generating, for each drug, the vectorial summation of the contributive genes and a regression model for the correlation between differential tumor to normal gene expression and PFS under treatment. The inventors investigated the DDPP profiles of key genes and examined the correlations with PFS for patients who received monotherapy with everolimus and axitinib for whom transcriptomic and PFS data were available. Similar work was performed for patients treated with other therapies in the WINTHER trial such as trametinib (MEK inhibitor); afatinib (pan-HER inhibitor), two experimental FGFR inhibitors (BGJ398 and TAS-120) with a similar mechanism of action, as well as for patients treated with anti-PD1/PDL1 monoclonal antibodies (pembrolizumab, nivolumab and/or atezolizumab).

Then, the susceptibility to have a therapeutic benefit of a treatment with an anti-cancer therapy for a particular subject suffering from a cancer can be assessed based on the expression of the genes encoding the key players in the tumor and a normal histologically matched sample from the same subject and their expression intensity in the tumor sample.

Accordingly, the present invention relates to a method for selecting a gene signature being indicative of a therapeutic benefit of an anti-cancer therapy in a patient or of the clinical outcome of a patient, wherein the method comprises:

providing, for several patients having a cancer and being treated with the same anti-cancer therapy and for which the clinical outcome is known, mRNA expression level in a tumor sample and a histologically matched normal sample of each gene of a set of n key genes known to be involved in the anti-cancer therapy; and wherein the tumor and normal histologically matched samples are from the same subject;

determining a mRNA fold change of Tumor versus Normal (Fc, TvN) for each gene of the set of n key genes;

multiplying the $Fc_n$ TvN by expression intensity of the gene ($I_n$), either in the tumor sample ($I_n$ T) or in the histologically matched normal sample ($I_n$ N) or both, thereby determining a function ($Fg_n$) for each gene of the set of n key genes;

determining, for each gene of the set of n key genes, a correlation between the $Fg_n$ and the clinical outcome, and ranking the genes based on the correlation from the most correlated to the less correlated to the clinical outcome;

combining 2 to n genes of the set of n key genes with an increment of 1, the genes being selected in the ranking order from the most correlated to the less correlated, and determining the correlation between each combination and the clinical outcome; and selecting the combination of genes best correlated with the clinical outcome, thereby providing a gene signature indicative of a therapeutic benefit with the anti-cancer therapy or of the clinical outcome of the patient.

Preferably, the present invention relates to a method for selecting a gene signature for which the differential expression between a tumor sample and a normal histologically matched sample from the same patient is indicative of a therapeutic benefit of a treatment with an anti-cancer therapy or of the clinical outcome of the patient, comprising:

1. identifying a set of n key genes known to be involved in a mechanism of the anti-cancer therapy,
2. selecting a group of patients with available transcriptomics data and clinical outcome under treatment with said anti-cancer therapy;
3. providing mRNA expression level in a tumor sample and a histologically matched normal sample from the same patient for each gene of the set of n key genes identified in (1), and determining a mRNA fold change of Tumor versus normal ($Fc_n$ TvN) for each gene of the set of n key genes;
4. for each gene of the n key genes, multiplying the $Fc_n$ TvN by expression intensity of the gene ($I_n$) in the tumor sample ($I_n$ T) and multiplying the $Fc_n$ TvN by expression intensity of the gene ($I_n$) in the histologically matched normal sample ($I_n$ N), thereby determining a $Fg_n$ with $I_n$ T and a $Fg_n$ with $I_n$ N;
5. determining a correlation between $Fg_n$ with $I_n$ T and the clinical outcome of the selected patients and between $Fg_n$ with $I_n$ N and the clinical outcome of the selected patients;
6. selecting the best correlation between $Fg_n$ with $I_n$ T and $Fg_n$ with $I_n$ N and keeping it as $Fg_n$ for the following steps;

7. ranking the genes of the n key genes according to the correlation of $Fg_n$ with the clinical outcome, the highest correlation (Fg) being ranked first;
8. adding to the Fg ranked first, one by one, the Fg of other genes of the set of n key genes until all key genes are present thereby obtaining genes combinations, and determining the correlation between each of the combinations of 2 to n genes of the set of n key genes and the clinical outcome;
9. selecting the combination having the best correlation, thereby providing a gene signature indicative of a therapeutic benefit with the anti-cancer therapy or of the clinical outcome of the patient treated with the anti-cancer therapy.

Then, in a first step, the key genes of a drug to be taken into consideration in the method of the present invention are selected, particularly based on recent literature and based on the FDA US Prescribing Information (USPI). Preferably, the number of key genes is at least 5, 6, 7, 8, 9, 10, 11, 12, 13, 14, 15, 16, 17, 18, 19 or 20 key genes but less than 50, 40, 30 or 20 key genes. The key genes for a drug can be, without being limited thereto, any gene involved in the drug mechanism of action, involved in the drug metabolism, having a modified gene expression in presence of the drug, associated with a drug resistance, associated with a drug toxicity. The choice of the key genes can be based on searches in public databases (such as CTD, DrugBank, PubMed, and the like) in order to identify the genes associated with each drug. For instance, the key genes could be selected based on the CTD (The Comparative Toxicogenomics Database, see World Wide Web: ctd.mdibl.org/) data for a selection of drugs and their molecular targets (genes), restricted to the human species (ID 9606). These data can be crossed with genes' information from LocusLink (gene symbol, RefSeq NM, gene description).

The clinical outcome used in the method is a mean to assess the therapeutic effect of a drug in a patient. Several clinical outcomes could be used such as overall survival (OS), or progression-free survival (PFS). Alternatively, other criteria for assessing the clinical outcome could be used, for instance the classification according to Response evaluation criteria in solid tumors (RECIST), such as the time before recurrence or PD (progressive disease).

For instance, selection of the patients with available transcriptomics data and clinical outcome (PFS) under treatment with each drug available can be assessed using data from publicly available clinical trial, such as found in clinicaltrials.gov, for example. Patients can be retrieved from the same or different clinical trials, so long they have been receiving the same or similar anti-cancer treatment. This information is provided for a group of patients having a cancer and receiving, having received and planned to receive the same or similar anti-cancer therapy. The group of patients may include 3, 4, 5, 6, 7, 8, 9, 10, 15, 20, 30, 40, or 50 patients or more. By "similar anti-cancer therapy", it is intended that the anti-cancer therapy has the same target, i.e., PD-1/PD-L1, PD-L2, tyrosine kinase or FGFR. By the "same anti-cancer therapy", it is intended that the anti-cancer therapy is the same molecule (e.g. everolimus) or antibody (e.g. pembrolizumab). Preferably, the results of at least 3 patients that have received the same or similar treatment (for example such as a TKI, or a particular TKI such as everolimus) are included in the group of patients. Anti-cancer therapies are particular provided here below under the paragraph "Anti-cancer therapy".

Then, for each of the n key genes of a drug, a fold change ($Fc_n$ TvN) of the mRNA expression level in a tumor sample and in a normal histologically matched sample for the same patient of the selected group of patients. The method comprises providing mRNA expression level in a tumor sample and a normal histologically matched sample for each gene of the set of key genes and for each patient. These samples are more particularly described hereafter under the paragraph "Patients and Tumor".

The expression levels are determined by measuring mRNA level. The determination of the expression level variation for these mRNA is carried out by comparing the expression levels in a tumour tissue and in the corresponding normal tissue.

Determining the expression levels of one or more marker genes may be carried out by any method such as, but not limited to, Northern analysis, mRNA or cDNA microarrays, polymerase chain reaction (PCR), quantitative or semi-quantitative RT-PCR, real time quantitative or semi-quantitative RT-PCR, enzyme-linked immunosorbent assay (ELISA), magnetic immunoassay (MIA), flow cytometry, microarrays, ligase chain reaction (LCR), transcription-mediated amplification (TMA), strand displacement amplification (SDA) and nucleic acid sequence based amplification (NASBA) or any such methods known in the art. In some embodiments, the method comprises the determination of the expression profile of a cancer and/or normal sample having probes to a specific set of genes or proteins.

Alternatively, the level of expression can be determined with a ship comprising a set of primers or probes specific for the set of genes. In particular embodiments, one or more microarray may be used to measure the expression level of one or more genes of the set of key genes simultaneously.

Expression levels obtained from cancer and normal samples may be normalized by using expression levels of proteins which are known to have stable expression such as RPLPO (acidic ribosomal phosphoprotein PO), TBP (TATA box binding protein), GAPDH (glyceraldehyde 3-phosphate dehydrogenase) or β-actin.

In a preferred aspect, a gene is overexpressed when the fold change between the tumor sample and the normal histologically matched sample is higher than 1.3, a gene is expressed at a similar level when the fold change is between-1.3 and 1.3, and a gene is under-expressed when the fold change is lower than-1.3. However, different threshold of fold change may also be used, for instance a first class with a fold change higher than x, a second class with a fold change is between −x and x, and a third class with a fold change lower than −x, x being a number between 1 and 5, preferably between 1 and 4, between 1 and 3 or between 1 and 2. For instance, x could be 1, 1.1, 1.2, 1.3, 1.4, 1.5, 1.6, 1.7, 1.8, 1.9 or 2.

Optionally, the mRNA fold change of a gene can be corrected by considering the expression of the miRNA of the gene in order to adjust possible miRNA intervention in translation. More preferably, a mean miRNAs fold change for each gene is calculated as the average of the miRNA fold changes between the tumor sample and the normal histologically matched sample for the gene. Then, a corrected mRNA fold change is calculated by dividing the mRNA fold change between the tumor sample and the normal histologically matched sample of the gene (mRNA TvN fold change) by the mean fold change for the miRNAs of the gene (mean miRNA TvN fold change), and the corrected mRNA fold change of the gene is then used in the method for classifying the genes into the three classes. Levels of miRNAs for the genes are determined in the tumor and normal samples. The miRNAs most likely to be involved in the gene expression regulation can be determined by using Target scan {See World Wide Web: targetscan.org/}. The method for measuring miRNA are well-known in the art.

This fold change (Fc, TvN) is then multiplied by the intensity of the expression and the result is called Fg, and more particularly $Fg_n$ for a gene n. Optionally, the Fg or $Fg_n$ is calculated with the intensity of the expression of a gene n in the tumor sample ($Fg_n$ with $I_n$ T) and/or with the intensity of the expression of a gene n in the normal histologically matched sample ($Fg_n$ with $I_n$ N).

Another information that will be used in the method of the present invention are the intensity of the mRNA expression in tumor and in histological matched normal tissue from the same patients. The intensity can be assessed by measuring the signal that can be detected using of the microarrays technologies that enable to assess the Relative Fluorescent Units, whose value correlates with the steady state level of the mRNA. Detection can be performed also by RNAseq technologies (such as Next generation sequencing) and the intensities are assessed by the counts of the number of reads (tag), which also correlates with the steady state levels of the mRNA studies. Globally, technologies used enable to identify and measure the intensities/expression levels of all the types of mRNA (and/or miRNA). Several technologies are exemplified, Agilent Microarrays, Affymetrix microarrays, Illumina RNAseq, and many others, including but not limited to RT-QPCR, Nanostring etc. The intensities measured in tumor tissues divided by the intensities measured in Normal tissues generates the Fold change of mRNAs and/or miRNAs intensity. The analysis may involve the measurement of an intensity of a signal received from a labeled cDNA or cRNA derived from a sample obtained from cancerous and/or normal sample. $I_n$ some embodiments, the intensity of the signal received and measured is proportional to the amount (e.g. quantity) of cDNA or cRNA, and thus the mRNA derived for the target gene in the cancerous and/or normal sample. Preferably, the mRNA fold change is multiplied by the mRNA fold change intensity.

Optionally, the expression intensity of each gene of the gene signature is measured as relative fluorescence unit (RFU).

In a particular aspect, $Fg_n = \log2(Fc_n \text{ TvN}) * \log 1.1(I_n \text{ N or } I_n \text{ T})$ wherein $Fc_n$ TvN is as defined above, the fold change of mRNA expression of the gene n between a tumor sample and a normal histologically matched sample for the same patient, $I_n$ is the intensity of the expression, $I_n$ T in the tumor sample, $I_n$ N in the normal histologically matched sample.

Then, the correlation of Fgn and the clinical outcome is determined for each gene of the n key genes. In a preferred aspect, the correlation is determined by a Pearson test and the key genes are ranked based on the p-value. More particularly, the most correlated gene is ranking first and so on.

In a preferred aspect, the Fg or $Fg_n$ is calculated with the intensity of the expression of a gene n in the tumor sample ($Fg_n$ with $I_n$ T) and with the intensity of the expression of a gene n in the normal histologically matched sample ($Fg_n$ with $I_n$ N). Then, based on the results of the correlation with the clinical outcome, either $Fg_n$ with $I_n$ T or $Fg_n$ with $I_n$ N is selected for the following, the most correlated among $Fg_n$ with $I_n$ T and $Fg_n$ with $I_n$ N being selected. $I_n$ the aspect, only the selected $Fg_n$ with $I_n$ T or $Fg_n$ with $I_n$ N is used for ranking the key genes.

Once the key genes are ranked, they are combined in order to identify the best combination which has the highest correlation with the clinical outcome. Combinations of 2 to n genes of the set of key genes with an increment of 1, in particular such as combinations of 2, 3, 4, 5, 6, 7, 8, 9, 10, 11, 12, 13, 14 or 15 genes, are carried out, the genes being selected in the ranking order from the most correlated to the less correlated, and the correlation of the combination to the clinical outcome is determined for each combination.

Accordingly, the gene ranked first is combined with the gene ranked second. Then, the two first ranked genes are combined with the gene ranked third; the three first ranked genes are combined with the gene ranked fourth; and so on. This provides a correlation score of each of the different combinations.

The correlation of the combinations can be calculated by five different methods: mean, median, sum and fold (the absolute value or the non-absolute value) of the $Fg_n$ with $I_n$ T or $Fg_n$ with $I_n$ N. Optionally, the correlation of the combinations is calculated by 1, 2, 3, 4 or 5 of these methods.

Then, the best correlation to the clinical outcome is selected and the genes of the combination with the best correlation define the gene signature for which the differential expression between a tumor sample and a normal histologically matched sample from the same patient is indicative of a therapeutic benefit of a treatment with the anti-cancer therapy or to the best clinical outcome of the patient.

More particularly, the best correlation is associated with a linear regression. This allows to associate the results not solely to black and white prediction (e.g., responder or non-responder), but with a degree of response.

By applying this method, the inventors identified a gene signature for several drugs.

Once the optimal gene signature has been determined, it can be used for determining the clinical outcomes of patients under a particular anti-cancer treatment and to predict if the patient will benefit from a particular anti-cancer treatment.

Optimal Gene Signatures

Thanks to the DPPI, the inventors highlighted specific pattern of gene expression, which is characteristic of, or correlated with, the response to an anti-cancer treatment and to the clinical outcome of a patient. The gene expression signature is particularly represented by a set of informative genes, or transcripts thereof, coding or non-coding or both. The expression levels of the transcripts within the signatures can be evaluated to make a prognostic determination with, but not limited to, the methods provided here below.

The gene signature according to the invention comprises, essentially consists in or consists in genes as disclosed herein, in particular:
i) AKT2, FKB-12, TSC1, TSC2, RPTOR, RHEB, PIK3CA and PIK3CB;
ii) KITLG and KIT;
iii) ERK2, ARAF, CRAF, MEK1, MEK2, HRAS, ERK1, MAPK10 and KSR1;
iv) NRG4 and NRG2;
v) FGF10, FGF16, FGF5, FGF2 and FGF13; or
vi) TLR4, PDL2, PDL1, CD16, CTLA4 and CD28;

In one aspect, the gene signature comprises, consists essentially of, or consists of the genes AKT2, TSC1, TSC2, FKB-12, RPTOR, RHEB, PIK3CA and PIK3CB. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a tyrosine kinase inhibitor, in particular a mTOR inhibitor, especially everolimus. In a very particular, the correlation with the responsiveness or the outcome is based on the absolute value of the fold of $Fg_n$, n being each gene among AKT2, TSC1, TSC2, FKB-12, RPTOR, RHEB, PIK3CA and PIK3CB, and $Fg_n$ being log 2 (Fc, TvN)*log 1.1 ($I_n$ T). The higher is the absolute value of the fold of $Fg_n$ as calculated with the gene signature, the better is the responsiveness or the outcome, in particular the PFS.

As used herein, the terms "AKT2", "AKT Serine/Threonine Kinase 2", "V-Akt Murine Thymoma Viral Oncogene Homolog 2", "RAC-Beta Serine/Threonine-Protein Kinase" and "PKB Beta" are used interchangeably and refer to the human AKT2 gene, for example such as described under the Uniprot reference P49815 or GeneCard ID: GC19M040230.

As used herein, the terms "FKBP1A", "FKB-12", "FKBP Prolyl Isomerase 1A", "Peptidyl-Prolyl Cis-Trans Isomerase FKBP1A", "FK506 Binding Protein 1A", "Immunophilin FKBP12", "PPIase FKBP1A", "Calstabin-1", "Protein Kinase C Inhibitor 2 (PKCI2)" are used interchangeably and refer to the human FKBP1A gene, for example such as described under the Uniprot reference P62942 or the GeneCard ID GC20M001369.

As used herein, the terms "TSC1", "TSC Complex Subunit 1", "Tuberous Sclerosis 1 Protein", "Hamartin", "Tuberous Sclerosis 1", "PPP1R160" and "LAM" are used interchangeably and refer to the human TSC1 gene, for example such as described under the Uniprot reference Q92574 or GeneCard ID GC09M132891.

As used herein, the terms "TSC2", "TSC Complex Subunit 2", "Protein Phosphatase 1, Regulatory Subunit 160", "Tuberous Sclerosis 2 Protein", "Tuberin", "Tuberous Sclerosis 2", "PPP1R160" and "LAM" are used interchangeably and refer to the human TSC2 gene, for example such as described under the Uniprot reference P49815 or GeneCard ID GC16P002385.

As used herein, the terms "RPTOR", "Regulatory Associated Protein Of MTOR Complex 1", "Raptor", "P150 Target Of Rapamycin (TOR)-Scaffold Protein Containing WD-Repeats", "KIAA1303", "KOG1", and "Mip1" are used interchangeably and refer to the human RPTOR gene, for example such as described under the Uniprot reference Q8N122 or GeneCard ID: GC17P080544.

As used herein, the terms "RHEB", "Ras Homolog Enriched $I_n$ Brain" and "GTP-binding protein Rheb" are used interchangeably and refer to the human RHEB gene, for example such as described under the Uniprot reference Q15382 or GeneCard ID GC07M151466.

As used herein, the terms "PIK3CA", "Phosphatidylinositol-4,5-Bisphosphate 3-Kinase Catalytic Subunit alpha, "PtdIns-3-Kinase Subunit alpha" and "Phosphatidylinositol 4,5-bisphosphate 3-kinase catalytic subunit alpha isoform" are used interchangeably and refer to the human PIK3CA gene, for example such as described under the Uniprot reference P42336 or the GeneCard ID GC03P179148.

As used herein, the terms "PIK3CB", "Phosphatidylinositol-4,5-Bisphosphate 3-Kinase Catalytic Subunit Beta, "PtdIns-3-Kinase Subunit Beta" and "EC 2.7.1" are used interchangeably and refer to the human PIK3CB gene, for example such as described under the Uniprot reference P42338 or the GeneCard ID GC03M138652.

In a second aspect, the gene signature comprises, essentially consists of or consists of the genes KIT and KITLG. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a tyrosine kinase inhibitor, in particular a VEGFR inhibitor, especially axitinib. $I_n$ a very particular, the correlation with the responsiveness or the outcome is based on the sum of $Fg_n$, n being each gene among KIT and KITLG, and $Fg_n$ being log 2 (Fc$_n$ TvN)*log 1.1 ($I_n$ N). The higher is the absolute value of the fold of $Fg_n$ as calculated with the gene signature, the better is the responsiveness or the outcome, in particular the PFS.

As used herein, the terms "KIT", "KIT Proto-Oncogene, Receptor Tyrosine Kinase", "Tyrosine-Protein Kinase Kit", "Piebald Trait Protein" and "CD117" are used interchangeably and refer to the human KIT gene, for example such as described under the Uniprot reference: P10721 or GeneCard ID: GC04P054657. As used herein, the terms "KITL", "KITLG", "KIT ligand" and "Tyrosine-Protein Kinase Kit Ligand" are used interchangeably and refer to the human KIT gene, for example such as described under the Uniprot reference: P21583 or GeneCard ID: GC12M088492.

In a third aspect, the gene signature comprises, essentially consists of or consists of the genes NRG4 and NRG2. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a tyrosine kinase inhibitor, in particular a pan-HER inhibitor, especially afatinib. $I_n$ a very particular, the correlation with the responsiveness or the outcome is based on the sum of $Fg_n$, n being each gene among NRG4 and NRG2, and $Fg_n$ being log2(Fc, TvN)*log 1.1($I_n$ T). The higher is the absolute value of the fold of $Fg_n$ as calculated with the gene signature, the better is the responsiveness or the outcome, in particular the PFS.

As used herein, the terms "NRG2", "Neuregulin 2", "NTAK", "Neural-and thymus-derived activator for ERBB kinases" and "Pro-Neuregulin-2, Membrane-Bound Isoform", are used interchangeably and refer to the human NRG2 gene, for example such as described under the Uniprot reference: O14511 or GeneCard ID: GC05M139810.

As used herein, the terms "NRG4", "Neuregulin 4", "and "Pro-neuregulin-4, membrane-bound isoform", are used interchangeably and refer to the human NRG2 gene, for example such as described under the Uniprot reference: Q8WWG1 or GeneCard ID: GC15M075935.

In a fourth aspect, the gene signature comprises, essentially consists of or consists of the genes ERK1 (MAPK3), ERK2 (MAPK1), ARAF, CRAF, MEK1 (MAP2K1), MEK2 (MAP2K2), HRAS, MAPK10 and KSR1. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a tyrosine kinase inhibitor, in particular a MEK inhibitor, especially trametinib. In a very particular, the correlation with the responsiveness or the outcome is based on the fold of $Fg_n$, n being each gene among ERK1 (MAPK3), ERK2 (MAPK1), ARAF, CRAF, MEK1 (MAP2K1), MEK2 (MAP2K2), HRAS, MAPK10 and KSR1, and $Fg_n$ being log 2 (Fc$_n$ TvN)*log 1.1 ($I_n$ T). The higher is the absolute value of the fold of $Fg_n$ as calculated with the gene signature, the better is the responsiveness or the outcome, in particular the PFS.

As used herein, the terms "ERK1", "MAPK3", "Mitogen-Activated Protein Kinase 3", are used interchangeably and refer to the human MAPK3 gene, for example such as described under the Uniprot reference: P27361 or GeneCard ID: GC16M030117.

As used herein, the terms "ERK2", "MAPK1", "Mitogen-Activated Protein Kinase 1", are used interchangeably and refer to the human MAPK1 gene, for example such as described under the Uniprot reference: P28482 or GeneCard ID: GC22M021754.

As used herein, the terms "ARAF", "A-Raf Proto-Oncogene, Serine/Threonine Kinas", "Proto-Oncogene A-Raf" are used interchangeably and refer to the human ARAF gene, for example such as described under the Uniprot reference: P10398 or GeneCard ID: GCOXP047562.

As used herein, the terms "CRAF", "RAF1", "Raf-1 Proto-Oncogene, Serine/Threonine Kinase", "C-Raf Proto-Oncogene, Serine/Threonine Kinase" are used interchangeably and refer to the human RAF1 gene, for example such as described under the Uniprot reference: P04049 or GeneCard ID: GC03M012583.

As used herein, the terms "MEK1", "MAP2K1" and "Mitogen-Activated Protein Kinase Kinase 1" are used interchangeably and refer to the human MAP2K1 gene, for example such as described under the Uniprot reference: Q02750 or GeneCard ID: GC15P066386.

As used herein, the terms "MEK2", "MAP2K2", and "Mitogen-Activated Protein Kinase Kinase 2" are used interchangeably and refer to the human MAP2K2 gene, for example such as described under the Uniprot reference: P36507 or GeneCard ID: GC19M004090.

As used herein, the terms "HRAS", "HRas Proto-Oncogene, GTPase", "GTPase HRas" and "Transforming protein p21" are used interchangeably and refer to the human HRAS gene, for example such as described under the Uniprot reference: P01112 or GeneCard ID: GC11M000635.

As used herein, the terms "MAPK10", "Mitogen-Activated Protein Kinase 10", "Stress-activated protein kinase 1b", "SAPK1b" are used interchangeably and refer to the human MAPK10 gene, for example such as described under the Uniprot reference: P53779 or GeneCard ID: GC04M085990.

As used herein, the terms "KSR1" and "Kinase Suppressor Of Ras 1" are used interchangeably and refer to the human KSR1 gene, for example such as described under the Uniprot reference: Q8IVT5 or GeneCard ID: GC17P027456.

In a fifth aspect, the gene signature comprises, essentially consists of or consists of the genes TLR4, PDL1, PDL2, CD16a, CTLA4 and CD28. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a checkpoint inhibitor, in particular an anti-PD-1 antibody or an anti-PD-L1 antibody, especially Pembrolizumab, Nivolumab or Atezolizumab. In a very particular, the correlation with the responsiveness or the outcome is based on the fold of $Fg_n$, n being each gene among TLR4, PDL1, PDL2, CD16a, CTLA4 and CD28, and $Fg_n$ being log 2 (Fc, TvN)*log 1.1 ($I_n$ N). The higher is the absolute value of the fold of Fg, as calculated with the gene signature, the better is the responsiveness or the outcome, in particular the PFS.

As used herein, the terms "TLR4", "Toll Like Receptor 4", "hToll", and "CD284" are used interchangeably and refer to the human TLR4 gene, for example such as described under the Uniprot reference: 000206 or GeneCard ID: GC09P117704.

As used herein, the terms "PDL1", "PD-L1", "PCDCL1", "PD-1-ligand 1", "Programmed cell death 1 ligand 1", and "CD274" are used interchangeably and refer to the human CD274 gene, for example such as described under the Uniprot reference: Q9NZQ7 or Gene ID: 29126.

As used herein, the terms "PDL2", "PD-1-ligand 2", "Programmed Cell Death 1 Ligand 2" are used interchangeably and refer to the human PDL2 gene, for example such as described under the Uniprot reference: Q2LC89 or GeneCard ID: GC09P005510.

As used herein, the terms "CD16a", "Low affinity immunoglobulin gamma Fc region receptor III-A" and "FCGR3A" are used interchangeably and refer to the human CD16A gene, for example such as described under the Uniprot reference: P08637 or GeneCard ID: GC01M161541.

As used herein, the terms "CTLA4", "Cytotoxic T-Lymphocyte Associated Protein 4" and "CD152" are used interchangeably and refer to the human CTLA4 gene, for example such as described under the Uniprot reference: P16410 or GeneCard ID: GC02P203867.

As used herein, the terms "CD28", "T-Cell-Specific Surface Glycoprotein CD28" and "TP44" are used interchangeably and refer to the human CD28 gene, for example such as described under the Uniprot reference: P10747 or GeneCard ID: GC02P203706.

In a sixth aspect, the gene signature comprises, essentially consists of or consists of the genes FGF10, FGF16, FGF5, FGF2 and FGF13. This gene signature can be used as a biomarker for predicting the clinical outcome of a subject suffering from cancer and been treated with an anti-cancer therapy or as a biomarker for predicting the response of a subject suffering from cancer to an anti-cancer therapy. More specifically, the anti-cancer therapy is a tyrosine kinase inhibitor, preferably a FGFR inhibitor, especially BGJ938 or TAS-120. In a very particular, the correlation with the responsiveness or the outcome is based on the fold of $Fg_n$, n being each gene among FGF10, FGF16, FGF5, FGF2 and FGF13, and $Fg_n$ being log 2 ($Fc_n$ TvN)*log 1.1 (I, N). The higher is the absolute value of the fold of $Fg_n$ as calculated with the gene signature, the better is the responsiveness or the outcome, in particular the PFS.

As used herein, the terms "FGF10" and "Fibroblast Growth Factor 10" are used interchangeably and refer to the human FGF10 gene, for example such as described under the Uniprot reference: 015520 or GeneCard ID: GC05M044340.

As used herein, the terms "FGF16" and "Fibroblast Growth Factor 16" are used interchangeably and refer to the human FGF16 gene, for example such as described under the Uniprot reference: 043320 or GeneCard ID: GC0XP077447.

As used herein, the terms "FGF5" and "Fibroblast Growth Factor 5" are used interchangeably and refer to the human FGF5 gene, for example such as described under the Uniprot reference: P12034 or GeneCard ID: GC04P080266.

As used herein, the terms "FGF2" and "Fibroblast Growth Factor 2" are used interchangeably and refer to the human FGF2 gene, for example such as described under the Uniprot reference: P09038 or GeneCard ID: GC04P122826.

As used herein, the terms "FGF13" and "Fibroblast Growth Factor 13" are used interchangeably and refer to the human FGF13 gene, for example such as described under the Uniprot reference: Q92913 or GeneCard ID: GC0XM138615.

Optionally, the gene signature may further comprise additional genes. However, in an aspect, the number of additional genes in the signature is no more than 15, 14, 13, 12, 11, 10, 9, 8, 7, 6, 5, 4, 3, 2 genes.

Anti-Cancer Therapy

The method for determining gene signature disclosed herein and the gene signatures disclosed herein are particularly used herein to assess the responsiveness of a subject to an anti-cancer therapy.

As used herein, the terms "anti-cancer therapy", "anti-cancer treatment" and "anticancer agents" are used interchangeably and refer to compounds which are used in the treatment of cancer, such as chemotherapeutic or immunotherapeutic compounds.

In one aspect, the anticancer therapy is a tyrosine kinase inhibitor. Tyrosine kinase inhibitors are taking up an increasingly significant role in treating cancers, as they act much more specifically toward malignant cells when compared to conventional cytotoxic chemotherapy.

In one aspect, the anticancer therapy is a chemotherapeutic compound or an antibody having a Tyrosine kinase inhibitor activity. The tyrosine kinase may be for instance selected in the following non-exhaustive list: EGFR family, VEGFR family including VEGFR1, VEGFR2, VEGFR3, PDGFR α and β, c-KIT, mTOR, HER2, HER3, HER4, ALK, B-Raf, MEK, FGFR1, FGFR2, FGFR3, FGFR4, FLT3, IGF1R, c-Met, and the like. In a particular aspect, the tyrosine kinase can be mTOR and the inhibitor can be everolimus or Temsirolimus, preferably everolimus. In another particular aspect, the tyrosine kinase can be VEGFR1-3, a PDGFR or c-KIT and the inhibitor can be Axitinib, Agerafenib, Altiratinib, Cabozantinib, Cediranib, Crenolanib, Dasatinib, Imatinib, Lapatinib, Lenvatinib, Masitinib, Motesanib, Nilotinib, Nintedanib, Pazopanib, Pegaptanib, Quizartinib, Radotinib, Rebastinib, Regorafenib, Ripretinib, Semaxanib, Sorafenib, Sunitinib, Trametinib, Tivozanib, Toceranib, Vandetanib, WHI-P 154, Alacizumab pegol, Bevacizumab, Icrucumab, Olaratumab, Ramucirumab, Ranibizumab, or Tovetumab, preferably axitinib. In another additional aspect, the tyrosine kinase can be from the EGFR family (e.g., EGFR, HER2, HER3 or HER4, preferably EGFR) and the inhibitor can be Afatinib, AG-490, Agerafenib, Brigatinib, Canertinib, Dacomitinib, Erlotinib, Gefitinib, Grandinin, Icotinib, Lapatinib, Mubritinib, Neratinib, Osimertinib, Vandetanib, WHI-P 154, Cetuximab, Depatuxizumab, Depatuxizumab mafodotin, Futuximab, Imgatuzumab, Matuzumab, Necitumumab, Nimotuzumab, Panitumumab, Zalutumumab, Ertumaxomab, Pertuzumab, Trastuzumab, Trastuzumab duocarmazine, Trastuzumab emtansine, preferably afatinib.

In one aspect, the anticancer therapy is a tyrosine kinase inhibitor that can be selected from the group consisting of afatinib, axitinib, bosutinib, cabozantinib, cediranib, ceritinib, crizotinib, dabrafenib, dasatinib, erlotinib, everolimus, gefitinib, ibrutinib, imatinib, lapatinib, lenvatinib, lestaurtinib, nilotinib, nintedanib, palbociclib, pazopanib, ponatinib, regorafenib, ruxolitinib, semananib, sirolimus, sorafenib, sunitinib, temsirolimus, tofacitinib, trametinib, vandetanib, and vemurafenib, preferably selected from the group consisting of everolimus, axitinib, afatinib and trametinib.

In one aspect, the anti-cancer therapy is everolimus. Everolimus is a selective inhibitor of mTOR and reduces the levels of vascular endothelial growth factor (VEGF) which potentiates the process of tumor angiogenesis. Everolimus is a potent inhibitor of the growth and proliferation of tumor cells, endothelial cells, fibroblasts and vascular smooth muscle cells and has been shown to reduce tumor cell glycolysis in vitro and in vivo. Everolimus is also known as 42-O-(2-Hydroxyethyl) rapamycin, and under the CAS registry number CAS 159351-69-6.

In another aspect, the anti-cancer therapy is axitinib. Axitinib is a potent and selective tyrosine kinase inhibitor of vascular endothelial growth factor receptors (VEGFR-1, VEGFR-2 and VEGFR-3), involved in pathological angiogenesis, tumor growth and metastatic progression of cancers. Axitinib is also known as compound 319460-85-0, AG-013736, and Inlyta and under the CAS registry number CAS 319460-85-0.

In another aspect, the anti-cancer therapy is afatinib. Afatinib is an antineoplastic agent, and a selective inhibitor of the ErbB family of receptors. Afatinib is also known as N-[4-[(3-chloro-4-fluorophenyl)amino]-7-[[(3S)-tetra-hydro-3-furanyl]oxy]-6-quinazolinyl]-4-(dimethylamino)-2-butenamide or BIBW 2992, and under the CAS registry number CAS 439081-18-2.

In another aspect, the anti-cancer therapy is trametinib. Trametinib is an orally bioavailable inhibitor of mitogen-activated protein kinase kinase (MEK MAPK/ERK kinase) with potential antineoplastic activity. Trametinib is also known as N-[3-[3-cyclopropyl-5-(2-fluoro-4-iodoanilino)-6,8-dimethyl-2,4,7-trioxopyrido[4,3-d]pyrimidin-1-yl]phenyl]acetamide, and under the CAS registry number CAS 871700-17-3 and 1204531-14-5.

In one aspect, the anticancer therapy is an immune checkpoint inhibitor, preferably a PD-1 or PD-L1 inhibitor. Programmed cell death protein 1 (PD-1) inhibitors and programmed death-ligand 1 (PD-L1) inhibitors are a group of checkpoint inhibitor anticancer drugs that block the activity of PD-1 and PDL1 immune checkpoint proteins present on the surface of cells. In the cancer disease state, interaction of PD-L1 on tumor cells with PD-1 on T-cells reduces T-cell function signals to prevent the immune system from attacking and clearing the tumor cells, creating an immunosuppressive environment.

Several anti-PD-1 are already clinically approved and others are still in clinical developments. For instance, the anti-PD1 antibody can be selected from the group consisting of Pembrolizumab (also known as Keytruda lambrolizumab, MK-3475), Nivolumab (Opdivo, MDX-1106, BMS-936558, ONO-4538), Pidilizumab (CT-011), Cemiplimab (Libtayo), Camrelizumab, AUNP12, AMP-224, AGEN-2034, BGB-A317 (Tisleizumab), PDR001 (spartalizumab), MK-3477, SCH-900475, PF-06801591, JNJ-63723283, genolimzumab (CBT-501), LZM-009, BCD-100, SHR-1201, BAT-1306, AK-103 (HX-008), MEDI-0680 (also known as AMP-514) MEDI0608, JS001 (see Si-Yang Liu et al., J. Hematol. Oncol.10:136 (2017)), BI-754091, CBT-501, INCSHR1210 (also known as SHR-1210), TSR-042 (also known as ANB011), GLS-010 (also known as WBP3055), AM-0001 (Armo), STI-1110 (see WO 2014/194302), AGEN2034 (see WO 2017/040790), MGA012 (see WO 2017/19846), or IBI308 (see WO 2017/024465, WO 2017/025016, WO 2017/132825, and WO 2017/133540), monoclonal antibodies 5C4, 17D8, 2D3, 4H1, 4A11, 7D3, and 5F4, described in WO 2006/121168. Bifunctional or bispecific molecules targeting PD-1 are also known such as RG7769 (Roche), XmAb20717 (Xencor), MEDI5752 (AstraZeneca), FS118 (F-star), SL-279252 (Takeda) and XmAb23104 (Xencor).

Several anti-PD-L1 are already clinically approved and others are still in clinical developments. For instance, the anti-PD-L1 antibody can be selected from the group consisting of Atezolizumab (Tecentriq), Avelumab (Bavencio), Durvalumab (Imfinzi), KN035, CK-301 (Checkpoint Therapeutics), AUNP12, CA-170, BMS-986189.

Particularly, the PD-1 or PD-L1 inhibitor is selected from the group consisting of atezolizumab, durvalumab, avelumab, nivolumab, pembrolizumab, pidilizumab, cemiplimab, camrelizumab, sintilimab (IBI308), tislelizumab (BGB-A317), toripalimab (JS 001), dostarlimab (TSR-042, WBP-285), BMS 936559, MPDL3280A, MSB0010718C, MEDI4736 and any combination thereof, preferably nivolumab, pembrolizumab and atezolizumab.

In one aspect, the anticancer therapy is a Fibroblast growth factor receptors (FGFR) inhibitor. FGFR inhibitors can generally be divided into two groups according to their binding behaviors, namely, type I and type II inhibitors.

Particularly, the FGFR inhibitor is selected from the group consisting of Futibatinib (TAS-120, CAS No. 1448169-71-8), Infigratinib (BGJ398, CAS No. 872511-34-7), Ponatinib (AP24534, CAS No. 943319-70-8), Nintedanib (BIBF 1120, CAS No. 656247-17-5), Pazopanib HCl (GW786034, CAS No. 635702-64-6), PD173074 (CAS No. 219580 Nov. 7), Dovitinib (TKI-258, CAS No. 405169-16-6), AZD4547 (CAS No. 1035270-39-3), Sorafenib Tosylate (CAS No. 475207-59-1), Erdafitinib (CAS Number. 1346242-81-6), pemigatinib (CAS: 1513857-77-6) and any combination thereof. Preferably, the FGFR inhibitor is Futibatinib or Infigratinib. Other examples of FGFR inhibitors are provided in Dai et al., Cells. 2019 June; 8 (6): 614, doi: 10.3390/cells8060614) and are incorporated by reference.

Use of the Gene Signature and Prediction Methods

The methods and the gene signature as disclosed herein can be used to predict a response to a cancer treatment and/or to predict the clinical outcome of a patient. The cancer treatment can be any treatment including, but not limited, to the treatments and therapies described here above, in particular under the "anti-cancer therapy" paragraph. Examples of cancers are provided here below, in particular under the "Patient and Tumor" paragraph.

The invention is particularly directed to predicting the response of a subject suffering from cancer to anti-cancer therapy, such as a tyrosine kinase inhibitor, a FGFR inhibitor or a PD-1/PD-L1 inhibitor, by identifying a number of genes whose expression patterns are modified or modulated. In embodiment of the invention is directed to predicting the response of a subject suffering from cancer to a tyrosine kinase inhibitor, a FGFR inhibitor or a PD-1/PD-L1 inhibitor, by identifying a number of genes whose expression patterns are modified. By determining the expression levels of genes that exhibit modulated expression in a cancerous sample compared to a normal sample, an expression profile or a genetic signature for particular may be determined and used to predict the efficacy of the tyrosine kinase inhibitor, FGFR inhibitor or PD-1/PD-L1 inhibitor, or to predict the clinical outcome of a patient. In particular, the expression profile of the gene signature disclosed herein may allow to determine the prognosis of the patient and/or the likelihood that a patient will respond to a specific form of therapy, such as, for example, Tyrosine kinase inhibitors, FGFR inhibitors or PD-1/PD-L1 inhibitors, such as disclosed hereabove.

In some aspects, the method comprises developing a genetic profile from the marker genes. In some aspects, the genetic profile comprises determining the expression levels of one or more biomarkers of a gene signature such as described herein. The response to this prediction tests can be whether the cancer is responsive or non-responsive to a particular anti-cancer therapy, or if the patient will benefit to a particular anticancer therapy, or if the clinical outcome (i.e. the overall survival of the patient) is or not increased. In some embodiments, the method further comprises providing treatment to patients whose expression profile matches or nearly matches a predetermined expression profile that indicates that a patient will respond to the anti-cancer treatment.

In some aspects, a method to determine or predict therapeutic sensitivity of a cancer comprises determining the expression level of one or more biomarkers composing the gene signature disclosed herein, preferably of all genes of the gene signature. In particular, the gene expression levels of a cancer sample are compared to gene expression levels from a normal sample, in particular a cell or tissue known to be free of, or suspected to be free of cancer, in particular from the same patient, in particular a histologically matched normal sample from the patient.

Determining the expression level for any one marker gene or gene signature such as those identified above and/or expression profile for any markers or gene signature can be carried out by any method known in the art and may vary among embodiments of the invention.

In a gene signature, genes can be differentially expressed in cancerous tissue and normal tissue and can for example be either up regulated or down regulated or expressed at a similar level. Up regulation and down regulation are relative terms meaning that a detectable difference, beyond the contribution of noise in the system used to measure it, may be found in the amount of expression of genes relative to a baseline. In some embodiments, a baseline expression level may be measured from the amount of mRNA for a particular genetic marker in a normal cell or other standard cell (i.e. positive or negative control) or may be normalized by using expression levels of genes which are known to have stable expression, for example such as RPLPO (acidic ribosomal phosphoprotein PO), TBP (TATA box binding protein), GAPDH (glyceraldehyde 3-phosphate dehydrogenase) or β-actin.

Based on the mRNA expression levels of the genes of the gene signature, it can be assessed (i) which biomarkers are overexpressed in the cancer sample in comparison to the histologically matched normal sample; ii) which biomarkers are expressed at a similar level in the cancer sample in comparison to the normal histologically matched sample; and iii) which biomarkers are underexpressed in the tumor sample in comparison to the normal histologically matched sample. In a preferred aspect, a gene is overexpressed when the fold change between the tumor sample and the histologically matched normal sample is higher than 1.3, a gene is expressed at a similar level when the fold change is between −1.3 and 1.3, and a gene is underexpressed when the fold change is lower than −1.3. However, different threshold of fold change may also be used, for instance a first class with a fold change higher than x, a second class with a fold change is between −x and x, and a third class with a fold change lower than −x, x being a number between 1 and 5, preferably between 1 and 4, between 1 and 3 or between 1 and 2. For instance, x could be 1, 1.1, 1.2, 1.3, 1.4, 1.5, 1.6, 1.7, 1.8, 1.9 or 2.

Expression of the biomarker may occur ordinarily in a healthy subject or normal sample resulting in a base steady-state level of mRNA in a healthy subject or tissue. However, in cancerous tissue, expression of the marker gene may be increased or decreased resulting in a higher level or lower level of mRNA. Alternatively, expression of a marker gene may not occur at detectable levels in normal, healthy tissue but occurs in cancerous tissue. In some embodiments, the marker is expressed at the same level in the cancer sample as compared to the normal sample. The intensity measurements may be equated (transformed) to the degree of expression of the gene corresponding to the signal intensity of labeled cDNA or cRNA. Thus, the method according to the invention may detect the variability in expression by detecting differences in mRNA levels in cancerous tissue over normal tissue or standard intensities.

Distinctions between expression of a genetic marker in normal sample versus cancerous sample may be made through the use of mathematical/statistical values that are related to each other. For example, in some embodiments, distinctions may be derived from a mean signal indicative of gene expression in a normal sample and variation from this mean signal may be interpreted as being indicative of cancerous tissue. In other embodiments, distinctions may be made by use of the mean signal ratios between different groups of readings, i.e. intensity measurements, and the standard deviations of the signal ratio measurements. A great number of such mathematical/statistical values can be used in their place such as return at a given percentile. These values can then be used to determine whether a cancer or tumor will likely respond to a treatment and/or help to predict the clinical outcome of a patient.

Particularly, in a first aspect, the invention concerns the use of a gene signature selected from the group consisting of:
  i) a gene signature comprising, essentially consisting of, or consisting of AKT2, TSC1, FKB-12, TSC2, RPTOR, RHEB, PIK3CA and PIK3CB;
  ii) a gene signature comprising, essentially consisting of, or consisting of KITLG and KIT;
  iii) a gene signature comprising, essentially consisting of, or consisting of ERK2, ARAF, CRAF, MEK1, MEK2, HRAS, ERK1, MAPK10 and KSR1;
  iv) a gene signature comprising, essentially consisting of, or consisting of NRG4 and NRG2;
  v) a gene signature comprising, essentially consisting of, or consisting of FGF10, FGF16, FGF5, FGF2 and FGF13;
  vi) a gene signature comprising, essentially consisting of, or consisting of TLR4, PDL2, PDL1, CD16 (NK), CTLA4 and CD28;
  as a biomarker for predicting the clinical outcome of a subject suffering from cancer and having an anti-cancer therapy or
  as a biomarker for predicting the response of a subject suffering from cancer to an anti-cancer therapy.

In a second aspect, the invention relates to an in vitro method for predicting the clinical outcome of a subject suffering from cancer and having an anti-cancer therapy or for predicting the response of a subject suffering from cancer to an anti-cancer therapy, wherein the method comprises:
  providing mRNA expression level of each gene of a gene signature selected from the group consisting of:
  i) a gene signature comprising, essentially consisting of, or consisting of AKT2, TSC1, FKB-12, TSC2, RPTOR, RHEB, PIK3CA and PIK3CB;
  ii) a gene signature comprising, essentially consisting of, or consisting of KITLG and KIT;
  iii) a gene signature comprising, essentially consisting of, or consisting of ERK2, ARAF, CRAF, MEK1, MEK2, HRAS, ERK1, MAPK10 and KSR1;
  iv) a gene signature comprising, essentially consisting of, or consisting of NRG4 and NRG2;
  v) a gene signature comprising, essentially consisting of, or consisting of FGF10, FGF16, FGF5, FGF2 and FGF13;
  vi) a gene signature comprising, essentially consisting of, or consisting of TLR4, PDL2, PDL1, CD16 (NK), CTLA4 and CD28;
  in a tumor sample and a histologically matched normal sample, wherein the tumor and histologically matched normal samples are both from the same subject suffering from cancer,
  determining a mRNA fold change of Tumor versus Normal ($Fc_n$ TvN) for each gene of the signature,
  multiplying the $Fc_n$ TvN by expression intensity of the gene ($I_n$) in the tumor sample ($I_n$ T) and/or in the normal histologically matched sample ($I_n$ N) for each gene of the signature,
  determining a score based on the $Fc_n$ TvN multiplied by $I_n$T and/or $I_n$ N, for the genes of the gene signature, this score being indicative of the clinical outcome of the patient suffering from cancer and having an anti-cancer therapy or the responsiveness of the patient to the anti-cancer therapy.

In a preferred aspect, the score is calculated by a mean, median, sum or fold of the fold changes ($Fc_n$ TvN) multiplied by expression intensity of the gene ($I_n$), either in the tumor sample ($I_n$ T) or in the normal histologically matched sample ($I_n$ N). In a very particular aspect, the score is calculated as a mean, median, sum or fold of log 2 (Fc, TvN)*log 1.1 ($I_n$ N or $I_n$ T) for each gene of the gene signature.

The score of the gene signature can be calculated as the sum of log 2 (Fc, TvN)*log 1.1 ($I_n$ N or $I_n$ T) for each gene of the gene signature.

The score of the gene signature can be calculated as the fold of log 2 (Fc, TvN)*log 1.1 ($I_n$ N or $I_n$ T) for each gene of the gene signature.

The score of the gene signature can be calculated as the absolute value of the fold of log 2 ($Fc_n$ TvN)*log 1.1 ($I_n$ N or $I_n$ T) for each gene of the gene signature.

The score of the gene signature can be calculated as the mean of log 2 (Fc, TvN)*log 1.1 ($I_n$ N or $I_n$ T) for each gene of the gene signature.

The score of the gene signature can be calculated as the median of log 2 (Fc, TvN)*log 1.1 ($I_n$ N or $I_n$ T) for each gene of the gene signature.

In particular, the expression levels and/or the intensity, especially the fold change ($Fc_n$ TvN) multiplied by expression intensity of the gene ($I_n$), in particular as log 2 ($Fc_n$ TvN)*log 1.1 ($I_n$ N or $I_n$ T), can be used in an equation or algorithm and transformed into a predictive number. The predictive number can indicate that the tumor or cancer will respond or not to the anticancer treatment. In some aspects, the interpretation function comprises an algorithm where the predictive score is determined according to a predictive model, such as but not limited to logistical regression. As used herein, the term "predictive score" is a score that is calculated (e.g. determined) according to a method including those methods described herein. The predictive score can be used to predict a cancer's response to a cancer treatment in general or to a specific type of treatment, for example such as a tyrosine kinase inhibitor, preferably selected from the group consisting of everolimus, axitinib, trametinib and afatinib, a FGFR inhibitor or a PD-1/PD-L1 inhibitor. The predictive score can optionally be compared to a cut-off value to determine whether or not a cancer will respond to a treatment.

In some aspects, the gene signature, which includes the expression levels of biomarkers, is interpreted by using logistic regression. Logistic regression is a form of regression which is used when the dependent is a dichotomy and the independents are of any type. Logistic regression can be used to predict a dependent variable on the basis of continuous and/or categorical independents and to determine the effect size of the independent variables on the dependent; to rank the relative importance of independents; to assess interaction effects; and to understand the impact of covariate control variables. The impact of predictor variables is usually explained in terms of odds ratios.

Logistic regression applies maximum likelihood estimation after transforming the dependent into a logit variable (the natural log of the odds of the dependent occurring or not). In this way, logistic regression estimates the odds of a certain event occurring, for example such as the response of a patient suffering from cancer to an anticancer therapy. Then, in some embodiments, the gene expression levels of the gene signature disclosed herein can be successfully used to determine whether a patient suffering from cancer will respond or not to a particular anticancer treatment, in particular a tyrosine kinase inhibitor treatment such as disclosed herein.

In particular, the following linear regressions are provided for the prediction of the response of a patient suffering from cancer to an anticancer therapy or for predicting the clinical outcome of a patient. The inventors have selected the best correlators with overall survival for each anticancer therapy and computing a linear regression model form each drug, to transform the best correlator into a predictor.

For Everolimus, a subset of 8 genes was selected for correlations: AKT2, TSC1, FKB-12, TSC2, RPTOR, RHEB, PIK3CA and PIK3CB, for which the linear regression correlation equation for everolimus is Y=6588874000820.68X-19753182063978.6, wherein Y is the absolute value of the fold of log 2 (Fold change tumor versus normal) multiplied by log 1.1 (Intensity_Tumor) of each value for each of the 8 genes, and X is PFS in months.

Then, in one aspect, the invention concerns an in vitro method for predicting the clinical outcome of a subject suffering from cancer and treated by a mTOR inhibitor, in particular everolimus or for predicting the response of a subject suffering from cancer to a treatment by a mTOR inhibitor, in particular everolimus, wherein the method comprises:
(a) providing mRNA expression level of each gene of the following gene signature: AKT2, TSC1, FKB-12, TSC2, RPTOR, RHEB, PIK3CA and PIK3CB, in a tumor sample and a histologically matched normal sample, wherein the tumor and histologically matched normal samples are both from the same subject suffering from cancer, and determining a mRNA fold change of Tumor versus Normal (Fc$_n$ TvN) for each of the 8 genes of the gene signature;
(b) determining the intensity of gene expression, preferably in the tumor sample (I$_n$ T) for each of the 8 genes of the gene signature; preferably measured as relative fluorescence unit (RFU);
(c) determining the absolute value of the fold of log 2 (Fc, TvN) multiplied by log 1.1 (I$_n$ T) for each of the 8 genes and, based on a linear regression, preferably Y=6588874000820.68X-19753182063978.6, wherein Y is the absolute value of the fold of log 2 (Fc, TvN) multiplied by log 1.1 (I$_n$ T) for each of the 8 genes of the gene signature and X being PFS in months, determining a predicted PFS, the predicted PFS being indicative of the clinical outcome or of the response of the subject to everolimus.

For Axitinib, KIT and its ligand KITLG were identified as being the major driver of the correlation with the PFS of the patients treated with axitinib. For Axitinib, the linear regression correlation equation is Y=49.13X-213.31, where Y=the sum of log 2 (Fold change tumor versus normal) multiplied by log 1.1 (Intensity_Normal) of each value for each of the 2 genes, and X=PFS in months.

Then, in one embodiment, the invention concerns an in vitro method for predicting the clinical outcome of a subject suffering from cancer and treated by a VEGFR inhibitor, preferably Axitinib, or for predicting the response of a subject suffering from cancer to a treatment by a VEGFR inhibitor, preferably Axitinib, wherein the method comprises:
(a) providing mRNA expression level of each gene of the following gene signature: KIT and KITLG in a tumor sample and a histologically matched normal sample, wherein the tumor and histologically matched normal samples are both from the same subject suffering from cancer, and determining the mRNA fold change of Tumor versus Normal (Fc, TvN) for each of the 2 genes of the gene signature;
(b) determining the intensity of gene expression, preferably measured as relative fluorescence unit (RFU), preferably in the histologically matched normal sample (I$_n$ N) for each of the 2 genes of the gene signature;
(c) determining the sum of log 2 (Fc$_n$ TvN) multiplied by log 1.1 (I$_n$ N) for each of the 2 genes of the gene signature and, based on a linear regression, preferably Y=49.13X-213.31, where Y=the sum of log 2 (Fc$_n$ TvN) multiplied by log 1.1 (I$_n$ N) for each of the 2 genes of the gene signature and X being PFS in months, determining a predicted PFS, the predicted PFS being indicative of the clinical outcome or the response of the subject to axitinib.

For Afatinib, a subset of 2 genes was selected for correlations: NRG4 and NRG2 for which the linear regression correlation model is Y=−21.7724X+55.93, where Y=the sum of log 2 (Fc, TvN) multiplied by log 1.1 (Intensity_Tumor) of each value for each of the 2 genes, and X=PFS in months.

Then, in one embodiment, the invention concerns an in vitro method for predicting the clinical outcome of a subject suffering from cancer and treated by a pan-HER inhibitor, preferably Afatinib, or for predicting the response of a subject suffering from cancer to a treatment by a pan-HER inhibitor, preferably afatinib, wherein the method comprises:
(a) providing mRNA expression level of each gene of the following gene signature: NRG4 and NRG2 in a tumor sample and a histologically matched normal sample, wherein the tumor and histologically matched normal samples are both from the same subject suffering from cancer, and determining the mRNA fold change of Tumor versus Normal (Fc, TvN) for each of the 2 genes of the gene signature;
(b) determining the intensity of gene expression, preferably measured as relative fluorescence unit (RFU), preferably in the tumor sample (I$_n$ T) for each of the 2 genes of the gene signature;
(c) determining the sum of log 2 (Fc, TvN) multiplied by log 1.1 (I$_n$ T) for each of the 2 genes and, based on a linear regression, preferably Y=−21.7724X+55.93, where Y=the sum of log 2 (Fc, TvN) multiplied by log 1.1 (I$_n$ T) for each of the 2 genes of the gene signature and X being PFS in months, determining a predicted PFS, the predicted PFS being indicative of the clinical outcome or the response of the subject to the afatinib.

For Trametinib, a subset of 9 genes was selected for correlations: ERK2, ARAF, CRAF, MEK1, MEK2, HRAS, ERK1, MAPK10 and KSR1 for which the linear regression correlation model is Y=−145283210513695X+

1125665952686062, where Y=the fold of log 2 (Fc, TvN) multiplied by log 1.1 (Intensity_Tumor) of each values for each of the 9 genes, and X=PFS in months.

Then, in one embodiment, the invention concerns an in vitro method for predicting the clinical outcome of a subject suffering from cancer and treated by a MEK inhibitor, preferably Trametinib or for predicting the response of a subject suffering from cancer to a treatment by a MEK inhibitor, preferably Trametinib, wherein the method comprises:
  (a) providing mRNA expression level of each gene of the following gene signature: ERK2, ARAF, CRAF, MEK1, MEK2, HRAS, ERK1, MAPK10 and KSR1 in a tumor sample and a histologically matched normal sample, wherein the tumor and histologically matched normal samples are both from the same subject suffering from cancer, and determining the fold change TvN for each gene of the 2 genes;
  (b) determining the intensity of gene expression, preferably measured as relative fluorescence unit (RFU), preferably in the tumor sample ($I_n$ T) for each gene of the 9 genes of the gene signature;
  (c) determining the fold of log 2 (Fc, TvN) multiplied by log 1.1 ($I_n$ T) for each of the 9 genes and, based on a linear regression, preferably Y=−145283210513695X+ 1125665952686062, where Y=the fold of log 2 (Fc, TvN) multiplied by log 1.1 ($I_n$ T) for each of the 9 genes of the gene signature and X being PFS in months, determining a predicted PFS, the predicted PFS being indicative of the clinical outcome or the response of the subject to Trametinib.

For PD-1/PD-L1 inhibitor, a subset of 6 genes was selected for correlations: TLR4, PDL2, PDL1, CD16, CTLA4 and CD28 for which the linear regression correlation model is Y=1272862482.4864X−2015211477.55, where Y=the fold of log 2 (Fc, TvN) multiplied by log 1.1 (Intensity_Normal) of each value for each of the 6 genes, and X=PFS in months.

Then, in one aspect, the invention concerns an in vitro method for predicting the clinical outcome of a subject suffering from cancer and treated by a PD-1/PD-L1 inhibitor or for predicting the response of a subject suffering from cancer to a treatment by a PD-1/PD-L1 inhibitor, wherein the method comprises:
  (a) providing mRNA expression level of each gene of the following gene signature: TLR4, PDL2, PDL1, CD16, CTLA4 and CD28 in a tumor sample and a histologically matched normal sample, wherein the tumor and histologically matched normal samples are both from the same subject suffering from cancer, and determining the fold change TvN for each of the 6 genes of the gene signature;
  (b) determining the intensity of gene expression, preferably measured as relative fluorescence unit (RFU), preferably in the histologically matched normal sample ($I_n$ N) for each of the 6 genes of the gene signature;
  (c) determining the fold of log 2 (Fc, TvN) multiplied by log 1.1 ($I_n$ N) for each of the 6 genes and, based on a linear regression, preferably Y=1272862482.4864X-2015211477.55, where Y=the fold of log 2 (Fold change tumor versus normal) multiplied by log 1.1 ($I_n$ N) for each of the 6 genes and X being PFS in months, determining a predicted PFS, the predicted PFS being indicative of the clinical outcome or the response of the subject to the PD-1/PD-L1 inhibitor.

For FGFR inhibitor, a subset of 5 genes was selected for correlations: FGF10, FGF16, FGF5, FGF2 and FGF13 for which the linear regression correlation model is Y=−19.011X+98.36, where Y=the sum of log 2 (Fc, TvN) multiplied by log 1.1 (Intensity_Normal) of each value for each of the 5 genes, and X=PFS in months.

Then, in one aspect, the invention concerns an in vitro method for predicting the clinical outcome of a subject suffering from cancer and treated by a FGFR inhibitor, preferably BGJ938 or TAS-120, or for predicting the response of a subject suffering from cancer to a treatment by a FGFR inhibitor, preferably BGJ938 or TAS-120, wherein the method comprises:
  (a) providing mRNA expression level of each gene of the following gene signature: FGF10, FGF16, FGF5, FGF2 and FGF13 in a tumor sample and a histologically matched normal sample, wherein the tumor and histologically matched normal samples are both from the same subject suffering from cancer, and determining the of Tumor versus Normal (Fc, TvN) for each of the 5 genes of the gene signature;
  (b) determining the intensity of gene expression, preferably measured as relative fluorescence unit (RFU), preferably in the histologically matched normal sample ($I_n$ N) for each of the 5 genes of the gene signature;
  (c) determining the sum of log 2 (Fc, TvN) multiplied by log 1.1 sum of log 2 (Fold change tumor versus normal) multiplied by log 1.1 ($I_n$ N) for each of the 5 genes, and based on a linear regression, preferably Y=−19.011X+ 98.36, where Y=the sum of log 2 ($Fc_n$ TvN) multiplied by log 1.1 ($I_n$ N) for each of the 5 genes and X being PFS in months, determining a predicted PFS, the predicted PFS being indicative of the clinical outcome or the response of the subject to the FGFR inhibitor.

In some aspects, some steps of the method according to the present invention can be a computer implemented steps.

In some aspects, the method may comprise computer implemented steps for displaying the expression and/or intensity of the biomarker genes of the gene signature. In some aspects, a method for predicting a response of a subject to an anti-cancer treatment described herein comprises transforming the linear regression equations into an output that is communicated to a user. In some aspect, the output is a statistical analysis of the probability of response to a treatment, which is based upon the predictive score. In particular, the biomarker genes of the gene signature are displayed as a graph, especially a point chart, each point representing the expression level of one gene of the set. In a preferred aspect, the graph shows the expression intensity of the genes of the gene signature in the tumor sample on the ordinate and the expression intensity in the normal histologically matched sample on the abscissa. Preferably, the output of the prognosis method is displayed on a screen such as a computer screen. Based on this display, the person skilled in art has at his/her disposal the information allowing to determine if a subject suffering from a cancer is susceptible to have a therapeutic benefit of a treatment with a particular anticancer therapy (for example a tyrosine kinase inhibitor, a PD-1/PDL1 inhibitor or a FGFR inhibitor) or not. Indeed, this susceptibility is based on the global information provided by the display.

Having established the expression profile of a patient based on the gene signature expression level and/or of the intensity of gene expression and having determined the therapeutic sensitivity of the patient to an anticancer treatment such as a tyrosine kinase inhibitor, a PD-1/PDL1 inhibitor or a FGFR inhibitor, the patient may be treated using the appropriate therapeutic agent such as one or more of the anticancer agents described above.

Then, the methods disclosed hereabove may comprise an additional step of administering a therapeutically effective amount of the anticancer treatment, preferably the tyrosine kinase inhibitor, preferably selected from the group consisting of everolimus, afatinib and axitinib, a PD-1/PDL1 inhibitor, preferably such as pembrolizumab, nivolumab or atezolizumab, or a FGFR inhibitor such as TAS-120 or BGJ398.

In a particular aspect, the invention may also concern a method of treatment of a subject having a cancer, comprising:
a) providing mRNA expression level of each gene of a gene signature selected from the group consisting of:
   i) a gene signature comprising, essentially consisting of, or consisting of AKT2, TSC1, FKB-12, TSC2, RPTOR, RHEB, PIK3CA and PIK3CB;
   ii) a gene signature comprising, essentially consisting of, or consisting of KITLG and KIT;
   iii) a gene signature comprising, essentially consisting of, or consisting of ERK2, ARAF, CRAF, MEK1, MEK2, HRAS, ERK1, MAPK10 and KSR1;
   iv) a gene signature comprising, essentially consisting of, or consisting of NRG4 and NRG2;
   in a tumor sample and a histologically matched normal sample, wherein the tumor and histologically matched normal samples are both from the same subject suffering from cancer,
b) determining if a patient is susceptible to respond to an anticancer treatment, preferably a tyrosine kinase inhibitor, preferably selected from the group consisting of everolimus, afatinib, trametinib and axitinib as detailed above,
c) administering a therapeutically effective amount of the anticancer treatment, preferably the tyrosine kinase inhibitor, preferably selected from the group consisting of everolimus, afatinib, trametinib and axitinib.

Particularly, when the anti-cancer therapy is everolimus, the gene signature comprises, essentially consists in or consists in AKT2, TSC1, FKB-12, TSC2, RPTOR, RHEB, PIK3CA and PIK3CB; when the anti-cancer therapy is axitinib, the gene signature comprises, essentially consists in or consists in KITLG and KIT; when the anti-cancer therapy comprises, essentially consists in or consists in afatinib, the gene signature is NRG4 and NRG2, when the anti-cancer therapy comprises, essentially consists in or consists in trametinib, the gene signature is ERK2, ARAF, CRAF, MEK1, MEK2, HRAS, ERK1, MAPK10 and KSR1.

In some embodiments, the tyrosine kinase inhibitor may be administered alone. In some embodiments, the tyrosine kinase inhibitor identified may be administered as part of the anticancer treatment. For example, in some embodiments, a therapeutic agent identified using the methods of embodiments of the invention (e.g. everolimus, afatinib, trametinib or axitinib) may be administered to the patient before or after radiation or surgery to reduce the size of a tumor.

The same applies for PD1/PD-L1 and FGFR inhibitors.

More particularly, the invention may also concern a method of treatment of a subject having a cancer, comprising:
a) providing mRNA expression level of each gene of a gene signature comprising, essentially consisting of, or consisting of TLR4, PDL2, PDL1, CD16, CTLA4 and CD28, in a tumor sample and a histologically matched normal sample, wherein the tumor and histologically matched normal samples are both from the same subject suffering from cancer,
b) determining if a patient is susceptible to respond to an anti-PD-1 or anti-PD-L1 antibody as detailed above,
c) administering a therapeutically effective amount of the anti-PD-1 or anti-PD-L1 antibody.

More particularly, the invention may also concern a method of treatment of a subject having a cancer, comprising:
a) providing mRNA expression level of each gene of a gene signature comprising, essentially consisting of, or consisting of FGF10, FGF16, FGF5, FGF2 and FGF13, in a tumor sample and a histologically matched normal sample, wherein the tumor and histologically matched normal samples are both from the same subject suffering from cancer,
b) determining if a patient is susceptible to respond to a FGFR inhibitor as detailed above, c) administering a therapeutically effective amount of the FGFR inhibitor.

The method may further comprise a step of selecting a patient susceptible to have a therapeutic benefit of a treatment with an anti-cancer therapy. It can also comprise a step of administering a therapeutic amount of the anticancer therapy to the selected patient.

The method may also or alternatively comprise a step of selecting a patient who is not susceptible to have a therapeutic benefit of a treatment with an anti-cancer therapy or is a non-responder. Then, the selected patient will not be suitable to receive a therapeutic benefit of a treatment with an anti-cancer therapy because he/she would be a non-responder or because the treatment will likely be associated with adverse side effects.

Patients and Tumor

The patient is an animal, preferably a mammal, even more preferably a human. However, the patient can also be a non-human animal, in particular mammals such as dogs, cats, horses, cows, pigs, sheep, donkeys, rabbits, ferrets, gerbils, hamsters, chinchillas, rats, mice, guinea pigs and non-human primates, among others, that are in need of treatment.

The human patient according to the invention may be a human at the prenatal stage, a new-born, a child, an infant, an adolescent or an adult, in particular an adult of at least 30 years old or at least 40 years old, preferably an adult of at least 50 years old, still more preferably an adult of at least 60 years old, even more preferably an adult of at least 70 years old.

In one embodiment, the patient is an active smoker or a former smoker.

Preferably, the patient has been diagnosed with a cancer. In another particular embodiment, the patient suffers from a metastatic cancer or a cancer at an advanced stage. In one embodiment, the patient has been diagnosed with a cancer of stage III or IV.

In one embodiment, the patient suffers from a cancer for which no effective therapy is established or admitted by physicians.

In a particular embodiment, the patient has already received at least one line of treatment, in particular one line of treatment, two lines of treatment or three lines of treatment or more, preferably several lines of treatment. Alternatively, the patient has not received any treatment. Preferably, the subject was heavily pre-treated and even more preferably the subject exhausted therapeutic options.

The amount of anti-cancer treatment, in particular the Tyrosine kinase inhibitor, the FGFR inhibitor or the PD-1/PD-L1 inhibitor, to be administered is determined by standard procedure well known by those of ordinary skills in the art. Physiological data of the patient (e.g. age, size, weight, and physical general condition) and the routes of administration are taken into account to determine the appropriate dosage, so as a therapeutically effective amount will be administered to the patient. "An effective amount" or a "therapeutic effective amount" as used herein refers to the amount of active agent (i.e. tyrosine kinase inhibitor, FGFR inhibitor or the PD-1/PD-L1 inhibitor) required to confer therapeutic effect on the subject, either alone or in combination with one or more other active agents, e.g. the amount of active agent that is needed to treat the targeted disease or disorder, or to produce the desired effect. The "effective amount" will vary depending on the agent(s), the disease and its severity, the characteristics of the subject to be treated including age, physical condition, size, gender and weight, the duration of the treatment, the nature of concurrent therapy (if any), the specific route of administration and like factors within the knowledge and expertise of the health practitioner. These factors are well known to those of ordinary skill in the art and can be addressed with no more than routine experimentation. It is generally preferred that a maximum dose of the individual components or combinations thereof be used, that is, the highest safe dose according to sound medical judgment.

The anticancer treatment may be administered as a single dose or in multiple doses.

Preferably, the anticancer treatment starts no longer than a month, preferably no longer than a week, after the determination of the gene signature expression profile of the patient suffering from cancer. Preferably, the cancer treatment is administered regularly, preferably between every day and every month, more preferably between every day and every two weeks, even more preferably between every day and every week.

The duration of treatment is preferably comprised between 1 day and 24 weeks, more preferably between 1 day and 10 weeks, even more preferably between 1 day and 4 weeks. In a particular embodiment, the treatment last as long as the cancer persists.

The method of the invention is aimed to select and/or treat a patient affected with a tumor.

In one embodiment, the tumor is from a cancer selected from the group consisting of leukemias, seminomas, melanomas, teratomas, lymphomas, non-Hodgkin lymphoma, neuroblastomas, gliomas, adenocarcinoma, mesothelioma (including pleural mesothelioma, peritoneal mesothelioma, pericardial mesothelioma and end stage mesothelioma), rectal cancer, endometrial cancer, thyroid cancer (including papillary thyroid carcinoma, follicular thyroid carcinoma, medullary thyroid carcinoma, undifferentiated thyroid cancer, multiple endocrine neoplasia type 2A, multiple endocrine neoplasia type 2B, familial medullary thyroid cancer, pheochromocytoma and paraganglioma), skin cancer (including malignant melanoma, basal cell carcinoma, squamous cell carcinoma, Kaposi's sarcoma, keratoacanthoma, moles, dysplastic nevi, lipoma, angioma and dermatofibroma), nervous system cancer, brain cancer (including astrocytoma, medulloblastoma, glioma, lower grade glioma, ependymoma, germinoma (pinealoma), glioblastoma multiform, oligodendroglioma, schwannoma, retinoblastoma, congenital tumors, spinal cord neurofibroma, glioma or sarcoma), skull cancer (including osteoma, hemangioma, granuloma, xanthoma or osteitis deformans), meninges cancer (including meningioma, meningiosarcoma or gliomatosis), head and neck cancer (including head and neck squamous cell carcinoma and oral cancer (such as, e.g., buccal cavity cancer, lip cancer, tongue cancer, mouth cancer or pharynx cancer)), lymph node cancer, gastrointestinal cancer, liver cancer (including hepatoma, hepatocellular carcinoma, cholangiocarcinoma, hepatoblastoma, angiosarcoma, hepatocellular adenoma and hemangioma), colon cancer, stomach or gastric cancer, esophageal cancer (including squamous cell carcinoma, larynx, adenocarcinoma, leiomyosarcoma or lymphoma), colorectal cancer, intestinal cancer, small bowel or small intestines cancer (such as, e.g., adenocarcinoma lymphoma, carcinoid tumors, Kaposi's sarcoma, leiomyoma, hemangioma, lipoma, neurofibroma or fibroma), large bowel or large intestines cancer (such as, e.g., adenocarcinoma, tubular adenoma, villous adenoma, hamartoma or leiomyoma), pancreatic cancer (including ductal adenocarcinoma, insulinoma, glucagonoma, gastrinoma, carcinoid tumors or vipoma), ear, nose and throat (ENT) cancer, breast cancer (including HER2-enriched breast cancer, luminal A breast cancer, luminal B breast cancer and triple negative breast cancer), cancer of the uterus (including endometrial cancer such as endometrial carcinomas, endometrial stromal sarcomas and malignant mixed Müllerian tumors, uterine sarcomas, leiomyosarcomas and gestational trophoblastic disease), ovarian cancer (including dysgerminoma, granulosa-theca cell tumors and Sertoli-Leydig cell tumors), cervical cancer, vaginal cancer (including squamous-cell vaginal carcinoma, vaginal adenocarcinoma, clear cell vaginal adenocarcinoma, vaginal germ cell tumors, vaginal sarcoma botryoides and vaginal melanoma), vulvar cancer (including squamous cell vulvar carcinoma, verrucous vulvar carcinoma, vulvar melanoma, basal cell vulvar carcinoma, Bartholin gland carcinoma, vulvar adenocarcinoma and erythroplasia of Queyrat), genitourinary tract cancer, kidney cancer (including clear renal cell carcinoma, chromophobe renal cell carcinoma, papillary renal cell carcinoma, adenocarcinoma, Wilm's tumor, nephroblastoma, lymphoma or leukemia), adrenal cancer, bladder cancer, urethra cancer (such as, e.g., squamous cell carcinoma, transitional cell carcinoma or adenocarcinoma), prostate cancer (such as, e.g., adenocarcinoma or sarcoma) and testis cancer (such as, e.g., seminoma, teratoma, embryonal carcinoma, teratocarcinoma, choriocarcinoma, sarcoma, interstitial cell carcinoma, fibroma, fibroadenoma, adenomatoid tumors or lipoma), lung cancer (including small cell lung carcinoma (SCLC), non-small cell lung carcinoma (NSCLC) including squamous cell lung carcinoma, lung adenocarcinoma (LUAD), and large cell lung carcinoma, bronchogenic carcinoma, alveolar carcinoma, bronchiolar carcinoma, bronchial adenoma, lung sarcoma, chondromatous hamartoma and pleural mesothelioma), sarcomas (including Askin's tumor, sarcoma chondrosarcoma, botryoides, Ewing's sarcoma, malignant hemangioendothelioma, malignant schwannoma, osteosarcoma and soft tissue sarcomas), soft tissue sarcomas (including alveolar soft part sarcoma, angiosarcoma, cystosarcoma phyllodes, dermatofibrosarcoma protuberans, desmoid tumor, desmoplastic small round cell tumor, epithelioid sarcoma, extraskeletal chondrosarcoma, extraskeletal osteosarcoma, fibrosarcoma, gastrointestinal stromal tumor (GIST), hemangiopericytoma, hemangiosarcoma, Kaposi's sarcoma, leiomyosarcoma, liposarcoma, lymphangiosarcoma, lymphosarcoma, malignant peripheral nerve sheath tumor (MPNST), neurofibrosarcoma, plexiform fibrohistiocytic tumor, rhabdomyosarcoma, synovial sarcoma and undifferentiated pleomorphic sarcoma, cardiac cancer (including sarcoma such as, e.g., angiosarcoma, fibrosarcoma, rhabdomyosarcoma or liposarcoma, myxoma, rhabdomyoma, fibroma, lipoma and teratoma), bone cancer (including osteogenic sarcoma, osteosarcoma, fibrosarcoma, malignant fibrous histiocytoma, chondrosarcoma, Ewing's sarcoma, malignant lymphoma and reticulum cell sarcoma, multiple myeloma, malignant giant cell tumor chordoma, osteochondroma, osteocartilaginous exostoses, benign chondroma, chondroblastoma, chondromyxoid fibroma, osteoid osteoma and giant cell tumors), hematologic and lymphoid cancer, blood cancer (including acute myeloid leukemia, chronic myeloid leukemia, acute lymphoblastic leukemia, chronic lymphocytic leukemia, myeloproliferative diseases, multiple myeloma and myelodysplasia syndrome), Hodgkin's disease, non-Hodgkin's lymphoma and hairy cell and lymphoid disorders, and the metastases thereof.

Preferably, the cancer is selected from the group consisting of bladder cancer, breast cancer, colon cancer, Esophagus cancer, gastric cancer, rectum cancer, head and neck cancer, hepatocarcinoma, kidney cancer, Leiomyosarcoma, Liposarcoma, lung cancer, lymphoma, melanoma, neuroendocrine cancer, pleural cancer, Rhabdomyosarcoma, Small Intestine neuroendocrine cancer, soft tissue cancer, non-small cell lung carcinomas (NSCLC), metastatic non-small cell lung cancer, advanced renal cell carcinoma (RCC), and sub ependymal giant cell astrocytoma (SEGA) associated with tuberous sclerosis (TS).

Even more preferably, the cancer is selected from the group consisting of: Head and neck (HN) cancer, Lung cancer, colorectal cancer (CRC), esophagus cancer, gastrointestinal (GI) cancer; neuroendocrine (NE) cancer; liposarcoma (LS).

In a very particular embodiment, the subject suffers from colorectal or head and neck cancer and the anticancer therapy is a PD1/PDL1 inhibitor such as Pembrolizumab, Nivolumab and Atezolizumab.

In a very particular embodiment, the subject suffers from colorectal, head and neck or esophageal cancer and the anticancer therapy is a FGFR inhibitor such as BGJ398 and TAS-120.

In a very particular embodiment, the subject suffers from lung cancer, colorectal cancer, head and neck cancer, gastrointestinal (GI) cancer, neuroendocrine (NE) cancer or liposarcoma (LS) and the anticancer therapy is a TKI inhibitor.

In a very particular embodiment, the subject suffers from lung cancer and the anticancer therapy is a TKI inhibitor, preferably afatinib.

In a very particular embodiment, the subject suffers from lung cancer or colorectal cancer and the anticancer therapy is trametinib.

In a very particular embodiment, the subject suffers from lung cancer or head and neck cancer and the anticancer therapy is axitinib.

In a very particular embodiment, the subject suffers from head and neck cancer, gastrointestinal (GI) cancer, neuroendocrine (NE) cancer or liposarcoma (LS) and the anticancer therapy is everolimus.

The methods and uses according to the invention comprise a step of characterizing a tumor sample of a patient in comparison with a normal sample from the same patient. Therefore, the methods and uses according to the invention may comprise an initial step of providing samples from the patient. The sample can, for example, be obtained from a subject by, but not limited to, venipuncture, excretion, biopsy, needle aspirate, lavage sample, scraping, surgical incision, or, any combination thereof, and the like.

Preferably, the tumor sample and the normal sample provides from the same type of tissue. More particularly, the tumor and normal samples are histologically matched tissues. The "normal" sample does not comprise any cancer cell. In one embodiment, the cancer sample and the normal sample are from the same patient.

Then, two samples are necessary, namely one tumor sample and one normal sample from the same patient. Preferably, the tumour sample and the normal sample provides from the same type of tissue. More particularly, the tumor and normal samples are histologically matched tissues. Tumor tissue is a fragment obtained from the tumor or metastatic lesions, (usually provided in interventional radiology) and containing at least 50% tumoral cells, immune infiltrating cells, stromal cells, vessels. The normal tissue is a fragment from histologically matched normal tissue (usually provided in fibroscopy or endoscopy units) and containing at least 30% normal cells (e.g., epithelial cells). DNA and total RNA preparations are performed and only high-quality nucleic acids quality are used for transcriptomics investigations (measure of differential expression between the tumor and normal tissues.

Non-exhaustively, examples of pairs of tumors with corresponding histological normal tissue are the followings:
1. lung cancer adenocarcinomas or derived metastases-bronchial normal mucosa
2. breast cancer tumors or derived metastases-normal epithelial breast cells
3. colon cancers adenocarcinomas or derived metastases-normal colon mucosa
4. kidney cancers or derived metastases-normal kidney cells
5. melanomas or derived metastases-synchronous naevi
6. rhabdomyosarcomas or derived metastases-normal muscle tissue
7. liver carcinomas or derived metastases-normal liver cells
8. Oral-pharyngeals tumors (ORL)-normal buccal mucosa
9. Stomach carcinomas or derived metastases-normal stomach mucosa
10. Ovary cancer-normal Fallopian tube mucosa
11. pancreatic cancers-normal parenchymatous tissue from pancreas.

In some embodiments, the method comprises isolating genetic material from the cancer and the histologically matched normal samples.

Kit and Uses Thereof

In some embodiments, kits are provided for predicting the clinical outcome of a patient suffering from cancer and/or determining an appropriate therapeutic agent to treat a cancer that includes the diagnosis test of embodiments described above, and one or more additional elements for preparing a gene expression profile from a cancer and normal sample necessary to perform the test.

In particular, the kit may include an apparatus for collecting a sample from a patient, means and components for determining the expression levels of one or more genes associated with the gene signature, labels, reagents, other materials necessary to determine the expression profile, instructions for preparing reagents and other materials necessary to develop a genetic profile of a set of marker genes and for identifying a therapeutic agent based on the expression profile, or any combination thereof.

Determining the expression levels of one or more marker genes may be carried out by any method such as polymerase chain reaction (PCR), enzyme-linked immunosorbent assay (ELISA), magnetic immunoassay (MIA), microarrays, or any methods known in the art. The content of the kits may vary based on the method utilized. The man skilled in the art easily knows the means necessary for designing and assessing such methods. For example, when PCR is the method for determining the expression level of the biomarkers of the gene signature, the kit may include primers which facilitate amplification of a marker gene. In some embodiments, one or more microarray may be used to measure the expression level of one or more marker genes, and such kits may include one or more microarrays having probes to specific marker genes.

For example, suitable mean(s) may be probe(s), primer(s), antibody(ies) and/or aptamer(s) specific for the detection of:
i) AKT2, TSC1, FKB-12, TSC2, RPTOR, RHEB, PIK3CA and PIK3CB biomarker genes.
ii) KITLG and KIT biomarker genes.
iii) ERK2, ARAF, CRAF, MEK1, MEK2, HRAS, ERK1, MAPK10 and KSR1 biomarker genes.
iv) NRG4 and NRG2 biomarker genes.
v) FGF10, FGF16, FGF5, FGF2 and FGF13 biomarker genes.
vi) TLR4, PDL2, PDL1, CD16 (NK), CTLA4 and CD28 biomarker genes.

In some embodiments, the kit comprises components to extract genetic material (e.g. DNA, RNA, mRNA, and the like) from cancer and/or normal cells. In some embodiments, the kit comprises compositions that can be used to tag or label genetic material extracted from or derived from the cells. Genetic material that is derived from a tumor sample includes DNA or RNA that is producing using PCR, RT-PCR, RNA amplification, or any other suitable amplification method. In some embodiments, the kit comprises a microarray (e.g. microarray chip) comprising hybridization probes that is specific for a genetic signature, such as disclosed herein. In some embodiments, the kit comprises a composition or product (e.g. device) that can be used to visualize the genetic material that is associated with the hybridization probes.

The kit of may be a diagnostic kit. In some embodiments, the kits are used before and/or after an anticancer treatment.

The components of the kits may be packaged either in aqueous media or in lyophilized form. The container means of the kits will generally include at least one vial, test tube, flask, bottle, syringe or other container means, into which a component may be placed, and preferably, suitably aliquoted. Where there is more than one component in the kit, the kit also will generally contain a second, third or other additional container into which the additional components may be separately placed. However, various combinations of components may be comprised in a vial.

In some embodiments, means of taking a sample from an individual and/or of assaying the sample may be provided. The kit may also comprise means for containing a sterile, pharmaceutically acceptable buffer(s) and/or other diluent(s). Optionally, a leaflet is provided for guidelines to use such a kit.

In another aspect, the invention also concerns the use of a kit as disclosed above for (a) predicting the clinical outcome of a subject suffering from cancer and undergoing anti-cancer therapy (b) predicting the response of a subject to an anti-cancer therapy, preferably a tyrosine kinase inhibitor, FGFR inhibitor or PD-1/PD-L1 inhibitor (c) determining an appropriate therapeutic agent to treat a cancer and/or (d) determining whether a subject suffering from cancer is susceptible to benefit from an alternative anti-cancer therapy.

In particular, when the anti-cancer therapy is a mTOR inhibitor, preferably everolimus, the gene signature comprises, essentially consists in or consists in AKT2, TSC1, FKB-12, TSC2, RPTOR, RHEB, PIK3CA and PIK3CB, and the kit comprises means to establish the gene expression profile of the patient based on the AKT2, TSC1, FKB-12, TSC2, RPTOR, RHEB, PIK3CA and PIK3CB biomarkers.

When the anti-cancer therapy is a VEGFR inhibitor, preferably axitinib, the gene signature comprises, essentially consists in or consists in KITLG and KIT and the kit comprises means to establish the gene expression profile of the patient based on the KITLG and KIT biomarkers.

When the anti-cancer therapy is a pan-HER inhibitor, preferably afatinib, the gene signature comprises, essentially consists in or consists in NRG4 and NRG2 and the kit comprises means to establish the gene expression profile of the patient based on the NRG4 and NRG2 biomarkers.

When the anti-cancer therapy is a MEK inhibitor, preferably trametinib, the gene signature comprises, essentially consists in or consists in ERK2, ARAF, CRAF, MEK1, MEK2, HRAS, ERK1, MAPK10 and KSR1 and the kit comprises means to establish the gene expression profile of the patient based on the ERK2, ARAF, CRAF, MEK1, MEK2, HRAS, ERK1, MAPK10 and KSR1 biomarkers.

When the anti-cancer therapy is a FGFR inhibitor, in particular such as BGJ398 and TAS-120, the gene signature comprises, essentially consists in or consists in FGF10, FGF16, FGF5, FGF2 and FGF13 and the kit comprises means to establish the gene expression profile of the patient based on the FGF10, FGF16, FGF5, FGF2 and FGF13 biomarkers.

When the anti-cancer therapy is a PD-1/PD-L1 inhibitor, preferably an anti-PD-1 or anti-PD-L1 antibody, in particular such as Pembrolizumab, Nivolumab and Atezolizumab, the gene signature comprises, essentially consists in or consists in TLR4, PDL2, PDL1, CD16 (NK), CTLA4 and CD28 and the kit comprises means to establish the gene expression profile of the patient based on the TLR4, PDL2, PDL1, CD16 (NK), CTLA4 and CD28 biomarkers.

Preferably, the kit does not comprise detection means for more than 50, 40, 30, 20 or 10 genes.

Further aspects and advantages of the present invention will be described in the following examples, which should be regarded as illustrative and not limiting.

Examples

Figure 1:
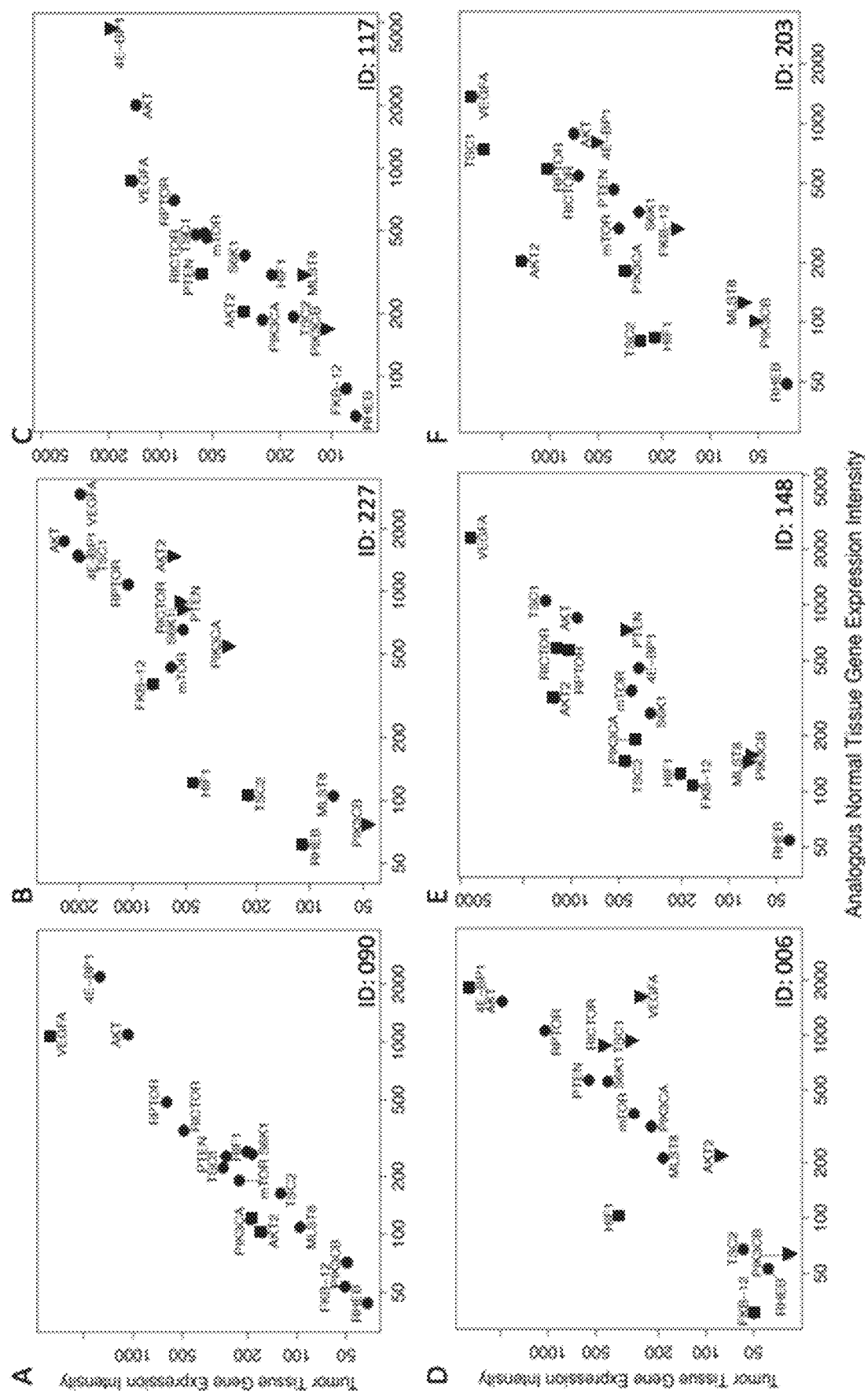
FIG. 1: DDPP tumor/normal intensity plots profiles of differential gene expression of the everolimus key genes for the 6 patients treated with everolimus in monotherapy. Clinical outcome is described in Table 1. A: ID 090, head and neck carcinoma, PFS=1.3 months (progressive disease), $3^{rd}$ therapy line. B: ID 227, liposarcoma, PFS=1.7 months (progressive disease) in $5^{th}$ therapy line. C: ID 117, head and neck carcinoma, PFS=1.9 months (progressive disease), $3^{rd}$ therapy line. D: ID 006, unknown primary origin, PFS=8.1 months (stable disease) in $2^{nd}$ therapy line. E: ID 148, neuroendocrine tumor of small gut PFS=11.6 months (stable disease) in $3^{rd}$ therapy line. F: ID 203, neuroendocrine tumor of small intestine, PFS=60+months (partial response disease) in $2^{nd}$ therapy line. Y axis: intensity of the expression in tumors. X axis: intensity of the expression in normal matched tissue. Intensities are measured as relative fluorescence unit (RFU) signal as assessed with Agilent microarray technology. Overexpression for a given mRNA in the tumor as compared to the normal is denoted with a square (■) underexpression is denoted with a triangle (▼) and no change is denoted with a black point (•).

The DDPP is a combinatorial biomarker based on transcriptomics of tumor versus normal tissue used for simultaneous assessment of the steady-state level of many key genes/mRNAs in tumor vs. organ-matched normal tissue in order to assess interactions between genes and pathways that govern sensitivity or resistance to treatments with targeted TKI. The same global method applies for each drug investigated, and starts with the selection, based on literature and the Food and Drug Administration US prescribing information (FDA USPI) of target(s) of the drug and of other key genes involved in modulating tumor sensitivity or resistance to the drug. The technology was developed using the transcriptomic database obtained from the international WINTHER trial. This database included tumor compared to normal RNA analysis of whole transcriptome in patients who were treated in the study.

Materials and Method

The full methodology of transcriptomic assessment and patient treatment is described in the WINTHER trial published in Nature Medicine. A total of 101 patients out of the 107 treated in WINTHER were available for data analysis herein; six patients could not be analyzed because transcriptomics data were not available. Detailed clinical and biological information for each patient is available in Table 1; further biological data is available on World Wide Web: winconsortium.org containing: (i) tumor mutations data in XML format; and (ii) expression data in a table format (providing information about tumor/normal fold change and tumor intensity alone for all the cases for which mRNA was analyzed).

Application of Euclidian Hyperspace Mathematical Model to Precision Oncology

The Fundamentals Concepts Behind the DDPP Methodology:
1. A straight-line segment can be drawn joining any two points (Euclid's first postulate).
2. If a third (or fourth, etc.) points are aligned on the same line, they are linked by a function of linearity.
3. The most adequate way to identify a function of linearity is the linear regression through the Pearson correlation between two types of variables (in this case the differential expression tumor versus normal of key genes governing the mechanism of action of a specific drug, and the PFS of the patients treated with the specific drug).
4. Definition of transcriptomic variable was performed with a 'step-in' method.
5. Among existing methods, the most adequate appeared the application of Euclidian hyperspace mathematical model that integrates a structure of linearity. Multiple Linear regression and Cox regression methods were tested but could not be adapted for the purpose of the study.

The Euclidian coordinate hyperspace Rn forms an n-dimensional vector space over the field of real numbers with the addition of the structure of linearity, and is often still denoted Rn. The aim of DDPP was to determinate the optimal number of 'n' coordinates. The operations on Rn are typically defined by a vector space (also called a linear space); The vector space is a collection of objects called vectors, which may be added together and multiplied ("scaled") by numbers, called scalars. Scalars are often taken to be real numbers.

DDPP adapted the model to precision oncology, defining the biologic hyperspace as being the dynamics of the networks regulating normal biological systems and their disturbances in cancer, and the specific mechanisms of actions of drugs investigated. The coordinates needed to define correlate with the clinical outcome under treatment, are the key genes governing drug's mechanism of action. The vector space is constituted by the fold changes between tumor and analogous organ matched normal tissue of the same patient, and the scalars are the intensities of expression in tumor and normal tissues. The use of scalars is mandatory, as the same fold change can be obtained at different levels of intensities (reflecting the steady state-levels of mRNA of each specific key gene, in tumor and normal tissues).

The DDPP Methodology that Apply to any Type of Drugs is Based on the Following Steps:

1. Identification of key genes involved in drug's mechanisms of action, based on recent literature and based on the FDA US Prescribing Information (USPI)
    a. Everolimus: key genes: PIK3CA, PIK3CB, AKT1, MTOR, FKBP1A, RPS6KB1, EIF4EBP1, HIF1A, TSC1, TSC2, AKT2, RPTOR, PTEN, RHEB, MLST8, RICTOR, VEGFA
    b. Axitinib: key genes: VEGFA, VEGFB, VEGFC, PDGFA, PDGFB, FLT1 (VEGFR1), KDR (VEGFR2), FLT4 (VEGFR3), PDGFRA, PDGFRB, KIT, KITLG, FIGF
    c. Trametinib: key genes: MEK1 (MAP2K1), MEK2 (MAP2K2), ARAF, BRAF, RAF1, ERK1 (MAPK3), ERK2 (MAPK1), MAPK10, KRAS, HRAS, NRAS, KSR1, RAP1A
    d. Afatinib: key genes: EGFR, ERBB2, ERBB3, ERBB4 and their ligands EGF, TGFA, AREG, EREG, HBEGF, BTC, NRG1, NRG2, NRG4
    e. FGFR inhibitors: FGFR1, FGFR2, FGFR3, FGFR4 and the FGF ligands 1, 2, 3, 4, 5 etc.
    f. Anti-PD1/PDL1: key genes: PDL1, PDL2, PD1, CTLA4, CD28, CD80, CD86, LAG3, TLR4, together with specific markers of the presence of effector tumor infiltrating immune cells: CD8A (cytotoxic lymphocytes T), CD16 (Natural Killer cells) and FOXP3 (T-regs cells)
2. Selection of the patients with available transcriptomics data and clinical outcome (PFS) under treatment with each drug available. Minimum three patients are required. Everolimus (N=6); axitinib (N=5);
    a. Preferably, patients with non-censored PFS were selected for investigations
    b. Only two patients had censored PFS under treatment (ID 203 treated with everolimus and ID 183 treated with pembrolizumab). They had exceptional PFS >60 months, continuing the treatment). The inventors did not discard them from analysis, but considered de-censored.
3. "Step-in" analysis, to define the optimal 'n' genes investigated interrogated the correlation between gene expression and the PFS: For each drug, a Pearson correlation test was performed between Fg, the fold change multiplied by the intensity (of tumor and normal) of a single gene g (gene from the list of key genes of the drug) with the PFS for all the patients treated with the drug.

$$F_g = \log 2(\textit{fch tumor vs.normal}) * \log 1.1(\text{tumor}) \text{ or}$$
$$F_g = \log 2(\textit{fch tumor vs.normal}) * \log 1.1(\text{normal})$$

The $F_g$ with the most significant correlated gene was driven to decision whether to continue with fold change multiplied by the intensity of the tumor or fold change multiplied by the intensity of the normal matched tissue. The key genes were then ranked based on the Pearson test's p value such that the gene with the highest correlation between $F_g$ and the PFS was ranked first. Then, the inventors added single genes by the following manner: the $2^{nd}$ most ranked gene was added to the $1^{st}$ most ranked and the $F_{g1,g2}$ of the 2 genes was calculated by 5 different methods: mean, median, sum and fold (both the absolute and non-absolute values) of $F_{g1}$ and $F_{g2}$. Similarly, the $3^{rd}$ most ranked gene was added to the 2 highest ranked genes. The addition of single genes described above was continued until all key genes were added. Then, a Pearson correlation test was performed between the various $F_{g1,\ldots,gn}$ with the PFS of the patients treated with the drug. The results were ranked again by the Pearson test's p value. The number of genes in the set which was the most correlated with the PFS was indicated as the optimal 'n' coordinates. $I_n$ order to assess the likelihood of getting a significant correlator by 'n' genes, the inventors run an analysis with 100K random 'n' genes and tested how the $F_{g1, \ldots gn}$ of these genes were correlated with the PFS. Significant results were considered by a threshold of absolute R value of 0.9 or above and p value of 0.05 and below.

4. Selecting of best correlators with PFS for each drug and computing a linear regression model to transform the best correlator into a predictor for a single drug.
1. Availability of the data: Population characteristics: Male or female patients above age 18 with advanced cancers that had progressed on standard treatment. Participating principal investigators (PIs) were located at Institute Gustave Roussy (IGR) (France), Centre Leon Berard (France), Vall d'Hebron Institute of Oncology (VHIO) (Spain), the Chaim Sheba Medical Center (CSM) (Israel), Segal Cancer Centre, MCGill University (Canada), University of Texas MD Anderson Cancer Center and University of California San Diego Moores Cancer Center. The protocol was approved at all sites that recruited patients. If the patient was navigated to an investigational clinical trial, the patient signed consent for that trial as well. Detailed clinical and biological information for each patient is available in Table 1. Further biological data available upon request on World Wide Web: wirconsortium.org containing: (i) tumor mutations data in XML format; and (ii) expression data in a table format (providing information about tumor/normal fold change and tumor intensity alone for all the cases for which mRNA was analyzed).

Results

The differential tumor versus analogous normal tissue expression of these genes was used for elaborating the prototype of the DDPP decision support tool. The inventors explored the fold changes, measuring the differential tumor versus normal gene expression of the key genes selected for each drug, which created different vectors/coordinates and correlated these data with progression-free survival (PFS) in patients treated in WINTHER trial. However, as the same fold change can be obtained with different intensity levels, the inventors explored, the fold changes in tumor versus normal multiplied by the intensity of the expression in tumor or in normal tissues (scalars). Details are provided in the Materials and Methods section.

The DDPP algorithm generates two types of results: 1) a digital visualization through tumor versus normal tissue expression intensity plots enabling an understanding of the interactions between the key genes and an estimate of their contributive weight; and 2) an outcome predictor generating, for each drug, the vectorial summation of the contributive genes and a regression model for the correlation between differential tumor to normal gene expression and PFS under treatment. The inventors investigated the DDPP profiles of key genes and examined the correlations with PFS for patients who received monotherapy with everolimus (n=6) and axitinib (n=5) for whom transcriptomic and PFS data were available. Similar work was performed for patients treated with other therapies in the WINTHER trial such as trametinib (MEK inhibitor); afatinib (pan-HER inhibitor), two experimental FGFR inhibitors (BGJ398 and TAS-120) with a similar mechanism of action, as well as for patients treated with anti-PD1/PDL1 monoclonal antibodies (pembrolizumab, nivolumab and atezolizumab).

All patients were heavily pretreated prior to receiving the treatment in the WINTHER trial. The main clinical and outcome characteristics of the patients treated are described in Table 1, together with next generation sequencing Foundation One test (Foundation Medicine) performed during the WINTHER study. One patient treated with everolimus (ID 203) and one patient treated with pembrolizumab (ID 183) had exceptional responses lasting in excess of 60 months and PFS was therefore censored at this timepoint. Both patients were included in the analyses.

DDPP Investigations of Patients Treated with Everolimus

Table 2 describes the currently recognized 17 key genes of the mTOR pathway (O'Reilly T. et al. Biomarker. Translational Oncology (2010) 3, 65-79, FDA-USPI everolimus: see World Wide Web: accessdata.fda.gov/drugsatfda_docs/label/2010/022334s6lbl.pdf). Upstream regulators of MTOR: PIK3CA, PIK3CB, AKT1, AKT2, PTEN, TSC1, TSC2, RHEB; FKB-12 (FKBP1A) play a key role as it binds to everolimus and interacts with MTOR resulting in the formation of inhibitory complexes MTORC1 (MTOR, MLST8 and RPTOR) and MTORC2 (MTOR, MLST8 and RICTOR); Downstream effectors are: S6K1 (RPS6KB1), 4EBP1 (EIF4EBP1), HIF1 (HIF1A) and VEGFA.

It should be noted that the genomic alteration profile could not explain the variation in PFS observed in the everolimus monotherapy group; indeed, the two patients with the longest PFS, both with GI tract neuroendocrine tumors, had no mutations (ID 203) or no genomic alterations in the PI3K/AKT/mTOR pathway (ID 148), respectively. In contrast, the patients with much shorter PFS (ID 227, ID 6, ID 90, and ID 117) did have alterations in the PI3K/AKT/mTOR, albeit accompanied by co-alterations that might have driven resistance. Since DNA biomarkers could not explain variations in clinical outcome, the inventors further investigated whether transcriptomics and DDPP could provide a deeper insight.

FIG. 1 shows the DDPP profile of the 17 key genes of the 6 patients treated with everolimus as monotherapy. Whilst MTOR has the same steady state level in both tumor and normal tissues, FIGS. 1E and 1F suggest a trend of greater overexpression of upstream regulators of MTORC1 complex (in particular TSC1 and AKT2) in patients with longer PFS (ID 148 and ID203) as compared with the patients with shorter PFS (ID 090, ID 227, ID 117 and ID 006).

The inventors evaluated the relative contribution of each of the 17 genes, by correlating their differential expression with the PFS in patients treated with everolimus. Pearson correlations between differential gene expression and PFS for each of the 17 genes were: AKT2 (R=0.75, p=0.087; TSC1 (R=0.74, p=0.094), FKB-12 (R=−0.67, p=0.149), TSC2 (R=0.63, p=0.178), RPTOR (R=0.61, p=0.198), RHEB (R=−0.49, p=0.325), PIK3CA (R=0.43, p=0.4), PIK3CB (R=−0.41, p=0.414), AKT1 (R=−0.35, p=0.496), MLST8 (R=−0.34, p=0.509), VEGFA (R=0.27, p=0.604), HIF1 (R=0.27, p=0.606), PTEN (R=−0.16, p=0.759), 4EBP1 (R=−0.16, p=0.77), RICTOR (R=0.14, p=0.788), MTOR (R=0.13, p=0.807) and S6K1 (R=−0.04, p=0.936).

Figure 2:
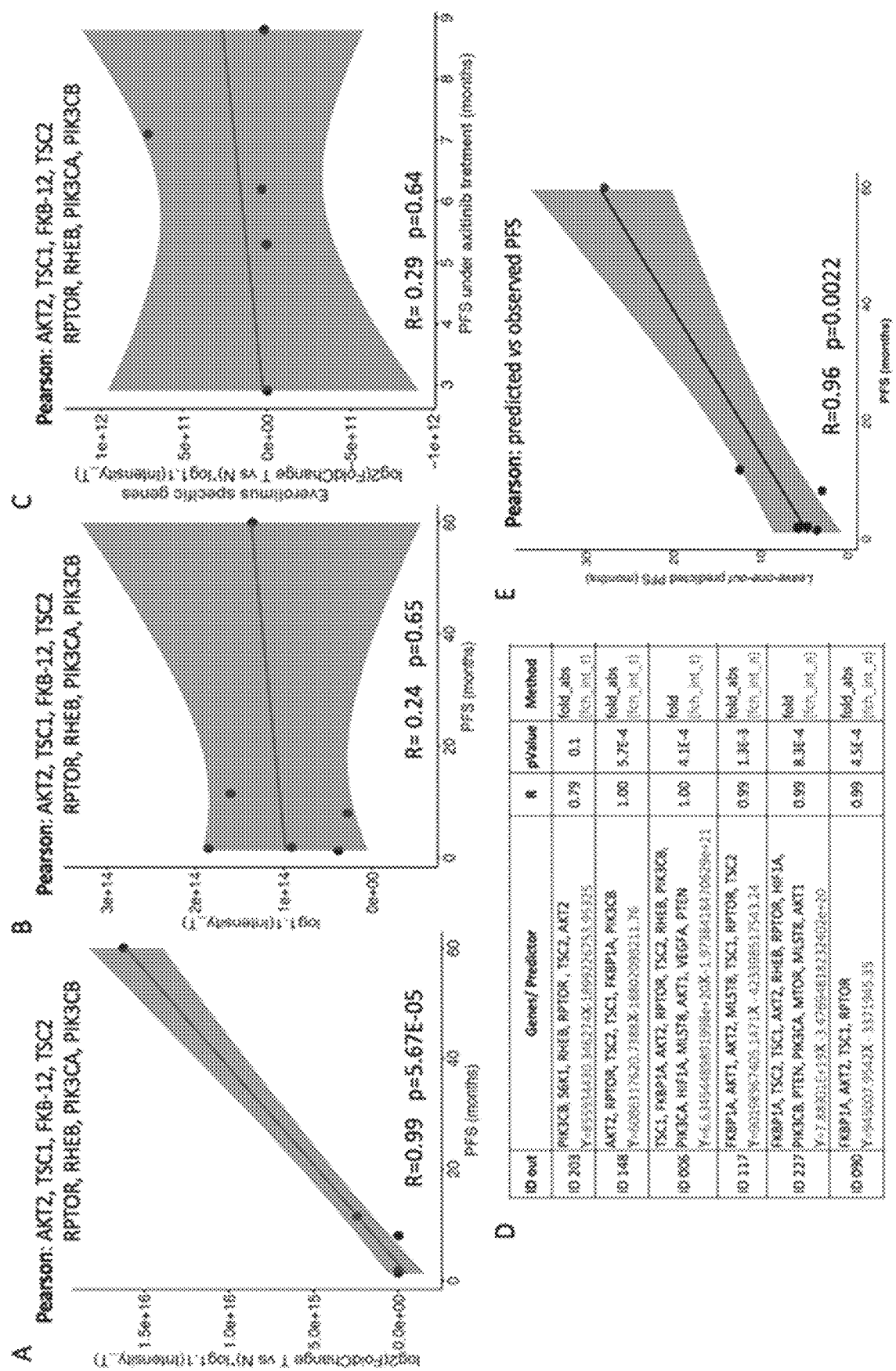
FIG. 2: DDPP correlation with PFS for patients treated with everolimus. A: Pearson correlation plots of the 8 gene predictor: AKT2, TSC1, FKB-12, TSC2, RPTOR, RHEB, PIK3CA and PIK3CB with the PFS of 6 patients treated with everolimus as monotherapy: One patient out of these 6 had censored PFS (ID 203). Y axis: absolute fold value of log 2 based fold-changes tumor versus normal multiplied by log 1.1 based of the intensities in tumor values for each of the 8 genes selected; X axis: PFS under treatment with everolimus as monotherapy in months. B: Pearson correlation plots of the 8 gene predictor: AKT2, TSC1, FKB-12, TSC2, RPTOR, RHEB, PIK3CA and PIK3CB with the PFS of 6 patients treated with everolimus as monotherapy when only the tumor biopsy is investigated: Y axis: absolute fold value of log 1.1 based of the intensities in tumor values for each of the 8 genes selected; X axis: PFS under treatment with everolimus as monotherapy in months. C: Shuffle experiment: Pearson correlation plots of the 8 gene specific predictor for everolimus (AKT2, TSC1, FKB-12, TSC2, RPTOR, RHEB, PIK3CA and PIK3CB) with the PFS of 5 patients treated axitinib as monotherapy (Table2); Y axis: absolute fold value of log 2 based fold-changes tumor versus normal multiplied by log 1.1 based of the intensities in normal values for each of the 8 genes selected, X axis: PFS under treatment with axitinib as monotherapy in months. D: Leave-one-out experiments: Each reiteration generates a predictor used to calculate PFS of the patient discarded. E: Pearson correlation between leave-one-out predicted PFS and the observed PFS. Y axis: Predicted PFS as defined by leave-one-out (in months), X axis: PFS under treatment with everolimus as monotherapy in months observed in WINTHER trial.

The inventors further explored the combined differential expression in tumor versus normal tissues of the most contributive key genes involved in the everolimus pathway. For each of the correlations with PFS, the inventors built a vectorial summation using a 'step-in' method, starting with AKT2 and adding successively a gene in the order of their significance: AKT2-TSC1; AKT2-TSC1-FKB12, then AKT2-TSC1-FKB12-TSC2 and so forth, obtaining in total 17 different vector summations. Each combined vector was correlated with PFS. FIG. 2A shows that the optimal performance was obtained by the vectorial summation of the 8 most contributive genes: AKT2, TSC1, FKB-12, TSC2, RPTOR, RHEB, PIK3CA and PIK3CB, to obtain the most significant correlation with PFS, among the 17 possibilities: (R=0.99, p=5.67E-05). The higher the relative expression of these key genes, the longer the PFS is under treatment with everolimus. The linear regression model for the correlation with PFS is: Y=6588874000820.68X−19753182063978.6, where Y=the absolute value of the fold of log 2 (Fold change tumor versus normal) multiplied by log 1.1 (Intensity_Tumor) of each value for each of the 8 genes, and X=PFS in months. FIG. 2B shows that when only the tumor biopsy was investigated (as usually done in the current biomarker studies in oncology practice or translational research), the significance of the correlation dropped to R=0.24, p=0.65), suggesting the importance of the new strategy of tumor versus normal analogous organ matched dual biopsy.

In order to assess the prognostic versus the predictive value of the DDPP data in these analyses, the inventors tested the specific predictor of the PFS for everolimus (n=6 patients) generated by 8 genes (AKT2, TSC1, FKB-12, TSC2, RPTOR, RHEB, PIK3CA and PIK3CB) and cross correlated their combined differential expression with the PFS of patients under axitinib treatment (n=5, Table 1). FIG. 2C demonstrates that the subset of genes identified for everolimus was highly specific to this everolimus regimen, as the cross correlation with PFS of patients treated with axitinib was not significant (R=0.29, p=0.637) suggesting that the DDPP findings are consistent with the known biology of the MTOR pathway and the mechanism of action of everolimus. Whether the DDPP biomarkers have predictive value to guide treatment selection must be confirmed in an independent cohort of patients.

To further explore the potential predictive value of DDPP, the inventors performed a full shuffle 'step-in' analysis and cross-correlated the differential expression of all of the 17 genes specific for everolimus with the PFS of the 5 patients treated with axitinib. None of the 17 genes correlated significantly with the PFS under axitinib: RICTOR (R=0.8, p=0.106); HIF1 (R=−0.77, p=0.131); RPTOR (R=−0.73, p=0.159); 4EBP1 (R=−0.73, p=0.163); S6K1 (R=−0.65, p=0.237) etc. Exploring the combined differential expression of these genes, there was no significant correlation in any of the 17 possible combinations: RICTOR-HIF1 (R=−0.27, p=0.656); RICTOR-HIF1-RPTOR (R=0.74, p=0.905); RICTOR-HIF1-RPTOR-4EBP1 (R=0.02, p=0.969); RICTOR-HIF1-RPTOR-4EBP1-S6K1 (R=0.37, p=0.54) etc. These data support the hypothesis that DDPP predictors for everolimus are specific for that therapeutic regimen.

In order to assess the robustness of DDPP method and to determine whether the model is over-fitting the correlations, the inventors performed both random selections of 8 genes (number corresponding to the optimal number of genes of the specific everolimus predictor) and of 17 genes (corresponding to the full set of key genes involved in everolimus mechanism of action) across the whole transcriptome (around 22,000 genes) and correlated their vectorial summation with PFS of the 6 patients who received everolimus monotherapy treatment. This analysis was repeated 100,000 times, randomly selecting a different set of 8 genes at each reiteration. Setting the threshold of significance at R>=0.9 and p<0.05, the percentage of random significant correlations with PFS was 16.587%. Setting the threshold of significance at the same value as the one observed for the predictor (R=0.99, p=5.67E-05), the percentage of random significant correlations with PFS was 1.018%. When the random selection involved 17 genes at each re-iteration (repeated 100,000 times), the percentage of the random significant correlations at the two different thresholds were 23.59% and 0.851% respectively.

The observation that randomly selected sets of genes generated significant correlations with PFS suggests that with only 6 patients in the cohort, a certain degree of overfitting of the correlations cannot be excluded in these analyses. The specificity of correlations could be increased only with a larger number of patients used as training and test datasets. Nevertheless, the biological understanding of the MTOR pathway and the effects of everolimus are consistent with the DDPP findings. Indeed, the most contributive genes, AKT2, TSC1, FKB-12, TSC2, RPTOR, RHEB are key for direct interaction with MTOR and its upstream regulation (TSC1, TSC2, RHEB). Furthermore, FKB-12 binds everolimus and associates to MTOR forming together with RPTOR the MTORC1 complex;

Leave-one-out experiments: To interrogate whether the findings of these analyses could be used as predictors, the inventors performed leave-one-out analyses, reiterating 6 combinatorial analyses. At each investigation, one patient was discarded, and a correlator/predictor was identified based on the remaining 5 patients applying the same methodology. The correlator was then used as a predictor to predict the PFS of the patient left out. FIG. 2D depicts the 6 correlations obtained in the re-iterative experiments, and FIG. 2E shows the correlation between the observed PFS and the leave-one-out predicted PFS. At each re-iteration, the predictor is generated by different subsets of genes, suggesting a high impact of the composition of the cohort when small number of patients investigated. This observation pinpoints the need to validate the DDPP on a larger cohort of patients. Nevertheless, the concordance between real PFS of the patients left out, and the predicted PFS using the correlator obtained at each reiteration on the remaining 5 patients is significant, with R=0.96, p=0.0022. These preliminary observations suggest the realistic possibility of obtaining a stable predictor, using a higher number of patients, to obtain a validated tool that may be useful to accurately estimate the PFS in a prospective clinical setting.

DDPP Investigations for Patients Treated with Axitinib

At nanomolar concentrations, axitinib specifically inhibits VEGFR1, VEGFR2 and VEGFR3. Thirteen key genes involved in the control of the angiogenesis were selected and investigated with DDPP methodology: FLT1 (VEGFR1), KDR (VEGFR2), FLT4 (VEGFR3) and their ligands VEGFA, VEGFB, VEGFC and FIGF, PDGFRA, PDGFRB, PDGFA, PDGFB, KIT and KITLG axitinib: (FDA-USPI AIGVL-Perfectlaw\PerfectLaw\DOCS\1764\BKR.848\APPL\w see World Wide Web: accessdata.fda.gov/drugsatfda_docs/label/2012/202324lbl.pdf). Four patients had head and neck carcinoma, and one patient had a lung adenocarcinoma. Table 1 shows the different PFS under treatment with axitinib.

Figure 3:
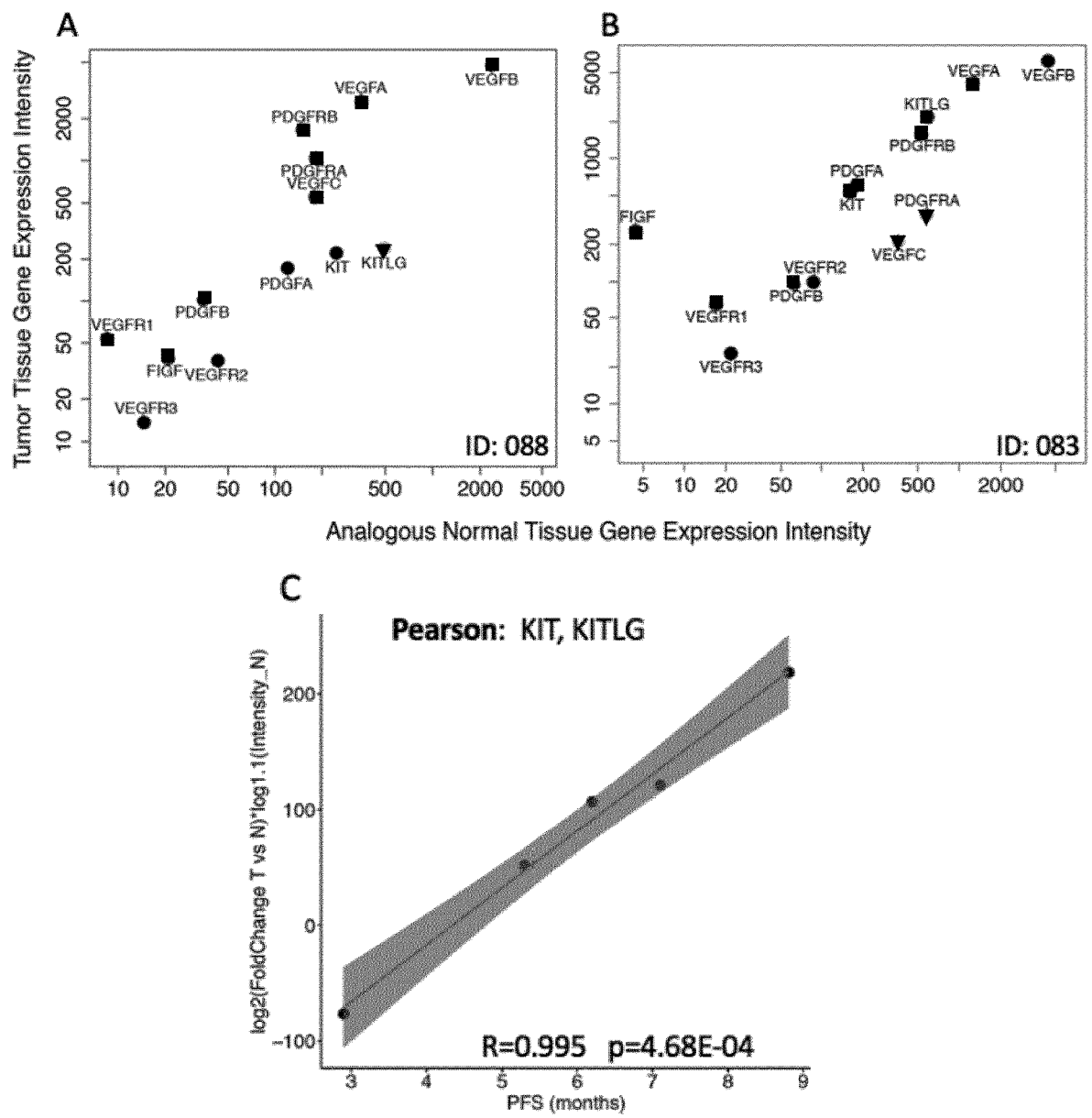
FIG. 3: DDPP intensity plots and correlation with PFS for patients treated with axitinib. Examples of DDPP profiles for two patients treated with axitinib in monotherapy, with different outcomes. A: ID 088, NSCLC, PFS=2.9 months in $2^{nd}$ therapy line. B: ID 083, HN, PFS=8.8 months in $5^{th}$ therapy line. Y axis: intensity of the expression in tumors; X axis: intensity of the expression in normal matched tissue. Overexpression for a given mRNA in the tumor as compared to the normal is denoted with a square (■), underexpression is denoted with a triangle (▼) and no change is denoted with a black point (•). C: Plots representing the Pearson correlation of the 2 gene-predictor (KIT, KITLG) with the PFS of the 5 patients treated with axitinib as monotherapy (one patient NSCLC and four patients HN). Y axis: sum value of log 2 based fold changes tumor versus normal multiplied by the log. 1.1 based intensity values of the normal for each of the 2 genes selected; X axis: PFS under treatment in months.

The differential tumor versus normal expression of KIT and of its ligand KITLG was identified as being the major driver of the correlation with the PFS of the patients treated with axitinib FIG. 3A, 3B), and their combined vector: KIT-KITLG generated the optimal performance in the correlation with PFS: R=0.99, p=4.68E-04 (FIG. 3C). The linear regression model is Y=49.13X−213.31, where Y=the sum of log 2 (Fold change tumor versus normal) multiplied by log 1.1 (Intensity_Normal) of each value for each of the 2 genes, and X=PFS in months.

To examine the possibility of overfitting the correlations the inventors performed both random selections of 2 genes (number corresponding to the optimal number of genes of the specific optimal axitinib predictor) and of the 13 genes (corresponding to the full set of key genes involved in axitinib mechanism of action) across the whole transcriptome. Random selections of 2 genes across the whole transcriptome and correlation of their vectorial summation with PFS of the 5 patients treated with axitinib, repeated 100,000 times, show that the percentage of random significant correlations with PFS, at the threshold abs R≥0.9 and p≤0.05 is 5.957%. Using the same threshold as the specific predictor (R=0.99, p=4.68E-04.) the percentage of significant correlations was 0.059%. Random selection of 13 genes (number corresponding to the full set of key genes) and correlation with PFS under axitinib, repeated 100,000 times, showed that the percentage of random significant correlations (at the same two thresholds) were 5.671% and 0.061% respectively.

Leave one out experiments: The inventors performed (using the same 'step-in' vectorial summation methodology) 5 leave-one-out re-iterations, discarding at each experiment one patient and building a predictor on the remaining 4. The inventors observed again an instability of the predictors and dependence on the compositions of the cohorts at each re-iteration. The concordance between real PFS of the patients left out, and the predicted PFS using the correlator obtained at each reiteration was lower than for the everolimus example (R=−0.81, p=0.1) likely related to a lower number of patients in each re-iteration. These data suggest again that performance and accuracy of the prediction of the PFS could be increased only with a higher number of patients in the training and validation datasets.

DDPP and Other Examples of TKI

Figure 4:
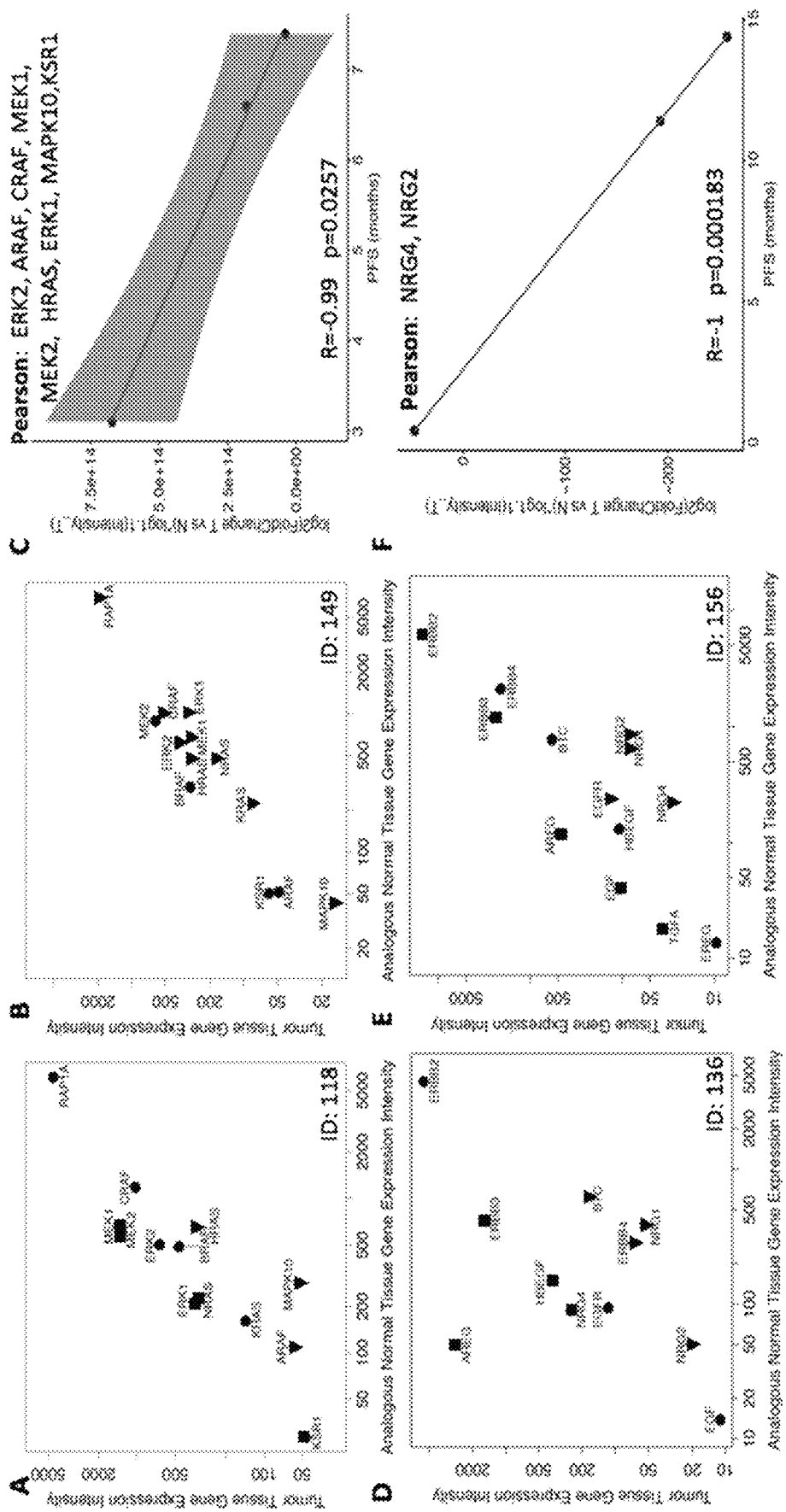
FIG. 4: DDPP profiles and correlations with PFS for patients treated with trametinib, afatinib and experimental FGFR inhibitors. Examples of DDPP profiles for two patients treated in monotherapy with trametinib (A, B, C), afatinib (D, E, F) and FGFR inhibitors (G, H, I), with different outcomes. Overexpression for a given mRNA in the tumor as compared to the normal is denoted with a square (■), underexpression is denoted with a triangle (▼) and no change is denoted with a black point (•). A: ID 118, NSCLC, PFS=3.1 months in $4^{th}$ therapy line; B: ID 149, Rectum carcinoma, PFS=7.4 months in $6^{th}$ therapy line. D: ID 136, NSCLC, PFS=0.4 months in $4^{th}$ therapy line; E: ID 156, NSCLC, PFS=14.3 months in $3^{rd}$ therapy line G: ID 228, Colon carcinoma, PFS=0.7 months in $6^{th}$ therapy line; H: ID 237, Head and Neck carcinoma, PFS=19.3 months in $7^{th}$ therapy line. Y axis: intensity of the expression in tumors; X axis: intensity of the expression in normal matched tissue. C: Plot representing the Pearson correlation of the 9 gene-predictor ERK2, ARAF, CRAF, MEK1, MEK2, HRAS, ERK1, MAPK10 and KSR1) with the PFS of the 3 patients treated with trametinib as monotherapy Y axis: fold value of log 2 based fold changes tumor versus normal multiplied by the log. 1.1 based intensity values of the tumor for each of the 9 genes selected X axis: PFS under treatment in months. F: Plot representing the Pearson correlation of the 2 gene-predictor NRG4 and NRG2, with the PFS of the 3 patients treated with afatinib; Y axis: the sum of log 2 (Fold change tumor versus normal) multiplied by log 1.1 (Intensity_Tumor) of each values for each of the 2 genes; X axis=PFS in months; I: Plot representing the Pearson correlation of the 5 gene-predictor FGF10, FGF16, FGF5, FGF2 and FGF13); Y axis: the sum of log 2 (Fold change tumor versus normal) multiplied by log 1.1 (Intensity_Normal) of each values for each of the 5 genes; X axis=PFS in months.

Trametinib-Thirteen key genes were investigated: MEK1 (MAP2K1), MEK2 (MAP2K2), ARAF, BRAF, RAF1, ERK1 (MAPK3), ERK2 (MAPK1), MAPK10, KRAS, HRAS, NRAS, KSR1, RAP1A. The combined differential tumor versus normal tissue expression of 9 genes and their vectorial summation correlated with the PFS of 3 patients treated with trametinib as monotherapy Table 1 and FIG. 4A, 4B, 4C): ERK2, ARAF, CRAF, MEK1, MEK2, HRAS, ERK1, MAPK10 and KSR1 (R=−0.99, p=0.026); The linear regression model is Y=−145283210513695X+ 1125665952686062, where Y=the fold of log 2 (Fold change tumor versus normal) multiplied by log 1.1 (Intensity_Tumor) of each values for each of the 9 genes, and X=PFS in months.

Afatinib-Thirteen key genes were investigated: EGFR, ERBB2, ERBB3, ERBB4 and their ligands EGF, TGFA, AREG, EREG, HBEGF, BTC, NRG1, NRG2, NRG4. The combined differential tumor versus normal tissue expression of 2 genes and their vectorial summation correlated with the PFS of 3 patients treated with afatinib as monotherapy (Table 1 and FIG. 4D, 4E, 4F): NRG4 and NRG2 (R=−1 p=1.83E-04). The linear regression model is Y=−21.7724X+ 55.93, where Y=the sum of log 2 (Fold change tumor versus normal) multiplied by log 1.1 (Intensity_Tumor) of each value for each of the 2 genes, and X=PFS in months.

FGFR inhibitors-Nineteen key genes investigated: FGFR1, FGFR2, FGFR3, FGFR4 and the FGF ligands 1, 2, 3, 4, 5 etc.). The differential expression and vectorial summation of 5 genes correlated with the PFS of 3 patients treated with FGFR inhibitors BGJ398 or TAS-120 as monotherapy (Table 1 and FIG. 4G, 4H, 4I): FGF10, FGF16, FGF5, FGF2 and FGF13 (R=−1, p=1.6E-04). The linear regression model is Y=−19.011X+98.36, where Y=the sum of log 2 (Fold change tumor versus normal) multiplied by log 1.1 (Intensity_Normal) of each value for each of the 5 genes, and X=PFS in months.

DDPP and Prediction of Outcome after IO Treatment:

Although the most advanced knowledge has been generated around the therapies targeting PD1/PDL1 or CTLA-4, there are multiple other important pathways that may impact the immune response to cancer involving many genes, in particular LAG3, TLR4, VISTA, TIM3, TIGIT, ICOS, OX40, GITR, TIM3 (Spencer C. et al. Cancer Discovery, 2018| 1069). Among them LAG3 and TLR4 may have a particular importance, as described in Table 3. Given the current status of knowledge, the IO-specific DDPP gene-set focuses on: PDL1, PDL2, PD1, CTLA4, CD28, CD80, CD86, LAG3, TLR4, together with specific markers of the presence of effector tumor infiltrating immune cells: CD8A (cytotoxic lymphocytes T), CD16 (Natural Killer cells) and FOXP3 (T-regs cells). Many types of immune cells are involved in the activation and regulation of the immune system attack against tumor cells (APC, LyT CD4+etc.) but the inventors focused on specific markers for infiltrating LyTc, NK and Tregs that have the ability to recognize directly the tumor cells' neoantigens coupled with major histocompatibility complex 1 (CMH1) and are directly targeting tumor cells.

Figure 5:
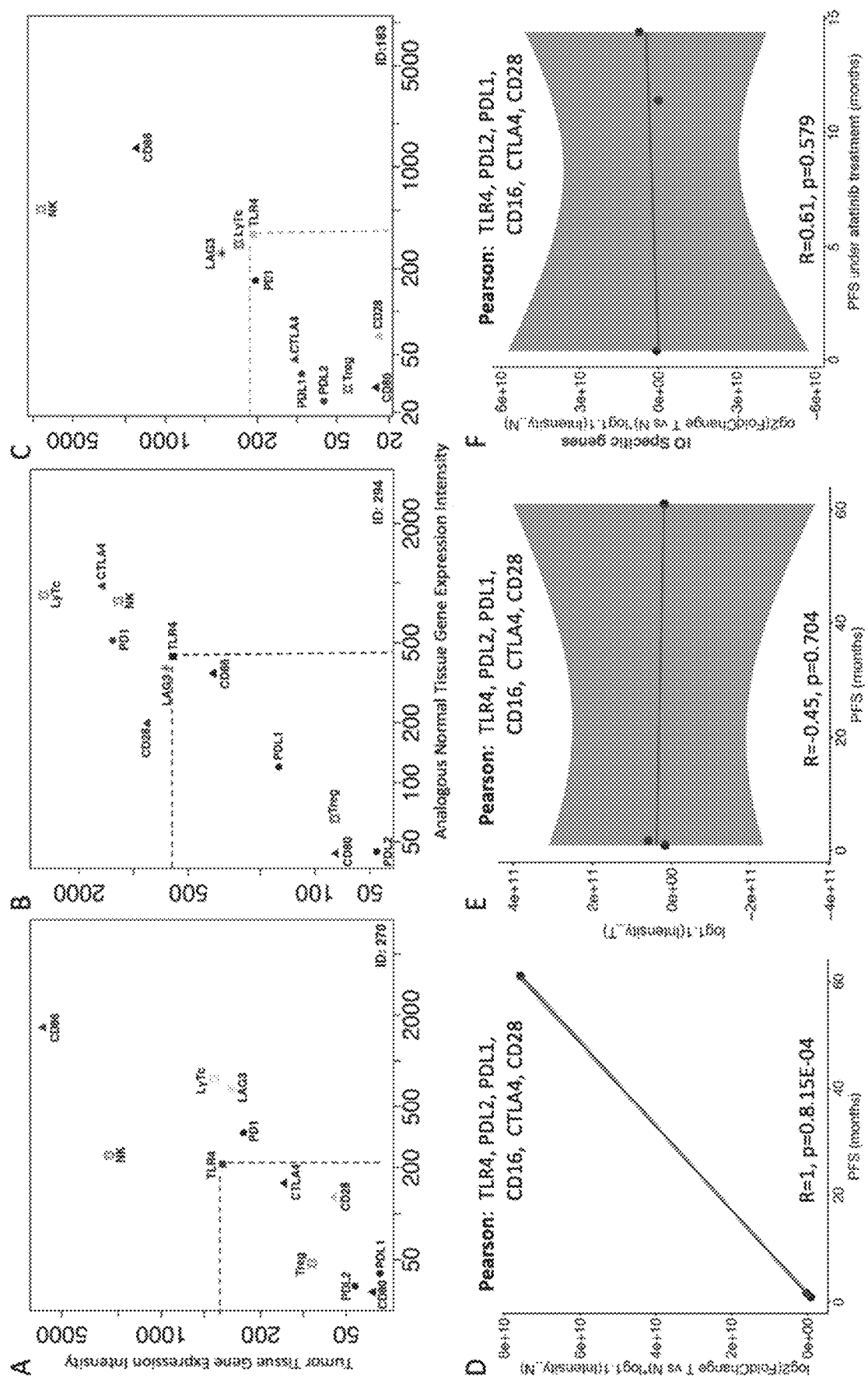
FIG. 5: DDPP intensity plots and correlation with PFS for patients treated with anti-PD1 therapies. A, B, C: DDPP profiles of 3 patients treated with anti PDL1/PD1 antibodies, with different PFS under treatment. Data source WINTHER trial. A: colon cancer: PFS=0.9 months under treatment with atezolizumab, in $4^{th}$ therapy line; B: head and neck cancer: PFS=1.7 months under treatment with nivolumab in $2^{nd}$ therapy line; C: colon cancer, PFS: 61+months under treatment with pembrolizumab in $3^{rd}$ therapy line; Y axis: intensity of the expression in tumors; X axis: intensity of the expression in normal matched tissue. D: Pearson correlation between a vectorial summation of 6 genes: TLR4, PDL2, PDL1, CD16 (specific marker of NK), CTLA4 and CD28; Y axis: fold value of Log2 (Fold Change tumor vs. normal) multiplied by intensity in normal values for each of the 6 genes selected; Y axis: PFS in months. E: Pearson correlation between the vectorial summation of the 6 genes specific anti-PD1: TLR4, PDL2, PDL1, CD16 (specific marker of NK), CTLA4 and CD28 and the PFS of 3 patients treated with IO when only tumor biopsy information is investigated; Y axis: fold value of Log2 (intensity in tumor) values for each of the 6 genes selected; Y axis: PFS in months. F: Shuffle experiment: Pearson correlation between the vectorial summation of the 6 genes specific anti-PD1: TLR4, PDL2, PDL1, CD16 (specific marker of NK), CTLA4 and CD28 and the PFS of 3 patients treated with afatinib; Y axis: fold value of Log2 (Fold Change tumor vs. normal) multiplied by log 1.1 (intensity in normal) values for each of the 6 genes selected; Y axis: PFS of 3 patients under afatinib treatment (months).
Figure 6:
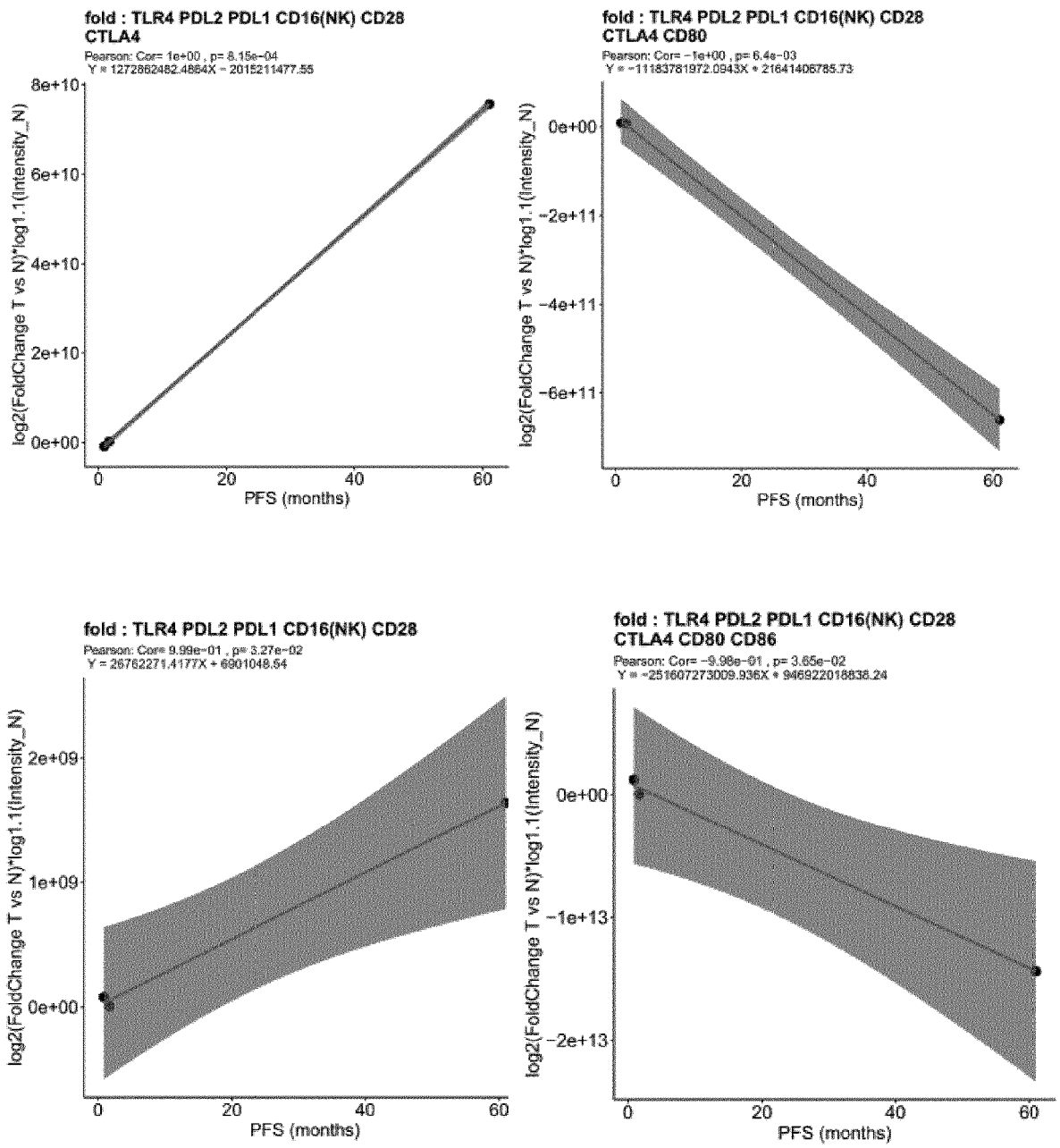
FIG. 6: Definition of the optimal gene signature for PD-1/PD-L1 therapies based on the DDPP correlation with PFS for patients treated with anti-PD1 therapies. Each graph represents the Pearson correlation between the vectorial summation of the genes mentioned at the top of each graph.

A correlation analysis between differential gene expression of the selected genes and the PFS was performed for the three patients treated with anti-PD1 antibodies (Table 1) in the WINTHER trial. The example provided in FIGS. 5A, 5B and 5C shows the DDPP intensity plots of 3 patients treated with IO pembrolizumab (anti-PD1), atezolizumab (anti-PDL1) and nivolumab (anti-PD1); two patients had colon cancer (CRC) and one head and neck (HN) cancer. Their clinical outcomes were: ID 183 (CRC) PFS 61+months (the patient is in complete clinical remission and no longer receiving pembrolizumab); ID 294 (HN) PFS 1.7 months and ID 270 (CRC) PFS 0.9 months. DDPP profiling identified that the higher level of TLR4 fold change in tumor versus normal tissues, the shorter the survival under treatment with anti-PD1. Considering that all three treatments are directed to leverage the PDL1/PD1 negative blockade, and considering that the mechanisms may be agnostic of tumor type, the inventors performed the investigations aiming to explain the variations PFS.

The relative contribution of each of the key 12 genes was evaluated by correlating their differential expression with the PFS in patients treated with IO. Pearson correlations between differential gene expression and PFS for each of the 17 genes were: TLR4 (R=−0.99, p=0.103; PDL2 (R=0.97, p=0.143), PDL1 (R=0.90, p=0.294), CD16 (NK) (R=0.77, p=0.445), CTLA4 (R=0.60, p=0.588), CD28 (R=−0.50, p=0.665), CD80 (R=−0.49, p=0.67), CD86 (R=−0.42, p=0.721), LAG3 (R=0.34, p=0.776), CD8A (LyTCD8+) (R=−0.30, p=0.803), FOXOP3 (Tregs) (R=−0.21, p=0.862) and PD1 (R=−0.18, p=0.882).

The inventors further explored the combined differential expression in tumor versus normal tissues of the most contributive key genes involved in the IO pathway. For each of the correlations with PFS, the inventors built a vectorial summation using a 'step-in' method, starting with TLR4 and adding successively a gene in the order of their significance: TLR4-PDL2, TLR4-PDL2-PDL1, then TLR4-PDL2-PDL1-CD16 and so forth, obtaining in total 12 different vector summations. Each combined vector was correlated with PFS. FIG. 5D shows that the optimal performance was obtained by the summation of the 6 most contributive genes: TLR4, PDL2, PDL1, CD16 (NK), CTLA4 and CD28, to obtain the most significant correlation with PFS, among the 12 possibilities: (R=1, p=8.15E-04). The linear regression model for the correlation with PFS is: Y=1272862482.4864X-2015211477.55, where Y=the value of the fold of log 2 (Fold change tumor versus normal) multiplied by log 1.1 (Intensity_Normal) of each value for each of the 6 genes, and X=PFS in months. These data suggest that the main confounders explaining differences in PFS under anti-PD1 therapy are the degree of activation of TLR4, and the balance between PDL1, PDL2 and CTLA4 activation of the negative immune-blockade. FIG. 5E shows that when only the tumor biopsy was investigated (as usually in the current biomarker studies in oncology practice or translational research), the significance of the correlation dropped to R=−0.45, p=0.704, suggesting the importance of the new strategy of tumor versus normal analogous organ matched dual biopsy.

In order to assess the prognostic versus the predictive value of the DDPP data for IO in these analyses, the inventors tested the specific predictor of the PFS (with the 6 genes (TLR4, PDL2, PDL1, CD16 (NK), CTLA4 and CD28)) for anti-PD1 treatments (n=3 patients) and cross correlated their combined differential expression with the PFS of patients under afatinib treatment (n=3, Table 1). FIG. 5F demonstrates that the subset of genes identified for anti-PD1 did not correlate with the PFS of the patients treated with afatinib (R=0.61, p=0.579) suggesting high specificity for IO regimen.

Robustness of DDPP method was tested through random selections of 6 genes (number corresponding to the optimal number of genes of the specific anti-PD1 predictor) across the whole transcriptome (around 22,000 genes) and correlated their vectorial summation with PFS of the 3 patients who anti-PD1 treatment. The analysis was repeated 100,000 times, randomly selecting a different set of 6 genes at each reiteration. Setting the threshold of significance at the same value as the one observed for the predictor (R=1, p=8.15E-04), the percentage of random significant correlations with PFS was 0.356%.

Based on the 6 genes identified, the inventors assessed 'in silico' the predicted PFS of the 82 patients (for whom no information was missing), agnostic of tumor type and independent of the number of prior lines of therapy, if they were treated with anti-PD1 therapies. For 57 patients (59.5%) the predicted PFS under anti PD1 treatment was ≤6 months (with a majority less than 3 months); for 25 patients (30.5%) the predicted PFS under anti-PD1 treatment was >6 months (of which 16 (19.5%) with PFS >24 months). These data are concordant with clinical trial data that IO benefits around 20% of patients for a prolonged period of time.

DISCUSSION

The actual biomarkers used in current translational research and clinical practice illustrate a paradox: On one hand, all models require large cohorts of patients for their validation, but often lack precision when applied to an individual patient, because of the complex portfolio of confounders found in the individual tumors. On the other hand, physicians are compelled to offer personalized therapies to unique individuals, without a systematic accurate system for treatment selection, using by default what is available, mainly companion diagnostics (see World Wide Web: fda.gov/medical-devices/vitro-diagnostics/list-cleared-or-approved-companion-diagnostic-devices-vitro-and-imaging-tools). This paradox reveals that the current therapeutic approach, using one-dimensional biologic coordinates (e.g., companion diagnostic provided by specific DNA aberrations, tumor mutation burden (TMB) or PDL1 status, microsatellite instability status) to select therapies, that predict potential responders versus non-responders (binary categories) is inadequate.

To address this paradox, the inventors shifted the paradigm of statistical analysis placing the patient's tumor in a multi-dimensional space instead of using one-dimensional coordinates. Such a shift was possible by exploring transcriptomics beyond DNA sequencing, and by adapting the Euclidian hyperspace mathematical model (Solomentsev, E. D. (2001) [1994], "Euclidean space", in Hazewinkel, Michiel (ed.), Encyclopedia of Mathematics). Applied to oncology, the hyperspace refers to the biology of each patient's tumor and analogous organ matched normal tissue. The multi-dimensional coordinates (key genes) that may define a patient's clinical outcome in the biological space $R^n$, forms an n-dimensional vector space over the field of real numbers with the addition of the structure of linearity. The PFS transcriptomics vector space associated with specific drugs comprised n-vectors (each vector in DDPP is defined by fold changes of the differential specific gene expression between tumor and normal for each specific gene). Vector interactions were obtained by their summation. Determination of the subset of coordinates that best correlates with PFS was performed by a step-in combinatorial investigation. To increase accuracy, the vectors have been multiplied/"scaled" by the intensities/steady state levels of transcripts of each specific gene (in DDPP). These data led to the selection of an optimal number of key genes/transcriptomic variables that correlate with PFS observed with treatment with a specific drug (everolimus, axitinib, trametinib, afatinib, FGFR, and anti-PD1/PDL1). It should be noted that other existent analytical methods such as Multiple Linear Regression (MLR) or COX Regression were tested but could not be adapted for the purpose of the study.

This methodology based on vectorial summation of the differential expression of the most contributive genes, differentiates DDPP from other methodologies that use one-dimensional biologic coordinates (e.g., specific DNA aberrations, TMB, PDL1 expression, microsatellite instability status). Another unique feature of DDPP that contrasts with the companion diagnostic test concept is that the predictors are non-binary, providing only categories of patients who will potentially benefit or not from specific therapies, but continuous, aiming to estimate the duration of the PFS.

The investigation of tumor and analogous organ-matched normal tissue biopsies from the same patient is of crucial importance for accurate interpretation of the transcriptomic data as it discards the transcriptomic genetic variability background noise in each patient, and lowers significantly the variance of transcriptomic measurements (Koscielny, S. Sci. Transl. Med. 2, 14ps2 (2010)). Today there are very few clinical applications of biomarkers based on transcriptomics (all focused on investigating only tumor biopsies), such as Oncotype and Mamaprint (Ioannidis, J. P. PLOS Medicine. 2, e124 (2005)), but they are not used for the purpose of predicting the PFS of patients receiving specific targeted therapies. The inventors were able to use such transcriptomic and PFS data from the WINTHER trial database. The WINTHER trial remains the only clinical trial that used transcriptomics in a prospective clinical setting in addition to conventional DNA sequencing to help inform the treatment decision for patients with advanced cancer. WINTHER is also the first and only trial that used the dual biopsy strategy, investigating both tumor and analogous normal tissue from the same patient, across a variety of solid tumors.

The inventors explored the DDPP to assess correlations with PFS associated with the drugs everolimus, axitinib, trametinib, afatinib, experimental FGFR inhibitors and anti-PD1/PDL1 therapies observed in the WINTHER trial. Remarkably, for all drugs tested, DDPP enabled identification of significant correlations between the differential expression of subsets of key genes and the PFS for each drug investigated. Preliminary observations show that the DDPP biomarkers seem to be specific to the therapeutic regimens. It should be noted that the DDPP was agnostic of tumor type and independent of the number of prior lines of therapy and could also provide important insight in better understanding the clinical outcomes by identifying the genes with the highest contributing weight driving the correlations.

Random testing performed for all drugs suggest that DDPP data are not likely to be statistical artefacts. Moreover, these data suggest that the subsets of genes selected, and the correlations obtained by their combined differential tumor versus normal tissues expression (vector summation) with the PFS for each therapeutic regimen may be specific for each drug and have a predictive value rather than a prognostic value, although this requires confirmation in larger studies.

Taken together, the data suggest the possibility that using a larger number of patients will allow to generate a validated tool that may be useful to estimate with accuracy the PFS in a prospective clinical setting. Indeed, many drugs investigated in this report, have a narrow spectrum of approved clinical uses, given the prevalence of their pathways in tumor growth and spread, and the reason is probably related to the lack of reliable biomarkers to select patients who might have a therapeutic benefit.

As representative examples, everolimus is approved today for the treatment of advanced renal cell carcinoma (RCC) after failure of treatment with sunitinib or sorafenib, for the treatment of sub-ependymal giant cell astrocytoma (SEGA) associated with tuberous sclerosis (TS) in patients who require therapeutic intervention but are not candidates for curative surgical resection and for the treatment of pancreatic and GI neuroendocrine tumors. Axitinib, (alone or in combination with avelumab), is indicated for the treatment of advanced renal cell carcinoma. In the WINTHER trial the experimental treatment with everolimus, axitinib, afatinib, trametinib and IO resulted in significant responses in patients with other types of tumors who had been heavily pretreated and had exhausted standard therapeutic options: GI tract neuroendocrine tumors, head and neck adenocarcinomas, colorectal carcinomas and lung non-small cell adenocarcinomas.

To the inventor knowledge potential biomarkers based on transcriptomics do not exist for the clinical use of everolimus or axitinib. Indeed, DDPP may provide for the first time a methodology and tools that would enable prediction of PFS for any drug (IO, or non IO targeted therapeutics) or tumor type and in any therapy line. DDPP predictors could be used (pending further validation) to identify the patients who could have clinical benefit from the treatment with everolimus and axitinib that was not predicted by genomic alterations in the WINTHER trial.

The DDPP concept and methodology was tested also on other drugs: trametinib, afatinib and two experimental FGFR inhibitors (BGJ398 and TAS-120) with a similar mechanism of action and similar trends obtained in the everolimus and axitinib examples.

The inventors investigated a cohort (n=3) of patients that received anti-PDL1 therapies. Data suggest that the main confounders explaining differences in PFS under anti PD1 therapy are the degree of activation of TLR4, and the balance between PDL1, PDL2 and CTLA4 activation of the negative immune-blockade, together with the level of infiltration of the tumor by Natural Killer cells. Both DDPP intensity plots and vectorial summation correlative analyses identified TLR4 as the most contributive gene to explain variations in PFS. Observations suggest that the current panel of biomarkers used in clinical practice (tumor mutation burden, microsatellite instability and PDL1 status) could be complemented with other potential biomarkers such as TLR4. Indeed, TLR4 signaling in immune and inflammatory cells of the tumor microenvironment may lead to production of pro-inflammatory cytokines (TNF, IL-1$\beta$, IL-6, IL-18, etc.), immunosuppressive cytokines (IL-10, TGF-$\beta$, etc.) and angiogenic mediators (VEGF, EGF, TGF-$\beta$) that influence the immune response to tumor cells. Furthermore, the exploration of the association of antiTLR4 with anti-PDL1 treatments could be of interest with the aim to increase the fraction of patients who could benefit from IO treatments.

The methodology envisioned here can be applied in the earliest stages of clinical development, such Phase I clinical trials, as exemplified by investigation of experimental FGFR inhibitors BGJ398 and TAS-120 tested in the clinical trials NCT01004224 and NCT052778 respectively, as part of the navigational WINTHER trial.

In conclusion, the unique transcriptomic dataset obtained from tumor and organ matched normal tissue biopsies were essential to enable correlations with clinical outcome under treatment with TKI inhibitors and IO. The DDPP is potentially a new global biomarker model that can apply to any type of drug (IO or non IO targeted drugs) alone or in combination, agnostic of tumor type, and can lead, pending further prospective validation, to a new approach to optimal treatment selection for patients with cancer, in particular for those that have exhausted therapeutic and biomarker options.

TABLE 1

Characteristics of the patients treated in WINTHER trial, investigated with DDPP

| Study ID | Age | Sex | Cancer site* | Prior lines | PFS month | DNA - List of molecular alterations (FM report)** | Drug_given |
|---|---|---|---|---|---|---|---|
| 203 | 67 | F | GI/NE | 1 | 60.0+ | No mutation | Everolimus |
| 148 | 82 | M | GI/NE | 2 | 11.6 | BCOR N1652fs*34; CDKN1B E126fs*1 | Everolimus |
| 6 | 64 | F | UP | 1 | 8.1 | TSC1 splice site 913 + 1G > T; BRCA1 truncation, intron 11; CDKN2A/B loss; DNMT3A R882H; LRP1B loss | Everolimus |
| 117 | 34 | M | HN | 2 | 1.9 | TSC2 S1431L; TP53 G245S; BCOR K374fs*19; SMARCA4 R1135W | Everolimus |

TABLE 1-continued

Characteristics of the patients treated in WINTHER trial, investigated with DDPP

| Study ID | Age | Sex | Cancer site* | Prior lines | PFS month | DNA - List of molecular alterations (FM report)** | Drug_given |
|---|---|---|---|---|---|---|---|
| 227 | 56 | M | LS | 4 | 1.7 | STK11 F354L; STK11 F354L; TERT promoter - 124 C > T | Everolimus |
| 90 | 74 | M | HN | 2 | 1.3 | PIK3CA Q546R; EP300 D1154fs*30; NOTCH1 L1746fs*40 | Everolimus |
| 83 | 59 | M | HN | 4 | 8.8 | MTOR L2209V; ETV6 trunc intron 5; CIC S333fs*36; MLL2 G3698 fs*51 | Axitinib |
| 223 | 65 | F | HN | 3 | 7.1 | CCND1 T286I | Axitinib |
| 259 | 53 | F | HN | 4 | 6.2 | PDGFRA amp | Axitinib |
| 25 | 65 | M | HN | 2 | 5.3 | TP53 I195F; KDM6A L725fs*4; MSH6 K1358fs*2; NFE2L2 R18Q | Axitinib |
| 88 | 56 | M | Lung | 1 | 2.9 | DNMT3A R635P; KRAS G12C; TP53 Y220C; MLL2 T1246M | Axitinib |
| 149 | 54 | F | CRC | 5 | 7.4 | KRAS G12V; ARID1A SPLICE SITE 2733-1G > A | Trametinib |
| 100 | 43 | M | Lung | 2 | 6.6 | BRAF A598__T599insT; IDH1 R132C | Trametinib |
| 118 | 78 | F | Lung | 3 | 3.1 | KRAS G12C; CDKN2A/B loss; TP53 V157F, Y220 fs*27; MUTYH G382D | Trametinib |
| 156 | 71 | F | Lung | 2 | 14.3 | EGFR E746__A750del, T790M; CDKN2A/B loss; CTNNB1 S33F; MYC amplification; SMAD4 P186fs*6; STAG2 splice site 1535-12__1630del108 | Afatinib + Cetuximab |
| 235 | 60 | F | Lung | 1 | 11.3 | ERBB2 A775__G776insYVMA | Afatinib |
| 136 | 79 | M | Lung | 3 | 0.4 | ERBB3 amp; MET splice site 3028 + 1G > A; STK11 Q100*; ATM L2450fs*11; BRCA1 E23fs*17; CDK4 amp; CDKN2A/B loss; MDM2 amp; APC I1307K; KDM5C truncation; MAP3K1 S1475* | Afatinib |
| 237 | 47 | M | HN | 6 | 19.3 | CCND1 amp; FGFR2 amp; CDKN2A/B loss; FGF19 amp; FGF4 amp; BAP1 trunc exon 3; FGF3 amp; MAGI2 Q1077*; PBRM1 E1155fs*17 | NCT01004224 BGJ398 |
| 247 | 67 | M | Esophagus | 2 | 1.6 | FGFR2 amp; CDKN2A/B loss; TP53 W91*; ASXL1 splice site 472 - 2A > G | NCT02052778 TAS-120 |
| 228 | 38 | M | CRC | 5 | 0.7 | FGFR1 amp; TP53 C176F; APC E1322*, R213*; SMAD4 loss; SOX9 V163fs*21 | NCT02052778 TAS-120 |
| 183 | 66 | M | CRC | 2 | 61.0+ | RBB3; V104M; MAP2K1; E203K; CDKN2A/B loss; FBXW7 R465C; PIK3CA E39K; PIK3R1 R348*, R639*; PTEN R233*, splice site 801 + 2T > G; TP53 R158H, R273H; APC R1450*, R499*; ARID1A P1115fs*46, Q1306fs*17; ATRX Q2422*; CDH1 D433N; EP300 R2263*; FAM123B R631*; FAT1 A4305V; FLCN H429fs*39; MSH6 L1330fs*12, S279fs*12 | Pembrolizumab (TMB: 74.8) (MSI: +) |
| 294 | 57 | M | HN | 1 | 1.7 | BRCA2 K3408* | Nivolumab (TMB: 0) (MSI: -) |
| 270 | 76 | F | CRC | 3 | 0.9 | FLT4 amp; FLT3 amp equivocal; BARD1 C53fs*5; MYC amp; PARK2 loss exons 3-5; TP53 R175H; APC T1556fs*3; BCL2L1 amp; CDK8 amp; ETV6 rearrangement intron 5; FAM123B R497*; GATA6 amp equivocal; KDM6A Y215*; MUTYH Y165C; NOTCH1 Q2123* | Atezolizumab (TMB: 10.4 (MSI: -) |

Abbreviations:

*GI = gastrointestinal; NE = neuroendocrine; HN = head and neck; UP = Unknown primary; LS = liposarcoma; ID: 203, PFS 60+ and OS60+ are censored values; FM = Foundation Medicine; TMB= tumor mutation burden; MSI = microsatellite instability; amp = amplification; del = deletion; trunc = truncation

TABLE 2

Everolimus mechanism of action and the key genes for everolimus pathway
Everolimus is an inhibitor of mammalian target of rapamycin (mTOR), a
serine-threonine kinase, downstream of the PI3K/AKT pathway. The mTOR
pathway is dysregulated in several human cancers. Everolimus binds to
an intracellular protein, FKBP-12, resulting in formation of an
inhibitory complex (mTORC1) and thus inhibition of mTOR kinase activity.
Everolimus reduces the activity of S6 ribosomal protein kinase (S6K1)
and eukaryotic elongation factor 4E-binding protein (4E-BP1), downstream
effectors of mTOR, involved in protein synthesis. In addition, everolimus
inhibits the expression of hypoxia-inducible factor (e.g., HIF-1) and
reduces the expression of vascular endothelial growth factor (VEGF).
Inhibition of mTOR by everolimus has been shown to reduce cell
proliferation, angiogenesis, and glucose uptake.

| Gene | Symbol | Role |
|---|---|---|
| Phosphatidyl-inositol-Bisphosphate Kinase Catalytic Subunit Alpha | PIK3CA | Generates phosphatidylinositol 3,4,5-trisphosphate (PIP3). Involved in the activation of AKT1 upon stimulation by receptor tyrosine kinases ligands such as EGF, insulin, IGF1, VEGFA and PDGF. Essential in endothelial cell migration during vascular development through VEGFA signaling, possibly by regulating RhoA activity. |
| Phosphatidyl-inositol-Bisphosphate Kinase Catalytic Subunit Beta | PIK3CB | Generates PIP3. Involved in the activation of AKT1 upon stimulation by G-protein coupled receptors (GPCRs) ligands such as CXCL12, kinases. Plays a role in platelet activation signaling triggered by GPCRs, alpha-IIb/beta-3 integrins (ITGA2B/ITGB3) and ITAM. |
| AKT Serine Threonine Kinase 1 | AKT1 | Plays a key in regulating cell survival, insulin signaling, angiogenesis and tumor formation. AKT1 is a downstream mediator of the PI 3-K pathway, which results in the recruitment of Akt to the plasma membrane. |
| AKT Serine Threonine Kinase 2 | AKT2 | Plays a key in regulating cell survival, insulin signaling, angiogenesis and tumor formation. AKT2 is a downstream mediator of the PI 3-K pathway, which results in the recruitment of Akt to the plasma membrane. |
| Phosphatase And Tensin Homolog | PTEN | Tumor suppressor. It negatively regulates intracellular levels of phosphatidylinositol-3,4,5-trisphosphate in cells and functions as a tumor suppressor by negatively regulating AKT/PKB signaling pathway. |
| Tuberous sclerosis Complex Subunit 1 | TSC1 | Inhibits the nutrient-mediated or growth factor-stimulated phosphorylation of S6K1 and EIF4EBP1 by negatively regulating mTORC1 signaling. Seems not to be required for TSC2 GAP activity towards RHEB. Involved in microtubule-mediated protein transport. |
| Tuberous sclerosis Complex Subunit 2 | TSC2 | Inhibits the nutrient-mediated or growth factor-stimulated phosphorylation of S6K1 and EIF4EBP1 by negatively regulating mTORC1 signaling. Acts as a GTPase-activating protein (GAP) for the small GTPase RHEB, a direct activator of the protein kinase activity of mTORC1. |
| Ras Homolog, MTORC1 Binding | RHEB | Vital in regulation of growth and cell cycle progression due to its role in the insulin/TOR/S6K signaling pathway. Activates the protein kinase activity of mTORC1, and thereby plays a role in the regulation of apoptosis. Stimulates the phosphorylation of S6K1 and EIF4EBP1 through activation of mTORC1 signaling. Has low intrinsic GTPase activity. |
| FKBP Prolyl Isomerase 1A | FKB-12 | Play a role in immunoregulation and basic cellular processes involving protein folding and trafficking. Binds the immunosuppressants FK506 and rapamycin. It interacts with several intracellular signal transduction proteins including type I TGF-beta receptor. |
| Mechanistic Target Of Rapamycin Kinase | MTOR | Target for the cell-cycle arrest and immunosuppressive effects of the FKBP12-rapamycin complex. Functions as part of 2 structurally and functionally distinct signaling complexes mTORC1 and mTORC2. Activation of MTORC1 trigger phosphorylation of EIF4EBP1 and release of its inhibition toward the elongation initiation factor 4E (eiF4E). Phosphorylates and activates RPS6KB1 that promote protein synthesis. |
| MTOR Associated Protein, LST8 Homolog | MLST8 | Subunit of both mTORC1 and mTORC2. Within mTORC1, LST8 interacts directly with MTOR and enhances its kinase activity. In nutrient-poor conditions, stabilizes the MTOR-RPTOR interaction and favors RPTOR-mediated inhibition of MTOR activity. mTORC2 is also activated by growth factors, but seems to be nutrient-insensitive. |
| Regulatory Associated Protein Of MTOR Complex 1 | RPTOR | Forms a stoichiometric complex with the mTOR kinase (MTORC1), and also associates with eukaryotic initiation factor 4E-binding protein-1 and ribosomal protein S6 kinase. The protein positively regulates the downstream effector ribosomal protein S6 kinase, and negatively regulates the mTOR kinase. |
| RPTOR Independent Companion of MTOR Complex 2 | RICTOR | Subunit of mTORC2: regulates cell growth and survival in response to hormonal signals. mTORC2 is activated by growth factors, but, in contrast to mTORC1, is nutrient-insensitive. mTORC2 seems to function upstream of Rho GTPases to regulate the actin cytoskeleton, probably by activating one or more Rho-type guanine nucleotide exchange factors. mTORC2 promotes the serum-induced formation of stress-fibers or F-actin. |

TABLE 2-continued

Everolimus mechanism of action and the key genes for everolimus pathway
Everolimus is an inhibitor of mammalian target of rapamycin (mTOR), a
serine-threonine kinase, downstream of the PI3K/AKT pathway. The mTOR
pathway is dysregulated in several human cancers. Everolimus binds to
an intracellular protein, FKBP-12, resulting in formation of an
inhibitory complex (mTORC1) and thus inhibition of mTOR kinase activity.
Everolimus reduces the activity of S6 ribosomal protein kinase (S6K1)
and eukaryotic elongation factor 4E-binding protein (4E-BP1), downstream
effectors of mTOR, involved in protein synthesis. In addition, everolimus
inhibits the expression of hypoxia-inducible factor (e.g., HIF-1) and
reduces the expression of vascular endothelial growth factor (VEGF).
Inhibition of mTOR by everolimus has been shown to reduce cell
proliferation, angiogenesis, and glucose uptake.

| Gene | Symbol | Role |
| --- | --- | --- |
| Ribosomal Protein S6 Kinase B1 | S6K1 | Acts downstream of mTOR signaling in response to growth factors and nutrients to promote cell proliferation, cell growth and cell cycle progression. Regulates protein synthesis through phosphorylation of EIF4B, RPS6 and EEF2K, and contributes to cell survival by repressing the pro-apoptotic function of BAD. |
| Eukaryotic Translation Initiation Factor 4E Binding Protein 1 | 4EBP1 | Translation repressor protein. Directly interacts with eukaryotic translation initiation factor 4E (eIF4E), which is a limiting component of the multi-subunit complex that recruits 40S ribosomal subunits to the 5' end of mRNAs. |
| Hypoxia Inducible Factor 1 Subunit Alpha | HIF1 | Master regulator of cellular and systemic homeostatic response to hypoxia by activating transcription of many genes, including those involved in energy metabolism, angiogenesis, apoptosis, and other genes whose protein products increase oxygen delivery or facilitate metabolic adaptation to hypoxia. Everolimus inhibits the expression of hypoxia-inducible factor (e.g., HIF-1). |
| Vascular Endothelial Growth Factor A | VEGFA | Growth factor active in angiogenesis, vasculogenesis and endothelial cell growth. Induces endothelial cell proliferation, promotes cell migration, inhibits apoptosis and induces permeabilization of blood vessels. Binds to the FLT1/VEGFR1 and KDR/VEGFR2 receptors, heparan sulfate and heparin. Everolimus reduces the expression of VEGFA and reduce cell proliferation, angiogenesis, and glucose uptake. |

TABLE 3

Description and rationale for the selection of key genes of immune blockade

| Usual Name | Official names | Role in the negative immune-blockade |
| --- | --- | --- |
| The T lymphocytes (LyT) that infiltrate the tumor (TILS) recognize the presented tumor neo-antigens. The neo-antigens are recognized as "non-self" as they are modified proteins because of mutations. The clone of LyT that recognizes specifically the neo-antigen is activated and proliferates. The recruitment of activated LyT that recognize specifically the tumor is a complex process that involves different antigen presentation mechanisms. Professional Antigen Presenting Cells (APC) present the neo-antigen associated to the major histocompatibility complex II (CMH2) recognized by LyT CD4+ that differentiate in LyT Helper 1 (Ly Th1) and Helper 2 (Ly Th2). Ly Th1 are key in recruitment of naïve LyT CD8+ and induce their activation. Lymphocytes T Cytotoxic (CD8+) and Natural Killer lymphocytes (NK) also recognize the neo-antigen restricted to CMH1 (Histocompatibility complex 1) and are subsequently activated, and can destroy directly the tumoral cells presenting the neo-antigen. The process of recruitment and activation of cytotoxic lymphocytes T CD8 is controlled by different mechanisms of negative blockade. | | |
| PD-1 | PDCD1 | PDL1 and PDL2 binds to PD1 and directly inhibit the T receptor. CTLA4 has a high affinity and avidity for BF1 and BF2 ligands that binds to the co-stimulatory molecule CD28. In this competitive manner, CTLA4 blocks CD28 and has a negative blockade effect. PD-1 and CTLA-4 are highly expressed on TILs in metastatic melanoma, NSCLC, UBC, and squamous cell carcinoma of the head and neck. PD-1 and CTLA-4 modulate effector T cell activation, proliferation, and function through distinct, complementary mechanisms. The expression of PD-1 and CTLA-4 on tumor-infiltrating T cell populations contributes to suppression and immunological escape. In vivo studies have shown that tumor-infiltrating lymphocytes and not peripheral T cells have been shown to be the major contributor to tumor control following anti-PD-L1 + anti-CTLA-4 mAb therapy. |
| PD-L1 | CD274 | |
| PD-L2 | PDCD1LG2 | |
| CTLA4 | CTLA4 | |
| B7-1 | CD80 | |
| B7-2 | CD86 | |
| CD28 | CD28 | |
| LAG3 | LAG3 | LAG3-Delivers inhibitory signals upon binding to ligands, such as FGL1 (responsible for LAG3 T-cell inhibitory function). Following TCR engagement, LAG3 associates with CD3-TCR in the immunological synapse and directly inhibits T-cell activation (may inhibit antigen-specific T-cell activation in synergy with PDCD1/PD-1, possibly by acting as a co-receptor for PDCD1/PD-1). LAG3 negatively regulates the proliferation, activation, effector function and homeostasis of both CD8(+) and CD4(+) T-cells. Also mediates immune tolerance. LAG3 is constitutively expressed on a subset of regulatory T-cells (Tregs) and contributes to their suppressive function. |

TABLE 3-continued

Description and rationale for the selection of key genes of immune blockade

| Usual Name | Official names | Role in the negative immune-blockade |
|---|---|---|
| TLR4 | TLR4 | TLR4- Its over expression and activation by LPS activates MAPK and NF-κB pathways, implicating cell-autonomous TLR4 signaling in regulation of carcinogenesis, in particular, through increased proliferation of tumor cells, apoptosis inhibition and metastasis. TLR4 signaling in immune and inflammatory cells of tumor microenvironment may lead to production of pro-inflammatory cytokines (TNF, IL-1β, IL-6, IL-18, etc.), immunosuppressive cytokines (IL-10, TGF-β, etc.) and angiogenic mediators (VEGF, EGF, TGF-β). |
| CD8 | CD8A | The level of infiltration of the tumor by Cytotoxic lymphocytes T CD8 (LyTc) - can be assessed by investigating the specific marker CD8. |
| CD16 | FCGR3 | The level of infiltration of the tumor by Natural Killers cells (NK)- can be assessed by investigating the specific marker is CD16. |
| FOXP3 | FOXP3 | The level of the infiltration of the tumor by a specific population of Lymphocytes T called regulatory (T-regs)- can be assessed by investigating the specific marker FOXP3. |

The invention claimed is:

1. A method for treating a subject suffering from cancer, wherein the method comprises:
a) measuring mRNA expression levels of each gene of a gene signature selected from the group consisting of:
  i) a gene signature comprising AKT2, TSC1, FKB-12, TSC2, RPTOR, RHEB, PIK3CA and PIK3CB;
  ii) a gene signature comprising KITLG and KIT;
  iii) a gene signature comprising ERK2, ARAF, CRAF, MEK1, MEK2, HRAS, ERK1, MAPK10 and KSR1;
  iv) a gene signature comprising NRG4 and NRG2;
  v) a gene signature comprising FGF10, FGF16, FGF5, FGF2 and FGF13; and
  vi) a gene signature comprising TLR4, PDL2, PDL1, CD16 (NK), CTLA4 and CD28;
in a tumor sample and a histologically matched normal sample, wherein the tumor and histologically matched normal samples are both from the same subject suffering from cancer,
b) determining if the subject is susceptible to respond to an anti-cancer therapy by:
determining a mRNA fold change of Tumor versus Normal ($Fc_n$ TvN) for each gene of the signature,
multiplying the $Fc_n$ TvN by expression intensity of the gene ($I_n$) in the tumor sample ($I_n$ T) and/or in the normal histologically matched sample ($I_n$ N) for each gene of the signature,
determining a score based on the $Fc_n$ TvN multiplied by $I_n$T and/or $I_n$ N, for the genes of the gene signature, this score being indicative of the responsiveness of the subject to the anti-cancer therapy,
c) administering a therapeutically effective amount of the anti-cancer therapy to a subject determined responsive to the anti-cancer therapy.

2. The method of claim 1, wherein the anti-cancer therapy is a Tyrosine kinase inhibitor; or a FGFR inhibitor; or a PD-1/PD-L1 inhibitor and the anti-cancer therapy is administered to the responsive subject.

3. The method of claim 2, wherein the Tyrosine kinase inhibitor is a mTOR inhibitor, a VEGFR inhibitor, a MEK inhibitor, or a pan-HER inhibitor and is selected from the group consisting of everolimus, axitinib, trametinib and afatinib; or a FGFR inhibitor and is BGJ398 or TAS-120; or the PD-1/PD-L1 inhibitor is an anti-PD-1 or anti-PD-L1 antibody.

4. The method of claim 3, wherein the anti-PD-1 or anti-PD-L1 antibody is selected from the group consisting of Pembrolizumab, Nivolumab and Atezolizumab.

5. The method of claim 1, wherein
(i) when the anti-cancer therapy is a mTOR inhibitor, the gene signature comprises AKT2, TSC1, FKB-12, TSC2, RPTOR, RHEB, PIK3CA and PIK3CB;
(ii) when the anti-cancer therapy is a VEGFR inhibitor, the gene signature comprises KIT and KITLG;
(iii) when the anti-cancer therapy is a pan-HER inhibitor, the gene signature comprises NRG4 and NRG2;
(iv) when the anti-cancer therapy is a MEK inhibitor, the gene signature comprises ERK2, ARAF, CRAF, MEK1, MEK2, HRAS, ERK1, MAPK10 and KSR1;
(v) when the anti-cancer therapy is a PD-1/PD-L1 inhibitor, the gene signature comprises TLR4, PDL2, PDL1, CD16, CTLA4 and CD28; and
(vi) when the anti-cancer therapy is a FGFR inhibitor, the gene signature comprises FGF10, FGF16, FGF5, FGF2 and FGF13.

6. The method of claim 5, wherein the anti-cancer therapy is everolimus, and the method comprises:
(a) measuring mRNA expression levels of each gene of the following gene signature: AKT2, TSC1, FKB-12, TSC2, RPTOR, RHEB, PIK3CA and PIK3CB, in a tumor sample and a histologically matched normal sample, wherein the tumor and histologically matched normal samples are both from the same subject suffering from cancer, and determining a mRNA fold change of Tumor versus Normal ($Fc_n$ TvN) for each of the 8 genes of the gene signature;
(b) determining the intensity of gene expression in the tumor sample ($I_n$ T) for each of the 8 genes of the gene signature;
(c) determining the absolute value of the fold of log 2 ($Fc_n$ TvN) multiplied by log 1.1 ($I_n$ T) for each of the 8 genes of the gene signature and, based on a linear regression, determining a predicted progression-free survival (PFS), the predicted PFS being indicative of the response of the subject to everolimus and administering everolimus to the responsive subject.

7. The method of claim 5, wherein the anti-cancer therapy is a PD-1/PD-L1 inhibitor or an anti-PD-1 or anti-PD-L1 antibody, and the method comprises:
(a) measuring mRNA expression levels of each gene of the following gene signature: TLR4, PDL2, PDL1, CD16 (NK), CTLA4 and CD28 in a tumor sample and a histologically matched normal sample, wherein the tumor and histologically matched normal samples are both from the same subject suffering from cancer, and determining the mRNA fold change of Tumor versus Normal ($Fc_n$ TvN) for each of the 6 genes of the gene signature;
(b) determining the intensity of gene expression in the histologically matched normal sample ($I_n$ N) for each of the 6 genes of the gene signature;
(c) determining the fold of log 2 ($Fc_n$ TvN) multiplied by log 1.1 ($I_n$ N) for each of the 6 genes of the gene signature and, based on a linear regression, determining a predicted progression-free survival (PFS), the predicted PFS being indicative of the response of the subject to the PD-1/PD-L1 inhibitor and administering the PD-1/PD-L1 inhibitor to the responsive subject.

8. The method of claim 5, wherein the anti-cancer therapy is axitinib and the method comprises:
(a) measuring mRNA expression levels of each gene of the following gene signature: KIT and KITLG in a tumor sample and a histologically matched normal sample, wherein the tumor and histologically matched normal samples are both from the same subject suffering from cancer, and determining the mRNA fold change of Tumor versus Normal ($Fc_n$ TvN) for each of the 2 genes of the gene signature;
(b) determining the intensity of gene expression in the histologically matched normal sample ($I_n$ N) for each of the 2 genes of the gene signature;
(c) determining the sum of log 2 ($Fc_n$ TvN) multiplied by log 1.1 ($I_n$ N) for each of the 2 genes of the gene signature and, based on a linear regression, determining a predicted PFS, the predicted PFS being indicative of the response of the subject to axitinib and administering axitinib to the responsive subject.

9. The method of claim 5, wherein the anti-cancer therapy is afatinib and the method comprises:
(a) measuring mRNA expression levels for each gene of the following gene signature: NRG4 and NRG2 in a tumor sample and a histologically matched normal sample, wherein the tumor and histologically matched normal samples are both from the same subject suffering from cancer, and determining the mRNA fold change of Tumor versus Normal ($Fc_n$ TvN) for each of the 2 genes of the gene signature;
(b) determining the intensity of gene expression in the tumor sample ($I_n$ T) for each of the 2 genes of the gene signature;
(c) determining the sum of log 2 ($Fc_n$ TvN) multiplied by log 1.1 ($I_n$ T) for each of the 2 genes of the gene signature and, based on a linear regression, determining a predicted PFS, the predicted PFS being indicative of the response of the subject to afatinib and administering afatinib to the responsive subject.

10. The method of claim 5, wherein the anti-cancer therapy is trametinib and the method comprises:
(a) measuring mRNA expression levels of each gene of the following gene signature: ERK2, ARAF, CRAF, MEK1, MEK2, HRAS, ERK1, MAPK10 and KSR1 in a tumor sample and a histologically matched normal sample, wherein the tumor and histologically matched normal samples are both from the same subject suffering from cancer, and determining mRNA fold change of Tumor versus Normal ($Fc_n$ TvN) for each of the 9 genes of the gene signature;
(b) determining the intensity of gene expression in the tumor sample ($I_n$ T) for each of the 9 genes of the gene signature;
(c) determining the fold of log 2 ($Fc_n$ TvN) multiplied by log 1.1 ($I_n$ T) for each of the 9 genes of the gene signature and, based on a linear regression, determining a predicted PFS, the predicted PFS being indicative of the response of the subject to trametinib and administering trametinib to the responsive subject.

11. The method of claim 5, wherein the anti-cancer therapy is a FGFR inhibitor and the method comprises:
(a) measuring mRNA expression levels of each gene of the following gene signature: FGF10, FGF16, FGF5, FGF2 and FGF13 in a tumor sample and a histologically matched normal sample, wherein the tumor and histologically matched normal samples are both from the same subject suffering from cancer, and determining the mRNA fold change of Tumor versus Normal ($Fc_n$ TvN) for each gene of the 5 genes of the gene signature;
(b) determining the intensity of gene expression in the histologically matched normal sample ($I_n$ N) for each of the 5 genes of the gene signature;
(c) determining the sum of log 2 ($Fc_n$ TvN) multiplied by log 1.1 and sum of log 2 ($Fc_n$ TvN) multiplied by log 1.1 ($I_n$ N) for each of the 5 genes of the gene signature, and based on a linear regression, determining a predicted PFS, the predicted PFS being indicative of the response of the subject to the FGFR inhibitor and administering the FGFR inhibitor to the responsive subject.

12. The method of claim 5, wherein
(i) when the anti-cancer therapy is a mTOR inhibitor and is everolimus, the gene signature comprises AKT2, TSC1, FKB-12, TSC2, RPTOR, RHEB, PIK3CA and PIK3CB;
(ii) when the anti-cancer therapy is a VEGFR inhibitor and is axitinib, the gene signature comprises KIT and KITLG;
(iii) when the anti-cancer therapy is a pan-HER inhibitor and is afatinib, the gene signature comprises NRG4 and NRG2;
(iv) when the anti-cancer therapy is a MEK inhibitor and is trametinib, the gene signature comprises ERK2, ARAF, CRAF, MEK1, MEK2, HRAS, ERK1, MAPK10 and KSR1; and
(v) when the anti-cancer therapy is a PD-1/PD-L1 inhibitor and is an anti-PD-1 or anti-PD-L1 antibody, the gene signature comprises TLR4, PDL2, PDL1, CD16, CTLA4 and CD28.

13. The method of claim 1, wherein the cancer is selected from the group consisting of prostate cancer, bladder cancer, breast cancer, colon cancer, colorectal cancer, Esophagus cancer, hypopharynx cancer, gastric cancer, rectum cancer, head and neck cancer, liver cancer, brain cancer, hepatocarcinoma, kidney cancer, ovarian cancer, cervical cancer, pancreatic cancer, Leiomyosarcoma, Liposarcoma, lung cancer, lymphoma, osteosarcoma, melanoma, neuroendocrine cancer, pleural cancer, Rhabdomyosarcoma, Small Intestine neuroendocrine cancer, endometrial cancer, soft tissue cancer, non-small cell lung carcinomas (NSCLC), metastatic non-small cell lung cancer, muscle cancer, adrenal cancer, thyroid cancer, uterine cancer, advanced renal cell carcinoma (RCC), and sub ependymal giant cell astrocytoma (SEGA) associated with tuberous sclerosis (TS).

* * * * *